(12) United States Patent
Feaver et al.

(10) Patent No.: US 11,611,073 B2
(45) Date of Patent: Mar. 21, 2023

(54) COMPOSITES OF POROUS NANO-FEATURED SILICON MATERIALS AND CARBON MATERIALS

(71) Applicant: GROUP14 TECHNOLOGIES, INC., Woodinville, WA (US)

(72) Inventors: Aaron M. Feaver, Seattle, WA (US); Leah A. Thompkins, Seattle, WA (US); Katharine Geramita, Seattle, WA (US); Benjamin E. Kron, Seattle, WA (US); Avery J. Sakshaug, Snohomish, WA (US); Sarah Fredrick, Denver, CO (US); Henry R. Costantino, Woodinville, WA (US); Chad Goodwin, Seattle, WA (US); Christopher Timmons, Monroe, WA (US); Farshid Afkhami, Lake Stevens, WA (US); Adam Strong, Lake Forest Park, WA (US)

(73) Assignee: GROUP14 TECHNOLOGIES, INC., Woodinville, WA (US)

( * ) Notice: Subject to any disclaimer, the term of this patent is extended or adjusted under 35 U.S.C. 154(b) by 0 days.

(21) Appl. No.: 16/824,532

(22) Filed: Mar. 19, 2020

(65) Prior Publication Data
US 2021/0057736 A1 Feb. 25, 2021

Related U.S. Application Data

(63) Continuation of application No. 15/752,572, filed as application No. PCT/US2016/046916 on Aug. 12, 2016, now abandoned.
(Continued)

(51) Int. Cl.
*H01M 4/38* (2006.01)
*H01M 10/0525* (2010.01)
(Continued)

(52) U.S. Cl.
CPC .......... *H01M 4/386* (2013.01); *C01B 33/021* (2013.01); *C23F 1/00* (2013.01); *H01M 4/366* (2013.01);
(Continued)

(58) Field of Classification Search
CPC ...................................................... H01M 4/364
See application file for complete search history.

(56) References Cited

U.S. PATENT DOCUMENTS 3,518,123 A 6/1970 Katsoulis et al.
3,582,288 A 6/1971 Taylor et al.
(Continued)

FOREIGN PATENT DOCUMENTS

CA 2176452 A1 11/1997
CN 1762900 A 4/2006
(Continued)

OTHER PUBLICATIONS

"A Basic Guide to Particle Characterization," Malvern Instruments Worldwide—White Paper, Retrieved from the Internet: URL:http://golik.co.il/Data/ABasicGuidtoParticleCharacterization(2)1962085150.pdf, XP55089322A, 2012. (26 Pages).
(Continued)

*Primary Examiner* — Khanh T Nguyen
(74) *Attorney, Agent, or Firm* — Seed IP Law Group LLP

(57) ABSTRACT

Composites of porous nano-featured silicon and various materials, such as carbon, are provided. The composites find utility in various applications, such as electrical energy storage electrodes and devices comprising the same.

17 Claims, 47 Drawing Sheets

SEM of an exemplary porous silicon material demonstrating nano-scale features.

Related U.S. Application Data

(60) Provisional application No. 62/271,795, filed on Dec. 28, 2015, provisional application No. 62/271,799, filed on Dec. 28, 2015, provisional application No. 62/209,651, filed on Aug. 25, 2015, provisional application No. 62/208,357, filed on Aug. 21, 2015, provisional application No. 62/205,542, filed on Aug. 14, 2015.

(51) Int. Cl.
| | |
|---|---|
| C01B 33/021 | (2006.01) |
| C23F 1/00 | (2006.01) |
| H01M 8/1037 | (2016.01) |
| H01M 4/36 | (2006.01) |
| H01M 4/587 | (2010.01) |
| H01M 4/02 | (2006.01) |

(52) U.S. Cl.
CPC ......... *H01M 4/587* (2013.01); *H01M 8/1037* (2013.01); *H01M 10/0525* (2013.01); *C01P 2002/72* (2013.01); *C01P 2002/85* (2013.01); *C01P 2004/03* (2013.01); *C01P 2006/10* (2013.01); *C01P 2006/11* (2013.01); *C01P 2006/12* (2013.01); *C01P 2006/14* (2013.01); *C01P 2006/16* (2013.01); *C01P 2006/17* (2013.01); *C01P 2006/21* (2013.01); *C01P 2006/40* (2013.01); *C01P 2006/80* (2013.01); *H01M 2004/021* (2013.01); *H01M 2004/027* (2013.01)

(56) References Cited

U.S. PATENT DOCUMENTS

| | | |
|---|---|---|
| 3,619,428 A | 11/1971 | David |
| 3,876,505 A | 4/1975 | Stoneburner |
| 3,892,580 A | 7/1975 | Messing |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,268,081 B1 | 7/2001 | Clough |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,631,072 B1 | 10/2003 | Paul et al. |
| 6,631,073 B1 | 10/2003 | Sakata et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Markavov et al. |
| 8,361,659 B2 | 1/2013 | Richard |
| 8,366,979 B2 | 2/2013 | Dai et al. |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,734,991 B2 | 5/2014 | Takano et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,005,812 B2 | 4/2015 | Ma et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,666,860 B2 | 5/2017 | Lam et al. |
| 9,680,159 B2 | 6/2017 | Feaver et al. |
| 9,714,172 B2 | 7/2017 | Geramita et al. |
| 9,985,289 B2 | 5/2018 | Costantino et al. |
| 10,141,122 B2 | 11/2018 | Feaver et al. |
| 10,147,950 B2 | 12/2018 | Sakshaug et al. |
| 10,173,900 B2 | 1/2019 | Ludvik et al. |
| 10,195,583 B2 | 2/2019 | Costantino et al. |
| 10,273,328 B2 | 4/2019 | Kron et al. |
| 10,287,170 B2 | 5/2019 | Feaver et al. |
| 10,361,428 B2 | 7/2019 | Kim et al. |

(56) References Cited

U.S. PATENT DOCUMENTS

| | | |
|---|---|---|
| 10,454,094 B2 | 10/2019 | Xia et al. |
| 10,454,103 B2 | 10/2019 | Sakshaug et al. |
| 10,490,358 B2 | 11/2019 | Feaver et al. |
| 10,508,335 B1 | 12/2019 | Yilmaz et al. |
| 10,522,836 B2 | 12/2019 | Thompkins et al. |
| 10,590,277 B2 | 3/2020 | Costantino et al. |
| 10,600,581 B2 | 3/2020 | Feaver et al. |
| 10,608,254 B2 | 3/2020 | Sakshaug et al. |
| 10,658,659 B1 | 5/2020 | Mason et al. |
| 10,711,140 B2 | 7/2020 | Costantino et al. |
| 10,714,744 B2 | 7/2020 | Sakshaug et al. |
| 10,756,347 B2 | 8/2020 | Sakshaug et al. |
| 10,763,501 B2 | 9/2020 | Feaver et al. |
| 10,784,512 B2 | 9/2020 | Sakshaug et al. |
| 10,814,304 B2 | 10/2020 | Costantino et al. |
| 10,923,722 B2 | 2/2021 | Sakshaug et al. |
| 10,938,027 B2 | 3/2021 | Mason et al. |
| 10,964,940 B1 | 3/2021 | Mason et al. |
| 11,011,748 B2 | 5/2021 | Mason et al. |
| 11,165,054 B2 | 11/2021 | Mason et al. |
| 11,174,167 B1 | 11/2021 | Dhanabalan et al. |
| 11,335,903 B2 | 5/2022 | Costantino et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0075627 A1 | 6/2002 | Shinozaki et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0010090 A1 | 1/2004 | Chino et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0253220 A1 | 11/2005 | Lin et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |
| 2008/0011986 A1 | 1/2008 | Yamakawa et al. |
| 2008/0044726 A1 | 2/2008 | Feng et al. |
| 2008/0107804 A1 | 5/2008 | Kondo |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0253248 A1 | 10/2009 | Sun et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0163791 A1 | 7/2010 | Fukui et al. |
| 2010/0215563 A1 | 8/2010 | Yambayashi |
| 2010/0279172 A1 | 11/2010 | Hwang et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0281180 A1 | 11/2011 | Kim et al. |
| 2011/0287189 A1 | 11/2011 | Shembel |
| 2011/0300447 A1 | 12/2011 | Archer |
| 2011/0311873 A1 | 12/2011 | Schultz et al. |
| 2012/0045685 A1 | 2/2012 | Seki et al. |
| 2012/0129049 A1 | 5/2012 | Rayner |
| 2012/0156493 A1 | 6/2012 | Maisels et al. |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0082213 A1 | 4/2013 | Duncan et al. |
| 2013/0169238 A1 | 7/2013 | Rojeski |
| 2013/0189472 A1 | 7/2013 | Takaoka |
| 2013/0189575 A1 | 7/2013 | Anguchamy et al. |
| 2013/0196158 A1 | 8/2013 | Yoshida et al. |
| 2013/0244862 A1 | 9/2013 | Ivanovici et al. |
| 2013/0252082 A1 | 9/2013 | Thompkins et al. |
| 2013/0295462 A1 | 11/2013 | Atanassova et al. |
| 2013/0337334 A1 | 12/2013 | Tao et al. |
| 2013/0344363 A1 | 12/2013 | Upadhyaya |
| 2013/0344391 A1 | 12/2013 | Yushin et al. |
| 2014/0038042 A1 | 2/2014 | Rios et al. |
| 2014/0057179 A1 | 2/2014 | Yushin et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0087731 A1 | 3/2015 | Dong et al. |

(56) References Cited

U.S. PATENT DOCUMENTS

| | | | |
|---|---|---|---|
| 2015/0155546 | A1 | 6/2015 | Yushin et al. |
| 2015/0162603 | A1 | 6/2015 | Yushin et al. |
| 2015/0207148 | A1 | 7/2015 | Kimura et al. |
| 2015/0238917 | A1 | 8/2015 | Mulik et al. |
| 2015/0306570 | A1 | 10/2015 | Mayes et al. |
| 2016/0010250 | A1 | 1/2016 | Taninaka et al. |
| 2016/0039970 | A1 | 2/2016 | Kron et al. |
| 2016/0043384 | A1 | 2/2016 | Zhamu et al. |
| 2016/0104882 | A1 | 4/2016 | Yushin et al. |
| 2016/0133394 | A1 | 5/2016 | Sakshaug et al. |
| 2016/0344030 | A1 | 11/2016 | Sakshaug et al. |
| 2016/0372750 | A1 | 12/2016 | Chang et al. |
| 2017/0152340 | A1 | 6/2017 | Geramita et al. |
| 2017/0316888 | A1 | 11/2017 | Geramita et al. |
| 2018/0097240 | A1 | 4/2018 | Feaver et al. |
| 2018/0294484 | A1 | 10/2018 | Fredrick et al. |
| 2019/0088931 | A1 | 3/2019 | Abrahamson et al. |
| 2019/0097222 | A1 | 3/2019 | Feaver et al. |
| 2019/0103608 | A1 | 4/2019 | Costantino et al. |
| 2019/0144287 | A1 | 5/2019 | Park et al. |
| 2019/0259546 | A1 | 8/2019 | Kron et al. |
| 2020/0020935 | A1 | 1/2020 | Costantino et al. |
| 2020/0048098 | A1 | 2/2020 | Feaver et al. |
| 2020/0144619 | A1 | 5/2020 | Hamilton et al. |
| 2020/0259178 | A1 | 8/2020 | Chang et al. |
| 2020/0259181 | A1 | 8/2020 | Thompkins et al. |
| 2020/0280070 | A1 | 9/2020 | Sakshaug et al. |
| 2020/0290882 | A1 | 9/2020 | Fredrick et al. |
| 2020/0365896 | A1 | 11/2020 | Sakshaug et al. |
| 2020/0373561 | A1 | 11/2020 | Mason et al. |
| 2021/0054213 | A1 | 2/2021 | Costantino et al. |
| 2021/0126251 | A1 | 4/2021 | Sakshaug et al. |
| 2021/0175498 | A1 | 6/2021 | Feaver et al. |
| 2021/0237029 | A1 | 8/2021 | Costantino et al. |
| 2021/0276875 | A1 | 9/2021 | Mason et al. |
| 2022/0055905 | A1 | 2/2022 | Dhanabalan et al. |
| 2022/0055906 | A1 | 2/2022 | Costantino et al. |
| 2022/0059818 | A1 | 2/2022 | Dhanabalan et al. |

FOREIGN PATENT DOCUMENTS

| | | |
|---|---|---|
| CN | 1877888 A | 12/2006 |
| CN | 1986401 A | 6/2007 |
| CN | 101284665 A | 10/2008 |
| CN | 101292389 A | 10/2008 |
| CN | 101318648 A | 12/2008 |
| CN | 101604743 A | 12/2009 |
| CN | 101292389 B | 9/2010 |
| CN | 101969120 A | 2/2011 |
| CN | 102214817 A | 10/2011 |
| CN | 102623680 A | 8/2012 |
| CN | 102820455 A | 12/2012 |
| CN | 103094528 A | 5/2013 |
| CN | 103456929 A | 12/2013 |
| CN | 103746098 A | 4/2014 |
| CN | 104108698 A | 10/2014 |
| CN | 102509781 B | 11/2015 |
| CN | 105680023 A | 6/2016 |
| CN | 106207108 A | 12/2016 |
| DE | 10 2014 211012 A1 | 12/2015 |
| EP | 0 126 191 A2 | 11/1984 |
| EP | 0 649 815 A1 | 4/1995 |
| EP | 0 861 804 A1 | 9/1998 |
| EP | 0 891 943 A1 | 1/1999 |
| EP | 1 049 116 A1 | 11/2000 |
| EP | 1 052 716 A2 | 11/2000 |
| EP | 1 514 859 A2 | 3/2005 |
| EP | 2 117 068 A1 | 11/2009 |
| EP | 2 330 676 A1 | 6/2011 |
| EP | 2 983 186 A1 | 2/2016 |
| JP | 2-300222 A | 12/1990 |
| JP | 3-90615 A | 4/1991 |
| JP | H3-137010 A | 6/1991 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-311512 A | 11/1993 |
| JP | 5-320955 A | 12/1993 |
| JP | 8-59919 A | 3/1996 |
| JP | 8-112539 A | 5/1996 |
| JP | 9-63905 A | 3/1997 |
| JP | 9-275042 A | 10/1997 |
| JP | 10-297912 A | 11/1998 |
| JP | 2001-89119 A | 4/2001 |
| JP | 2001-278609 A | 10/2001 |
| JP | 2003-303588 A | 10/2003 |
| JP | 2004-67498 A | 3/2004 |
| JP | 2004-203715 A | 7/2004 |
| JP | 2004-221332 A | 8/2004 |
| JP | 2004-315283 A | 11/2004 |
| JP | 2005-132696 A | 5/2005 |
| JP | 2005-136397 A | 5/2005 |
| JP | 2005-187320 A | 7/2005 |
| JP | 2006-117475 A | 5/2006 |
| JP | 2006-160597 A | 6/2006 |
| JP | 2006-248848 A | 9/2006 |
| JP | 2006-264993 A | 10/2006 |
| JP | 2007-039289 A | 2/2007 |
| JP | 2007-115749 A | 5/2007 |
| JP | 2008-7387 A | 1/2008 |
| JP | 2008-8539 A | 1/2008 |
| JP | 2008-94925 A | 4/2008 |
| JP | 2009-259803 A | 11/2009 |
| JP | 2012-121796 A | 6/2012 |
| JP | 5339107 B1 | 11/2013 |
| JP | 2015-130287 A | 7/2015 |
| JP | 2015-519719 A | 7/2015 |
| JP | 5796263 B1 | 10/2015 |
| JP | 2016-27222 A | 2/2016 |
| JP | 2016-100225 A | 5/2016 |
| JP | 2016-100226 A | 5/2016 |
| JP | 2016-132608 A | 7/2016 |
| KR | 10-2004-0080010 A | 9/2004 |
| KR | 10-2007-0030881 A | 3/2007 |
| KR | 10-2014-0112451 A | 9/2014 |
| WO | 95/01165 A1 | 1/1995 |
| WO | 02/39468 A2 | 5/2002 |
| WO | 2004/087285 A1 | 10/2004 |
| WO | 2004/099073 A2 | 11/2004 |
| WO | 2005/043653 A1 | 5/2005 |
| WO | 2009/032104 A2 | 3/2009 |
| WO | 2010/138760 A2 | 12/2010 |
| WO | 2011/157013 A1 | 12/2011 |
| WO | 2020/128523 A1 | 6/2020 |
| WO | 2022/035879 A1 | 2/2022 |
| WO | 2022/040327 A1 | 2/2022 |
| WO | 2022/040328 A1 | 2/2022 |
| WO | 2022/067030 A1 | 3/2022 |
| WO | 2022/072715 A1 | 4/2022 |

OTHER PUBLICATIONS

Abánades et al., "Experimental Analysis of Direct Thermal Methane Cracking," *International Journal of Hydrogen Energy* 36(20):12877-12886, 2011.

Abraham et al., "A Polymer Electrolyte-Based Rechargeable Lithium/Oxygen Battery," *J. Electrochem. Soc.* 143(1):1-5, Jan. 1996.

Alcañiz-Monge et al., "Methane Storage in Activated Carbon Fibres," *Carbon* 35(2):291-297, 1997.

Anderegg, "Grading Aggregates: II—The Application of Mathematical Formulas to Mortars," *Industrial and Engineering Chemistry* 23(9):1058-1064, 1931.

Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).

Babić et al., "Carbon cryogel as support of platinum nano-sized electrocatalyst for the hydrogen oxidation reaction," *Electrochimica Acta* 51:3820-3826, 2006.

Babić et al., "Characterization of carbon cryogel synthesized by sol-gel polycondensation and freeze-drying," *Carbon* 42:2617-2624, 2004.

(56) References Cited

OTHER PUBLICATIONS

Babić et al., "Characterization of carbon cryogels synthesized by sol-gel polycondensation," *J. Serb. Chem. Soc. 70*(1):21-31, 2005.
Barbieri et al., "Capacitance limits of high surface area activated carbons for double layer capacitors," *Carbon 43*:1303-1310, 2005.
Barton et al., "Tailored Porous Materials," *Chem. Mater. 11*:2633-2656, 1999.
Beattie et al., "High-Capacity Lithium-Air Cathodes," *J. Electrochem. Soc. 156*(1):A44-A47, 2009.
Besenhard, "Handbook of battery materials," Weinheim, Wiley—VCH, Weinheim, New York, 398-401, Dec. 31, 1999.
Bock et al., "Structural Investigation of Resorcinol Formaldehyde and Carbon Aerogels Using SAXS and BET," *Journal of Porous Materials 4*:287-294, 1997.
Buiel et al., "Li-insertion in hard carbon anode materials for Li-ion batteries," *Electrochimica Acta 45*:121-130, 1999.
Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.
Butler et al., "Braking Performance Test Procedure for the Hybrid Vehicle Energy Storage Systems: Capacitor Test Results," Joint International Meeting of the Electrochemical Society, Abstract 686, Honolulu, HI, Oct. 3-8, 2004, 5 pages.
Cao et al., "Li-ion capacitors with carbon cathode and hard carbon/stabilized lithium metal powder anode electrodes," *Journal of Power Sources 213*:180-185, Apr. 2012.
Chmiola et al., "Anomalous Increase in Carbon Capacitance at Pore Sizes Less Than 1 Nanometer," *Science 313*:1760-1763, Sep. 22, 2006.
Conway et al., "Partial Molal Volumes of Tetraalkylammonium Halides and Assignment of Individual Ionic Contributions," *Trans. Faraday Soc. 62*:2738-2749, 1966.
Czakkel et al., "Influence of drying on the morphology of resorcinol-formaldehyde-based carbon gels," *Microporous and Mesoporous Materials 86*:124-133, 2005.
Débart et al., "α-MnO2 Nanowires: A Catalyst for the O2 Electrode in Rechargeable Lithium Batteries," *Agnew. Chem. Int. Ed. 47*:4521-4524, 2008.
Ding et al., "How Conductivities and Viscosities of PC-DEC and PC-EC Solutions of LiBF4, LiPF6, LiBOB, Et4NBF4, and Et4NBF6 Differ and Why," *Journal of The Electrochemical Society 151*(12):A2007-A2015, 2004.
Dinger et al., "Particle Packing III—Discrete versus Continuous Particle Sizes," *Interceram 41*(5):332-334, 1992.
Dinger et al., "Particle Packing IV—Computer Modelling of Particle Packing Phenomena," *Interceram 42*(3): 150-152, 1993.
Edward, "Molecular Volumes and the Stokes-Einstein Equation," *Journal of Chemical Education 47*(4):261-270, Apr. 1970.
Eikerling et al., "Optimized Structure of Nanoporous Carbon-Based Double-Layer Capacitors," *Journal of The Electrochemical Society 152*(1):E24-E33, 2005.
Endo et al., "Morphology and organic EDLC applications of chemically activated AR-resin-based carbons," *Carbon 40*:2613-2626, 2002.
Feaver et al., "Activated carbon cryogels for low pressure methane storage," *Carbon 44*:590-593, 2006.
Fotouhi et al., "A Low Cost, Disposable Cable-Shaped AI-Air Battery for Portable Biosensors," *J. Micromech. Microeng. 26*:055011, 2016. (8 pages).
Furnas, "Grading Aggregates I—Mathematical Relations for Beds of Broken Solids of Maximum Density," *Industrial and Engineering Chemistry 23*(9): 1052-1058, 1931.
Gao et al., "Nitrogen-rich graphene from small molecules as high performance anode material," *Nanotechnology 25*:415402, 2014, 8 pages.
Gouérec et al., "Preparation and Modification of Polyacrylonitrile Microcellular Foam Films for Use as Electrodes in Supercapacitors," *Journal of The Electrochemical Society 148*(1):A94-A101, 2001.

Hahn et al., "A dilatometric study of the voltage limitation of carbonaceous electrodes in aprotic EDLC type electrolytes by charge-induced strain," *Carbon 44*:2523-2533, 2006.
Hasegawa et al., "Preparation of carbon gel microspheres containing silicon powder for lithium ion battery anodes," *Carbon 42*:2573-2579, 2004.
Hirscher et al., "Are carbon nanostructures an efficient hydrogen storage medium?" *Journal of Alloys and Compounds 356-357*:433-437, 2003.
Hong et al., "Hydrogen evolution inhibition with diethylenetriamine modification of activated carbon for a lead-acid battery," *RSC Adv. 4*:33574-33577, 2014.
Hsieh et al., "Synthesis of mesoporous carbon composite and its electric double-layer formation behavior," *Microporous and Mesoporous Materials 93*:232-239, 2006.
Hu et al., "Effects of electrolytes and electrochemical pretreatments on the capacitive characteristics of activated carbon fabrics for supercapacitors," *Journal of Power Sources 125*:299-308, 2004.
Huang et al., "Nitrogen-containing mesoporous carbons prepared from melamine formaldehyde resins with $CaCl_2$ as a template," *J. Colloid Interface Sci. 363*(1):193-198, 2011.
Indo German Carbons Limited, "Activated Carbon," Apr. 2009, URL=http://www.igcl.com/php/activated_carbon.php, download date Nov. 29, 2018, 3 pages.
Inomata et al., "Natural gas storage in activated carbon pellets without a binder," *Carbon 40*:87-93, 2002.
Job et al., "Carbon aerogels, cryogels and xerogels: Influence of the drying method on the textural properties of porous carbon materials," *Carbon 43*:2481-2494, 2005.
Job et al., "Highly dispersed platinum catalysts prepared by impregnation of texture-tailored carbon xerogels," *Journal of Catalysis 240*:160-171, 2006.
Job et al., "Synthesis of transition metal-doped carbon xerogels by solubilization of metal salts in resorcinol-formaldehyde aqueous solution," *Carbon 42*:3217-3227, 2004.
Khomenko et al., "High-voltage asymmetric supercapacitors operating in aqueous electrolyte," *Appl. Phys. A 82*:567-573, 2006.
Kim et al., "Correlation between the capacitor performance and pore structure," *Tanso 221*:31-39, 2006 (English Abstract).
Kim et al., "Adsorption of phenol and reactive dyes from aqueous solution on carbon cryogel microspheres with controlled porous structure," *Microporous and Mesoporous Materials 96*:191-196, 2006.
Kocklenberg et al., "Texture control of freeze-dried resorcinol-formaldehyde gels," *Journal of Non-Crystalline Solids 225*:8-13, 1998.
Konno et al., "Preparation of activated carbon having the structure derived from biomass by alkali activation with NaOH, and its application for electric double-layer capacitor," *Tanso 231*:2-7, 2008 (English Abstract).
Kowalczyk et al., "Estimation of the pore-size distribution function from the nitrogen adsorption isotherm. Comparison of density functional theory and the method of Do and co-workers," *Carbon 41*:1113-1125, 2003.
Lozano-Castelló et al., "Influence of pore structure and surface chemistry on electric double layer capacitance in non-aqueous electrolyte," *Carbon 41*:1765-1775, 2003.
Lozano-Castelló et al., "Powdered Activated Carbons and Activated Carbon Fibers for Methane Storage: A Comparative Study," *Energy & Fuels 16*:1321-1328, 2002.
McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status Of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci. 5*:9363-9373, 2012.

(56) References Cited

OTHER PUBLICATIONS

Nishihara et al., "Preparation of resorcinol—formaldehyde carbon cryogel microhoneycombs," *Carbon* 42:899-901, 2004.
Ogasawara et al., "Rechargeable LI2O2 Electrode for Lithium Batteries," *Journal of the American Chemical Society* 128(4): 1390-1393, 2006.
Otowa et al., "Production and adsorption characteristics of MAXSORB: High-surface-area active carbon," *Gas Separation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pimenta et al., "Studying disorder in graphite-based systems by Raman spectroscopy," *Phys. Chem. Chem. Phys.* 9:1276-1291, 2007.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from N2, Ar, and CO2 Adsorption Isotherms," *Langmuir* 16:2311-2320, 2000.
Read, "Ether-Based Electrolytes for the Lithium/Oxygen Organic Electrolyte Battery," *J. Electrochem. Soc.* 153(1):A96-A100, 2006.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of The Electrochemical Society* 147(7):2486-2493, 2000.
Setoyama et al., "Simulation Study On The Relationship Between A High Resolution αs-Plot And The Pore Size Distribution For Activated Carbon," *Carbon* 36(10):1459-1467, 1998.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso Carbon Products, "Special Graphite and Compound Material Products," Toyo Tanso Co., Ltd. Catalog published 2008.
Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Woo et al., "Silicon Embedded Nanoporous Carbon Composite for the Anode of Li Ion Batteries," *Journal of The Electrochemical Society* 159(8):A1273-A1277, 2012.
Wu et al., "Fabrication and nano-structure control of carbon aerogels via a microemulsion-templated sol-gel polymerization method," *Carbon* 44:675-681, 2006.
Xiang et al., "Beneficial effects of activated carbon additives on the performance of negative lead-acid battery electrode for high-rate partial-state-of-charge operation," *Journal of Power Sources* 241:150-158, 2013.
Xie et al., "Pore size control of Pitch-based activated carbon fibers by pyrolytic deposition of propylene," *Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Porous properties of carbon gel microspheres as adsorbents for gas separation," *Carbon* 42:1671-1676, 2004.
Yamamoto et al., "Control of mesoporosity of carbon gels prepared by sol-gel polycondensation and freeze drying," *Journal of Non-Crystalline Solids* 288:46-55, 2001.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte Li/O2 battery," *Journal of Power Sources* 195:1235-1240, 2010.
Zhao et al., "Highly-Ordered Mesoporous Carbon Nitride with Ultrahigh Surface Area and Pore Volume as a Superior Dehydrogenation Catalyst," *Chem. Mater.* 26(10):3151-3161, 2014.
"Chemical Basics of Polymer Insulation Materials: 3.6 Implementation Method of Stepwise Polymerization," in Changming Li (eds.), *HITP Harbin Institute of Technology Press*, 2007, pp. 73 (With English Translation) (4 Pages).
"Determination of density by volumetric displacement—Skeleton density by gas pycnometry," International Standard 1(ISO 12154):2014, (17 pages).
Alias et al., "Silicon/graphite nanocomposite electrodes prepared by low pressure chemical vapor deposition," *Journal of Power Sources* 174:900-904, 2007.
Coppey et al., "Fluidized Bed Chemical Vapor Deposition of Silicon on Carbon Nanotubes for Li-Ion Batteries," *Journal of Nanoscience and Nanotechnology* 11(9):8392-8395, 2011.
Fraas, "Using vibrations in fluidized beds For processes that do not require a high flow rate of sweep gas, the complex-mode vibration fluidized bed offers lower power needs, attrition rates, and elutriation rates than gas-fluidized beds or rotary kilns," *Mechanical Engineering*:76-79, Jan. 7, 1998.
Hogness et al. "The Thermal Decomposition of Silane," *J. Am. Chem. Soc.* 58(1):108-112, 1936.
Katsaros et al., "Preparation and characterisation of gas selective microporous carbobn membranes," *Microporous and Mesoporous Materials* 99:181-189, 2007.

(56) References Cited

OTHER PUBLICATIONS

Webb, "Volume and Density Determinations for Particle Technologists," Micromeritics Instrument Corp., Feb. 16, 2001, Retrieved from http://www.micormeritics.com/pdf/app_articles/density_determinations.pdf (15 pages).

Xu et al., "Comparison of sizing small particles using different technologies," *Powder Technology* 132:145-153, 2003.

Zhang et al., "Highly Reversible and Large Lithium Storage in Mesoporous Si/C Nanocomposite Anodes with Silicon Nanoparticles Embedded in a Carbon Framework," Adv. Mater. 26:6749-6755, 2014.

Figure 1. SEM of an exemplary porous silicon material demonstrating nano-scale features.

Figure 2. Example particle size distribution for porous silicon.

Figure 3. Example particle size distribution for jet milled porous silicon.

Figure 4. Example particle size distribution for non-porous silicon.

Figure 5. Example particle size distribution for jet milled non-porous silicon.

Figure 6. SEM for material according to example 4-1.

Figure 7. SEM for material according to example 4-3.

Figure 8. SEM for material according to example 4-4.

Figure 9. SEM for material according to example 4-5.

Figure 10. SEM for material according to example 4-6.

Figure 11. SEM for material according to example 4-10.

Figure 12. SEM for material according to example 4-11.

Figure 13. SEM for material according to example 4-15

Figure 14. Pore volume distribution for samples 4-1, 4-2, and 4-3.

Figure 15. Pore volume distribution for samples 4-7, 4-9, and 4-10.

Figure 16. XRD for nano-featured porous silicons (lighter curve = heat treated, heavier curve = non-heat treated).

Figure 17. Pore volume distribution for non-treated and heat-treated nano-featured porous silicons.

Figure 18. SEM for heat-treated nano-featured porous silicon.

Figure 19. Differential capacity vs. voltage profile for heat-treated nano-featured silicon in a half-cell (cycle 10).

Figure 20. Voltage profile for heat-treated nano-featured silicon in a half-cell (cycle 10).

Figure 21. SEM for nano-sized nano-featured porous silicon.

Figure 22. XPS in the Si2p region for nano-featured porous silicon.

Figure 23. Extraction capacity and Coulombic efficiency of composite comprising carbon and porous nano-featured silicon accomplished via CVD according to Example 11.

Figure 24. Pore volume distribution of porous nano-featured silicon with and without carbon coating achieved via CVD.

Figure 25. Extraction capacity and Coulombic efficiency of composite comprising carbon and porous nano-featured silicon that was further CVD coated according to Example 12.

Figure 26. Pore volume distribution of composite comprising porous nano featured silicon and pyrolyzed carbon via epoxy- and phosphorus-containing precursors, with and without further carbon coating achieved via CVD.

Figure 27. SEM image for urea-treated and CVD coated porous nano-featured silicon according to Example 15.

Figure 28. Pore volume distributions for urea-treated and urea-treated and CVD carbon-coated porous nano-featured silicon.

Figure 29. FIB SEM for composite comprising porous nano-featured silicon and carbon pyrolyzed from epoxy- and phosphorus-containing precursors: imaged from particle perpendicular (left) and angled (right) to the surface.

Figure 30. EDS analysis of composite comprising porous nano-featured silicon and carbon pyrolyzed from epoxy- and phosphorus-containing precursors: EDS spectra (top) and elemental distribution of silicon (bottom, left) and carbon (bottom, right) within the particle.

Figure 31. Capacity of composite comprising porous nano-featured silicon and carbon pyrolyzed from epoxy- and phosphorus-containing precursors: effect of various electrolytes.

Figure 32. Coulombic efficiency of composite comprising porous nano-featured silicon and carbon pyrolyzed from epoxy- and phosphorus-containing precursors: effect of various electrolytes.

Figure 33. Capacity retention of composite comprising porous nano-featured silicon and carbon pyrolyzed from epoxy- and phosphorus-containing precursors: effect of various graphite types.

Figure 34. Capacity retention and rate performance of composite comprising porous nano-featured silicon and carbon pyrolyzed from epoxy- and phosphorus-containing precursors: effect of graphite content in the anode.

Figure 35. Capacity retention of composite comprising porous nano-featured silicon and carbon pyrolyzed from epoxy- and phosphorus-containing precursors: effect of conductive carbon loading.

Figure 36. Coulombic efficiency of composite comprising porous nano-featured silicon and carbon pyrolyzed from epoxy- and phosphorus-containing precursors: effect of conductive carbon loading.

Figure 37. Coulombic efficiency of composite comprising porous nano-featured silicon and carbon pyrolyzed from epoxy- and phosphorus-containing precursors: effect of binder.

Figure 38. Capacity retention of composite comprising porous nano-featured silicon and carbon pyrolyzed from epoxy- and phosphorus-containing precursors: effect of voltage window.

Figure 39. Differential capacity vs voltage of composite comprising porous nano-featured silicon and carbon pyrolyzed from epoxy- and phosphorus-containing precursors: effect of voltage window.

Figure 40. Rate capability of composite comprising porous nano-featured silicon and carbon pyrolyzed from epoxy- and phosphorus-containing precursors: effect of electrode calendaring.

Figure 41. Capacity retention of composite comprising porous nano-featured silicon and carbon pyrolyzed from epoxy- and phosphorus-containing precursors: effect of electrode calendaring.

Figure 42. Emulsion process for creation of conformal carbon layer around porous nano-featured silicon.

Figure 43. Pore volume distributions for composite of porous nano-featured silicon composited with carbon according to sample 27-6.

Figure 44. Capacity retention vs. cycle for full cell pouch cells for various exemplary composites comprising porous nano-featured silicon and carbon.

Figure 45. Capacity retention vs. cycle for full cell pouch cells for composites comprising carbon and non jet-milled vs. jet milled porous nano featured silicon.

Figure 46. Capacity retention vs. cycle for full cell coin cells for composites comprising carbon and non jet-milled vs. jet milled porous nano featured silicon.

COMPOSITES OF POROUS NANO-FEATURED SILICON MATERIALS AND CARBON MATERIALS

BACKGROUND

Technical Field

The present invention generally relates to porous nano-featured silicon materials, and composite materials comprising carbon and porous nano-featured silicon, specifically composites wherein the porous nano-featured silicon is impregnated with carbon. Related manufacturing methods are also disclosed. The silicon materials exhibit nano-features and extraordinary friability. The porous silicon nano-featured silicon materials and/or carbon-impregnated silicon materials have utility either alone or in combination with other materials, for example, combined with carbon particles, binders, or other components to provide a composition of matter for energy storage applications. Said energy storage applications include employing the materials herein as electrode materials, particularly anode materials, for lithium ion batteries and related energy storage device employing lithium or lithium ions, for instance lithium air batteries. Thus, the present invention also relates to compositions and devices containing such materials and methods related to the same.

Description of the Related Art

Lithium-based electrical storage devices have potential to replace devices currently used in any number of applications. For example, current lead acid automobile batteries are not adequate for next generation all-electric and hybrid electric vehicles due to irreversible, stable sulfate formations during discharge. Lithium ion batteries are a viable alternative to the lead-based systems currently used due to their capacity, and other considerations. Carbon is one of the primary materials used in both lithium secondary batteries and hybrid lithium-ion capacitors (LIC). The carbon anode typically stores lithium in between layered graphite sheets through a mechanism called intercalation. Traditional lithium ion batteries are comprised of a graphitic carbon anode and a metal oxide cathode; however such graphitic anodes typically suffer from low power performance and limited capacity.

Silicon, tin, and other lithium alloying electrochemical modifiers have also been proposed based on their ability to store very large amounts of lithium per unit weight. However, these materials are fundamentally limited by the substantial swelling that occurs when they are fully lithiated. This swelling and shrinkage when the lithium is removed results in an electrode that has limited cycle life and low power. The solution thus far has been to use very small amounts of alloying electrochemical modifier in a largely carbon electrode, but this approach does not impart the desired increase in lithium capacity. Finding a way to increase the alloying electrochemical modifier content in an anode composition while maintaining cycle stability is desired to increase capacity. A number of approaches have been utilized involving nano-structured alloying electrochemical modifier, blends of carbon with alloying electrochemical modifier, or deposition of alloying electrochemical modifier onto carbon using vacuum or high temperature. However none of these processes has proven to combine a scalable process that results in the desired properties.

Current technology for achieving nano sized silicons are expensive and difficult to scale, for instance technologies based on vapor deposition of silicon-containing gases such as silane or trichlorosilane. There continues to be a need in the art for easily scalable, inexpensive, and improved processes for producing porous silicon materials comprising nano-sized particles and/or exhibiting nano-features that, upon combination with a suitable hard carbon material, can generate the desired electrochemical properties. The current invention meets this need, and provides further related advantages.

BRIEF SUMMARY

In general terms, the current invention is directed to porous silicon materials, and their manufacturing, and composites comprising the porous silicon materials and carbon materials, and their manufacturing. The porous silicon materials and the composites that contain the porous silicon materials and carbon materials provide optimized lithium storage and utilization properties. The novel porous silicon and composite materials find utility in any number of electrical energy storage devices, for example as electrode material in lithium-based electrical energy storage devices (e.g., lithium ion batteries). Electrodes comprising the porous silicon and composite materials display high reversible capacity, high first cycle efficiency, high power performance or any combination thereof. The present inventors have discovered that such improved electrochemical performance is related, at least in part, to the porous silicon and carbon materials physical and chemical properties such as surface area, pore structure, crystallinity, surface chemistry and other properties as well as the approaches used to manufacture and compound the materials.

Accordingly, in one embodiment, the present disclosure provides for the manufacturing of a porous silicon material with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield porous silicon particles with nano-sized features; and
  c) removing the liquid medium to yield dried porous silicon particles with nano-sized features.

Accordingly, in another embodiment, the present disclosure provides for the manufacturing of a polymer-impregnated porous silicon material with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield porous silicon particles with nano-sized features;
  c) removing the liquid medium to yield dried porous silicon particles with nano-sized features;
  d) blending a mixture of polymer(s) and/or polymer precursor(s) with the porous silicon particles with nano-sized features
  e) storing the mixture of polymer(s) and/or polymer precursor(s) and the porous silicon particles with nano-sized features for a period of time at sufficient temperature to allow for impregnation of the polymer(s)

and/or impregnation and polymerization of the polymer precursor(s) within the porous silicon particles to yield a polymer-impregnated silicon particle with nano-sized features.

Accordingly, in another embodiment, the present disclosure provides for the manufacturing of a composite silicon-carbon material, wherein the silicon material is a porous silicon material with nano-sized features. For example, the process may comprise the following steps:
 a) suspending particles of a silicon alloy in a liquid medium containing a dissolved acid;
 b) storing the suspended particles for a period of time at sufficient temperature to allow for etching away of metal cations from the silicon alloy to yield porous silicon particles with nano-sized features;
 c) removing the liquid medium to yield dried porous silicon particles with nano-sized features;
 d) blending a mixture of polymer(s) and/or polymer precursor(s) with the porous silicon particles with nano-sized features;
 e) storing the mixture of polymer(s) and/or polymer precursor(s) and the porous silicon particles with nano-sized features for a period of time at sufficient temperature to allow for impregnation of the polymer(s) and/or impregnation and polymerization of the polymer precursor(s) within the porous silicon particles with nano-sized features to yield a polymer-impregnated silicon particles with nano-sized features; and
 f) pyrolysis of the polymer-impregnated silicon particles with nano-sized features to yield a composite silicon-carbon material, wherein the silicon material is a porous silicon material with nano-sized features.

Accordingly, in one embodiment, the present disclosure provides for the manufacturing of a highly friable silicon material with nano-sized features. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features; and
 c) removing the liquid medium to yield dried highly friable silicon material with nano-sized features.

Accordingly, in another embodiment, the present disclosure provides for the manufacturing of a nano-sized porous silicon particle with nano-sized features. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features;
 c) removing the liquid medium to yield dried highly friable silicon material with nano-sized features; and
 d) particle size reduction of the highly friable silicon material with nano-sized features to yield nano-sized silicon particles with nano-sized features.

The particle size reduction in the above embodiment can be carried out as known in the art, for example by jet milling in the presence of various gases including air, nitrogen, argon, helium, supercritical steam, and other gases known in the art. Other particle size reducing methods are known in the art, such as ball milling, attrition milling, cryogenic grinding, and the like.

Accordingly, in another embodiment, the present disclosure provides for the manufacturing of a composite silicon-carbon material, wherein the silicon material is a nano-sized silicon material with nano-sized features. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features;
 c) removing the liquid medium to yield dried highly friable silicon material with nano-sized features;
 d) particle size reduction of the highly friable silicon material with nano-sized features to yield nano-sized silicon particles with nano-sized features;
 e) blending a mixture of polymer(s) and/or polymer precursor(s) with the nano-sized silicon particles with nano-sized features
 f) storing the mixture of polymer(s) and/or polymer precursor(s) and the nano-sized silicon particles with nano-sized features for a period of time at sufficient temperature to allow for impregnation of the polymer(s) and/or impregnation and polymerization of the polymer precursor(s) within the nano-sized silicon particles with nano-sized features to yield polymer-impregnated nano-sized silicon particles with nano-sized features; and
 g) pyrolysis of the polymer-impregnated silicon particles to yield a composite silicon-carbon material, wherein the silicon material is a nano-sized silicon material with nano-sized features.

Accordingly, in some embodiment the present disclosure provides a porous carbon-impregnated silicon material having high first cycle efficiency and high eversible capacity when incorporated into an electrode of lithium based energy storage device. In some embodiments, the lithium based electrical energy storage device is a lithium ion battery or lithium ion capacitor.

These and other aspects of the invention will be apparent upon reference to the following detailed description. To this end, various references are set forth herein which describe in more detail certain background information, procedures, compounds and/or compositions, and are each hereby incorporated by reference in their entirety.

DETAILED DESCRIPTION

Figure 1:
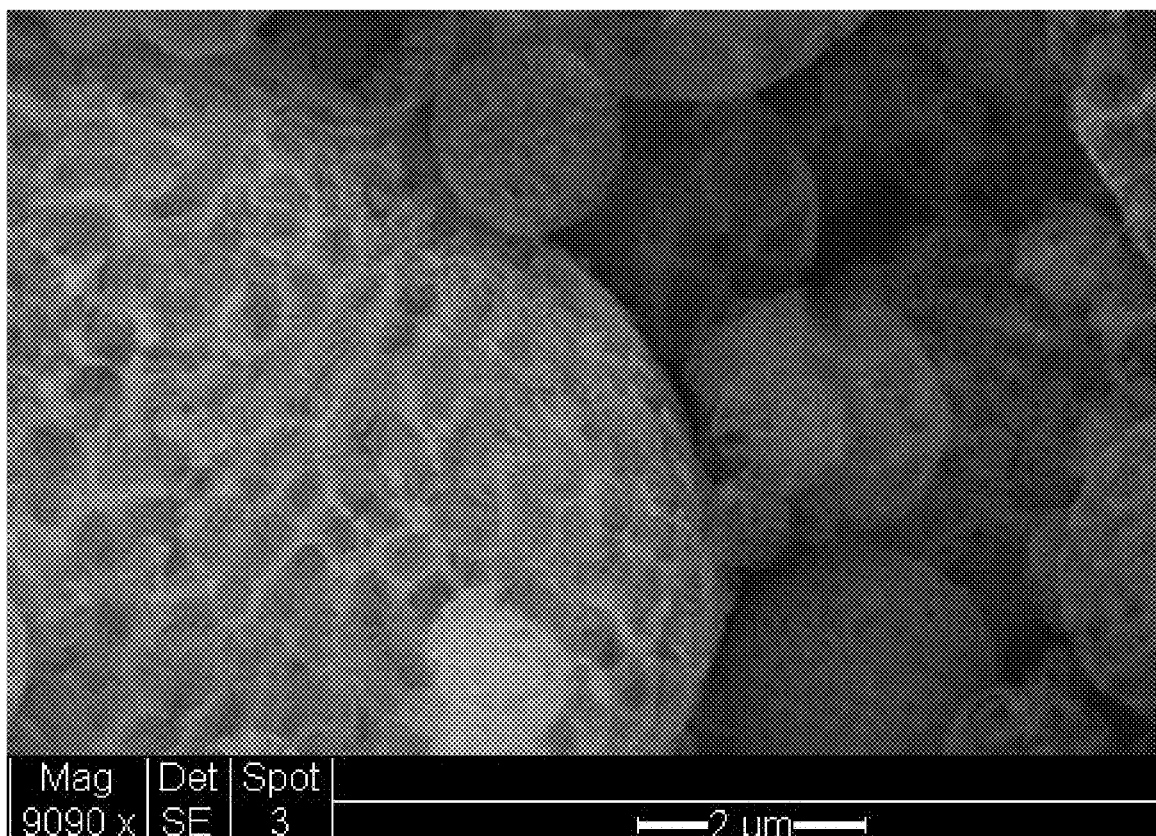
FIG. 1. SEM of an exemplary porous silicon material demonstrating nano-scale features.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Energy storage material" refers to a material capable of storing electrical charge, for example in the form of physically entrained electrolytes. Energy storage materials are capable of being charged and discharged. Examples of energy storage materials include, but are not limited to, carbon, for example activated carbon, silicon, sulfur, lithium, and combinations thereof. Energy storage materials may be used in the form of particles, or combinations of inter- and/or intra-particle blends of particles. Energy storage particles can be assembled into electrodes employing dry processing or aqueous or non-aqueous slurry processing as described in the art.

"Carbon material" refers to a material or substance comprised substantially of carbon. Examples of carbon materials include, but are not limited to, activated carbon, pyrolyzed carbon, hard carbon, graphite, and other allotropes of carbon.

"Impurity" or "impurity element" refers to a foreign substance (e.g., a chemical element) within a material, which differs from the chemical composition of the base material. For example, an impurity in a carbon material refers to any element or combination of elements, other than carbon, which is present in the carbon material. Impurity levels are typically expressed in parts per million (ppm).

"TXRF impurity" is any impurity element as detected by total x-ray fluorescence (TXRF). The phrases "total TXRF impurity content" and "total TXRF impurity level" both refer to the sum of all TXRF impurities present in a sample, for example, a polymer gel or a carbon material, or a silicon material, or a composite material comprising carbon and silicon.

"Ash content" refers to the nonvolatile inorganic matter that remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a molecule comprised of two or more structural repeating units.

"Synthetic polymer precursor material" or "polymer precursor" refers to the compounds used in the preparation of a synthetic polymer. Examples of polymer precursors that can be used in the preparations disclosed herein include, but are not limited to aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel as described herein can be any compound that facilitates the polymerization of the polymer precursors to form a polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Carbonizing", "pyrolyzing", "carbonization" and "pyrolysis" each refer to the process of heating a carbon-containing substance at a pyrolysis dwell temperature in an inert atmosphere (e.g., argon or nitrogen) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution, and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores. Pores larger than about 50 nanometers are referred to as "macropores".

"Surface area" refers to the total specific surface area of a substance measurable by the BET technique. Surface area is typically expressed in units of m2/g. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Binder" refers to a material capable of holding individual particles of carbon together such that after mixing a binder and carbon together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Composite material" refers to a composition comprising both carbon materials and porous silicon materials. The two populations of materials may be intimately integrated through chemical bonding or may be a distinct mixture between two powders.

"Allotrope" refers to a material which can exists in different forms. C60, graphene, diamond, hard carbon, soft carbon, graphite, and carbon nanotubes are all examples of carbon allotropes. "Hard Carbon" refers to a non-graphitizable carbon material. At elevated temperatures (e.g., >1500° C.) a hard carbon remains substantially amorphous, whereas a "soft" carbon will undergo crystallization and become graphitic.

"Lithium uptake" refers to a carbon's ability to intercalate, absorb, or store lithium as measured as a ratio between the maximum number of lithium atoms to 6 carbon atoms.

"Nano-sized" means the material (e.g., silicon) has at least one dimension on the order of nanometers, for example at least one dimension less than 1 micron. For energy storage applications, the preferred silicon size is less than 1 micron, preferable less than 800 nm, preferably less than 300 nm, preferably less than 150 nm, preferably less than 100 nm, preferably less than 50 nm, preferably less than 30 nm, preferably less than 15 nm. A silicon particle of the dimensions described above is generally referred to as a nano-sized silicon particle. The particle size is typically described as the Dv,50 or silicon particle size at 50% of the volume distribution, as measured by various methods known in the art, for instance by laser diffraction particle sizing techniques.

Alternatively, or in addition the silicon exhibiting a primary particle size in the ranges described above, the silicon particle can also exhibit nano features. "Nanofeatures" refer to features, such as pores and the like, having a dimension on the order of nanometers, for example less than 1 micron. A "nano-featured" material is one which comprises nanofeatures. The silicon nano-features preferably comprise a nano feature size less than 1 micron, preferably less than 300 nm, preferably less than 150 nm, preferably less than 100 um, preferably less than 50 nm, preferably less than 30 nm, preferably less than 15 nm. A silicon particle with the features described above is generally referred to as a silicon particle with nano-sized features. The nano-sized features can be discerned by various methods known in the art, for instance by scanning electron microscopy.

"Friability," is defined as the % reduction in volume average particle size upon employing standard jet milling processing as known in the art.

A. Porous Silicon Materials

Embodiments of the present invention relate to the preparation of porous silicon materials, for instance porous silicon particles, and their further processing into composite materials, for example, carbon-impregnated silicon particles. The porous silicon particles can be produced by various means as described in the art. For instance, solid silicon can be etched, for example employing a strong acid, such as HF or HNO3, to make pores directly into a solid silicon particle. In this case, the porosity within the silicon particle arising directly from the pores formed on the surface of the silicon particle, rather than inter-crystalline spaces.

Another approach described in the art to create porous silicon particles is to treat a silicon alloy, for example an aluminum silicon alloy, with an acid to remove the metal, resulting in a porous silicon particle. In this case, the porosity within the silicon particle is not due to pores formed on the surface of the silicon particle, but rather is due to inter-crystalline spaces. It is theorized that this arrangement is preferred for electrochemical applications, wherein the significant volume changes that occur in the silicon materials can be accommodated.

Accordingly, in one embodiment, the present disclosure provides for the manufacturing of a porous silicon material with nano-sized features. For example, the process may comprise the following steps:

a) suspending particles of a silicon alloy in a liquid medium containing a dissolved acid;

b) storing the suspended particles for a period of time at sufficient temperature to allow for erosion of metal cations from the silicon alloy in to the liquid medium to yield porous silicon particles with nano-sized features; and c) removing the liquid medium to yield dried porous silicon particles with nano-sized features.

The silicon alloy may be comprised of an aluminum silicon alloy. The aluminum silicon alloy may have another metal present in addition to aluminum, for example chromium, copper or magnesium. Examples of aluminum silicon alloys include, but are not limited to, alusis, avional, and silumin. The silicon alloy may be comprised of an iron silicon alloy. The iron silicon alloy, may have another metal present in addition to iron, for example chromium, copper or magnesium. An example iron silicon alloy is ferrosilicon. The silicon alloy may also be comprised of a nickel silicon alloy. The nickel silicon alloy may have another metal present in addition to nickel, for example chromium, copper or magnesium. Examples of silicon nickel alloys include, but are not limited to, nicrosil and nisil. Examples of other silicon alloys include, but are not limited to, silicon germanium alloys, silicon tin alloys, and silicon gold alloys.

The silicon alloy particles may be present as primary particles, or as particle agglomerates, provided that there is sufficient access of the liquid to the particle surface to allow for the erosion of the metal cations previously comprising the silicon metal in to the liquid medium. The size of the silicon alloy particles can vary. In some embodiments, the silicon alloy particles are comprised of particles below 1000 um, for example below 100 um, for example below 10 um, for example below 1 um. In certain embodiments, the silicon alloy particles are comprised of particles below 100 nm, for example 10 nm, for example 1 nm. In certain embodiments, the silicon alloy particles are comprised of particles between 1 and 1000 nm, for example between 1 and 10 nm, for example between 10 and 100 nm, for example, between 100 and 1000 nm. In certain embodiments, the silicon alloy particles are comprised of particles between 1 and 1000 um, for example between 1 and 10 um, for example between 10 and 100 um, for example, between 100 and 1000 um. In some embodiments, the silicon alloy particles are greater than 100 um.

The liquid media for suspending the silicon alloy particles may be aqueous. In other embodiments, the liquid media for suspending the silicon alloy particles may be non-aqueous. In certain embodiments, the liquid media may be multi-phase, for example, be comprised of aqueous and non-aqueous phases. In certain embodiments, the liquid media may be a suspension or emulsion. In certain further embodiments, the liquid media may be multi-phase wherein the silicon alloy particles, are preferentially retained in a different phase compared to the porous silicon particles. In certain further embodiments, the liquid media may be multi-phase wherein the acid and metal cations are preferentially retained in a different phase compared to the porous silicon particles. The acid dissolved within the liquid medium can be either an organic acid or an inorganic acid. Suitable acids in this context are described in the art. In one embodiment, the acid is hydrochloric acid.

The silicon alloy can be etched employing a number of different etchants. Without being bound by theory, the etchants are typically acids or other chemical moieties capable of disrupting the interactions between the silicon atoms and the corresponding alloy atoms, for instance between silicon atoms and aluminum atoms in an aluminum-silicon alloy. Preferably, etchant's milieu is capable of dissolving the alloy atom counter ion in the form of a dissolved salt. For example, a preferred milieu for etching aluminum silicon alloy is capable of dissolving aluminum ions into an aluminum salt. One embodiment comprises aqueous hydrochloric acid as the etchant to etch the aluminum in the aluminum-silicon alloy and yield aluminum in the form of aluminum chloride, which is soluble in the aqueous medium.

Examples of etchants acids include, but are not limited to organic and inorganic acids, and mixtures thereof. Examples of inorganic acids in the context of etching a silicon-metal alloy include, but are not limited to, hydrochloric acid, hydrofluoric acid, sulfurous acid, sulfuric acid, hyposulfurous acid, persulfuric acid, pyrosulfuric acid, disulfurous acid, dithionous acid, tetrathionic acid, thiosulfurous acid, hydrosulfuric acid, peroxydisulfuric acid, perchloric acid, hypochlorous acid, chlorous acid, chloric acid, hyponitrous acid, nitrous acid, nitric acid, pernitric acid, carbonous acid, carbonic acid, hypocarbonous acid, percarbonic acid, phosphoric acid, phosphorous acid, hypophosphous acid, perphosphoric acid, hypophosphoric acid, pyrophosphoric acid, hydrophosphoric acid, hydrobromic acid, bromous acid, bromic acid, hypobromous acid, hypoiodous acid, iodous acid, iodic acid, periodic acid, hydroiodic acid, fluorous acid, fluoric acid, hypofluorous acid, perfluoric acid, hydrofluoric acid, chromic acid, chromous acid, hypochromous acid, perchromic acid, hydroselenic acid, selenic acid, selenous acid, hydronitric acid, boric acid, molybdic acid, perxenic acid, silicofluoric acid, telluric acid, tellurous acid, tungstic acid, xenic acid, pyroantimonic acid, permanganic acid, manganic acid, antimonic acid, antimonous acid, silicic acid, titanic acid, arsenic acid, pertechnetic acid, hydroarsenic acid, dichromic acid, tetraboric acid, metastannic acid, hypooxalous acid, ferricyanic acid, silicous acid, hydrocyanic acid, thiocyanic acid, uranic acid, and diuranic acid. In certain embodiments, mixtures of inorganic acids are employed.

Examples of organic acids in the context of etching a silicon-metal alloy include, but are not limited to, formic acid, citric acid, oxalic acid, cyanic acid, cyanuric acid, malonic acid, tartaric acid, glutamic acid, glucaric acid, gluconic acid, phthalic acid, azelaic acid, barbituric acid, benzilic acid, cinnamic acid, fumaric acid, glutaric acid, hexanoic acid, lactic acid, malic acid, oleic acid, folic acid, propiolic acid, propionic acid, rosolic acid, stearic acid, tannic acid, trifluoroacetic acid, uric acid, ascorbic acid, gallic acid, acetylsalicylic acid, propanoic acid, butyric acid, and acetic acid. In certain embodiments, mixtures of organic acids are employed. In certain other embodiments, one or more organic acids and one or more inorganic acids are combined.

In certain embodiments, the etchant comprises water. In certain other embodiments, the aqueous etchant solution further comprises one or more water-miscible co-solvents. In certain embodiments, the water-miscible co-solvent is also the etchant species, for example the water-miscible co-solvent is sulfuric acid, nitric acid, hydrochloric acid, hydrofluoric acid, acetic acid, butyric acid, formic acid, or propanoic acid. Exemplary water-miscible co-solvents include, but are not limited to, acetone, acetonitrile, 1,2-Butanediol, 1,3-Butanediol, 1,4-Butanediol, 2-Butoxyethanol, butyric acid, diethanolamine, diethylenetriamine, dimethylformamide, dimethoxyethane, dimethyl sulfoxide, 1,4-Dioxane, ethanol, ethylamine, ethylene glycol, formic acid, furfuryl alcohol, glycerol, methanol, methyl diethanolamine, methyl isocyanide, 1-propanol, 1,3-propanediol. 1,5-pentanediol, 2-propanol, propylene glycol, pyridine, tetrahydrofuran, triethylene glycol, 2-dimethylhydrazine, hydrazine, or hydrogen peroxide.

In certain embodiments, the etchant comprises a non-aqueous solvent, or a mixture of aqueous and non-aqueous solvents to form an emulsion or suspension. Examples of organic solvents in this context includes, but are not limited to benzene, benzyl alcohol, butanol, t-butyl alcohol, 1-butanol, 2-butanol, 2-butanone, carbon tetrachloride, chloroform, chlorobenzene, dichloromethane, diethylene glycol, diethyl ether, dimethylformamide, dimethylsulfoxide, glycerin, heptane, mineral oils, pyridine, methylene chloride, nitromethane, toluene, and xylenes. Additional organic solvents are known in the art.

Certain etchant mixtures are known in the art. One example is Krolls reagent comprising water, nitric acid, and hydrofluoric acid. A further example is aqua regia, comprising nitric acid and hydrochloric acid. As another example, Kellers etch, comprising nitric acid, hydrochloric acid, and hydrofluoric acid and water is reported as a suitable etchant for most aluminum alloys. Alternatively, a combination of methanol, hydrochloric acid, nitric acid, and hydrofluoric acid is known as a suitable etchant for aluminum-magnesium-silicon alloys. Another example is Piranha solution, also known as piranha etch, comprising sulfuric acid and hydrogen peroxide, which can additionally be employed to hydroxylate most surfaces (add OH groups), for example, hydroxylation of the etched silicon surface to provide a silicon oxide surface layer.

In some embodiments, the porous silicon particles can be removed from the liquid medium by a variety of means. For example, the liquid medium can be removed by ambient drying, drying at elevated temperature, with or without vacuum. In preferred embodiments, the porous silicon particles are washed prior to drying to remove residual metal salts, for example in the case wherein a silicon-aluminum alloy is etched with hydrochloric acid, the resulting porous silicon can be washed one or more times with deionized water to remove residual aluminum chloride remaining in the porous silicon. Prior to drying, the porous silicon particles can be concentrated by various means, for example by settling, or by centrifugation. In preferred embodiments, the removal of the liquid medium is conducted such that the porosity within the silicon particle due to inter-crystalline spaces is retained, and any collapse or otherwise inducement of agglomeration is avoided.

The particle size of the porous silicon can be according to the size of the starting silicon alloy particles. The porous silicon particles may be primary particles, or particle agglomerates. In some embodiments, the porous silicon particles are comprised of particles below 1000 um, for example below 100 um, for example below 10 um, for example below 1 um. In certain embodiments, the porous silicon particles are comprised of particles below 100 nm, for example 10 nm, for example 1 nm. In certain embodiments, the porous silicon particles are comprised of particles between 1 and 1000 nm, for example between 1 and 10 nm, for example between 10 and 100 nm, for example, between 100 and 1000 nm. In certain embodiments, the porous silicon particles are comprised of particles between 1 and 1000 um, for example between 1 and 10 um, for example between 10 and 100 um, for example, between 100 and 1000 um. In some embodiments, the porous silicon particles are greater than 100 um. In one embodiment, the porous silicon is comprised of particles of about 1 micron. In one embodiment, the porous silicon is comprised of particles of about 5 micron. In one embodiment, the porous silicon is comprised of particles of about 20 micron.

The pH of the silicon particles can vary, for example the pH can be acidic, for example less than pH 6, for example less than pH 5, for example less than pH 4. In other embodiments, the pH of the silicon particles can be neutral, for example between pH 6 and pH 8. In certain other embodiments, the pH can be basic, for example greater than pH 8, for example greater than pH 9, for example greater than pH 10.

In certain embodiments, the residual alloy metal within the porous silicon particles can vary, for example between 10 to 90%, for example between 20-80%, for example between 30-70%, for example, between 40-70%, for example about 50%. In certain other embodiments, the residual aluminum content can be between 1 and 10%. In certain other embodiments, the residual alloy metal content can be below 1%, for example below 0.1%, for example below 0.01%.

In certain embodiments, the silicon alloy employed to produce porous silicon particles is an aluminum alloy, and the residual content of aluminum within the porous silicon particles can vary, for example between 10 to 90%, for example between 20-80%, for example between 30-70%, for example, between 40-70%, for example about 50%. In certain other embodiments, the residual aluminum content can be between 1% and 30%. In certain embodiments, the residual aluminum is between 10% and 30%. In certain embodiments, the residual aluminum is between 20% and 30%. In certain other embodiments, the residual aluminum content can be below 1%, for example below 0.1%, for example below 0.01%.

The oxygen content in the porous silicon particles can be less than 50%, for example, less than 30%, for example less than 20%, for example less than 15%, for example, less than 10%, for example, less than 5%, for example, less than 1%, for example less than 0.1%. In certain embodiments, the oxygen content in the porous silicon materials is between 1 and 30%. In certain embodiments, the oxygen content in the porous silicon materials is between 1 and 20%. In certain embodiments, the oxygen content in the porous silicon materials is between 1 and 10%. In certain embodiments, the oxygen content in the porous silicon materials is between 5 and 10%.

In certain embodiments wherein the silicon contains oxygen, the oxygen is incorporated such that the silicon exists as a mixture of silicon and silicon oxides of the general formula SiOx, where x is a non-integer (real number) can vary continuously from 0.01 to 2. In certain embodiments, the fraction of oxygen present on the surface of the nano-feature porous silicon is higher compared to the interior of the particle.

In certain embodiments, the porous silicon particles are comprised of crystalline silicon. In certain embodiments, the porous silicon particles are comprised of polycrystalline silicon. In certain embodiments, the porous silicon particles are comprised of micro-polycrystalline silicon. In certain embodiments, the porous silicon particles are comprised of nano-polycrystalline silicon. In certain other embodiments, the porous silicon particles are comprised of amorphous silicon. In certain other embodiments, the porous silicon particles are comprised of both crystalline and non-crystalline silicon.

In certain embodiments, the porous silicon particles are spherical. In certain other embodiments, the porous silicon particles are non-spherical, for example rod-like, or fibrous in structure.

In preferred embodiments, the porous silicon particles comprise nano-sized features. The nano-sized features can have a characteristic length scale of preferably less than 1 um, preferably less than 300 nm, preferably less than 150 nm, preferably less than 100 um, preferably less than 50 nm, preferably less than 30 nm, preferably less than 15 nm, preferably less than 10 nm, preferably less than 5 nm.

In certain embodiments, the porous silicon is highly friable and comprises nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield highly friable silicon material with nano-sized features; and c) removing the liquid medium to yield dried highly friable silicon material with nano-sized features.

Accordingly, the present disclosure provides for the manufacturing of a nano-sized porous silicon particle with nano-sized features. For example, the process may comprise the following steps:

a) suspending particles of a silicon alloy in a liquid medium containing a dissolved acid;

b) storing the suspended particles for a period of time at sufficient temperature to allow for erosion of metal cations from the silicon alloy in to the liquid medium to yield highly friable silicon material with nano-sized features;

c) removing the liquid medium to yield dried highly friable silicon material with nano-sized features; and d) particle size reduction of the friable silicon material with nano-sized features to yield nano-sized silicon particles with nano-sized features.

The particle size reduction in the above embodiment can be carried out as known in the art, for example by jet milling in the presence of various gases including air, nitrogen, argon, helium, supercritical steam, and other gases known in the art.

In some embodiments, the surface area of the porous silicon particles can be greater than 500 m2/g. In other embodiments, the surface area of the porous silicon particles can be less than 500 m2/g. In some embodiments, the surface area of the porous silicon particles is between 200 and 500 m2/g. In some embodiments, the surface area of the porous silicon particles is between 100 and 200 m2/g. In some embodiments, the surface area of the porous silicon particles is between 50 and 100 m2/g. In some embodiments, the surface area of the porous silicon particles is between 10 and 50 m2/g. In some embodiments, the surface area of the porous silicon particles can be less than 10 m2/g.

B. Composites Comprising Porous Silicon and Carbon Materials

As noted above, traditional lithium based energy storage devices comprise graphitic anode material. The disadvantages of graphitic carbon are numerous in lithium ion batteries. For one, the graphite undergoes a phase and volume change during battery operation. That is, the material physically expands and contracts when lithium is inserted between the graphene sheets while the individual sheets physically shift laterally to maintain a low energy storage state. Secondly, graphite has a low capacity. Given the ordered and crystalline structure of graphite, it takes six carbons to store one lithium ion. The structure is not able to accommodate additional lithium. Thirdly, the movement of lithium ions is restricted to a 2D plane, reducing the kinetics and the rate capability of the material in a battery. This means that graphite does not perform well at high rates where power is needed. This power disadvantage is one of the limiting factors for using lithium ion batteries in all-electric vehicles.

The porous silicon particles can be combined with carbons materials to create a composite material. In some embodiments, the composite is a plurality of porous silicon particles and particles comprising carbon materials. In a preferred embodiment, the composite material is comprised of particles, wherein individual particles comprise both porous silicon and carbon materials. In further preferred embodiments the composite material is comprised of particles, wherein individual particles comprise both porous silicon with carbon materials impregnated within the porous silicon structure.

In one embodiment, the present disclosure provides for the manufacturing of a polymer-impregnated porous silicon material with nano-sized features. For example, the process may comprise the following steps:

a) suspending particles of a silicon alloy in a liquid medium containing a dissolved acid;

b) storing the suspended particles for a period of time at sufficient temperature to allow for erosion of metal cations from the silicon alloy in to the liquid medium to yield porous silicon particles with nano-sized features;

c) removing the liquid medium to yield dried porous silicon particles with nano-sized features;

d) blending a mixture of polymer(s) and/or polymer precursor(s) with the porous silicon particles with nano-sized features;

e) storing the mixture of polymer(s) and/or polymer precursor(s) and the porous silicon particles with nano-sized features for a period of time at sufficient temperature to allow for impregnation of the polymer(s) and/or impregnation and polymerization of the polymer precursor(s) within the porous silicon particles to yield a polymer-impregnated silicon particle with nano-sized features.

Accordingly, in another embodiment, the present disclosure provides for the manufacturing of a composite silicon-carbon material, wherein the silicon material is a porous silicon material with nano-sized features. For example, the process may comprise the following steps:

a) suspending particles of a silicon alloy in a liquid medium containing a dissolved acid;

b) storing the suspended particles for a period of time at sufficient temperature to allow for etching away of metal cations from the silicon alloy to yield porous silicon particles with nano-sized features;

c) removing the liquid medium to yield dried porous silicon particles with nano-sized features;

d) blending a mixture of polymer(s) and/or polymer precursor(s) with the porous silicon particles with nano-sized features;

e) storing the mixture of polymer(s) and/or polymer precursor(s) and the porous silicon particles with nano-sized features for a period of time at sufficient temperature to allow for impregnation of the polymer(s) and/or impregnation and polymerization of the polymer precursor(s) within the porous silicon particles with nano-sized features to yield a polymer-impregnated silicon particles with nano-sized features; and f) pyrolysis of the polymer-impregnated silicon particles with nano-sized features to yield a composite silicon-carbon material, wherein the silicon material is a porous silicon material with nano-sized features.

In another embodiment, the present disclosure provides for the manufacturing of a composite silicon-carbon material, wherein the silicon material is a nano-sized silicon material with nano-sized features. For example, the process may comprise the following steps:

a) suspending particles of a silicon alloy in a liquid medium containing a dissolved acid;

b) storing the suspended particles for a period of time at sufficient temperature to allow for erosion of metal cations from the silicon alloy in to the liquid medium to yield highly friable silicon material with nano-sized features;

c) removing the liquid medium to yield dried highly friable silicon material with nano-sized features;
d) particle size reduction of the highly friable silicon material with nano-sized features to yield nano-sized silicon particles with nano-sized features;
e) blending a mixture of polymer(s) and/or polymer precursor(s) with the nano-sized silicon particles with nano-sized features;
f) storing the mixture of polymer(s) and/or polymer precursor(s) and the nano-sized silicon particles with nano-sized features for a period of time at sufficient temperature to allow for impregnation of the polymer(s) and/or impregnation and polymerization of the polymer precursor(s) within the nano-sized silicon particles with nano-sized features to yield polymer-impregnated nano-sized silicon particles with nano-sized features; and
g) pyrolysis of the polymer-impregnated silicon particles to yield a composite silicon-carbon material, wherein the silicon material is a nano-sized silicon material with nano-sized features.

Methods for preparing the carbon materials from polymer precursors are known in the art. For example, methods for preparation of carbon materials are described in U.S. Pat. Nos. 7,723,262 and 8,293,818; and U.S. patent application Ser. Nos. 12/829,282; 13/046,572; 13/250,430; 12/965,709; 13/336,975 and 13/486,731, the full disclosures of which are hereby incorporated by reference in their entireties for all purposes. Accordingly, in one embodiment the present disclosure provides a method for preparing any of the carbon materials or polymer gels described above. The carbon materials may be synthesized through pyrolysis of either a single precursor, for example a saccharide material such as sucrose, fructose, glucose, dextrin, maltodextrin, starch, amylopectin, amlyose, ligin, gum Arabic, and other saccharides known in the art, and combinations thereof. Alternatively, the carbon materials may be synthesized through pyrolysis of a complex resin, for instance formed using a sol-gel method using polymer precursors such as phenol, resorcinol, bisphenol A, urea, melamine, and other suitable compounds known in the art, and combinations thereof, in a suitable solvent such as water, ethanol, methanol, and other solvents known in the art, and combinations thereof, with cross-linking agents such as formaldehyde, furfural, and other cross-lining agents known in the art, and combinations thereof. The resin may be acid or basic, and may contain a catalyst. The catalyst may be volatile or non-volatile. The pyrolysis temperature and dwell time can vary as known in the art.

In some embodiments, the methods comprise preparation of a polymer gel by a sol gel process, condensation process or crosslinking process involving monomer precursor(s) and a crosslinking agent, two existing polymers and a crosslinking agent or a single polymer and a crosslinking agent, followed by pyrolysis of the polymer gel. The polymer gel may be dried (e.g., freeze dried) prior to pyrolysis. However drying is not required and in some embodiments is not desired. The sol gel process provides significant flexibility such that an electrochemical modifier can be incorporated at any number of steps. In one embodiment, a method for preparing a polymer gel comprising an electrochemical modifier is provided. In another embodiment, methods for preparing pyrolyzed polymer gels are provided. Details of the variable process parameters of the various embodiments of the disclosed methods are described below.

The target carbon properties can be derived from a variety of polymer chemistries provided the polymerization reaction produces a resin/polymer with the necessary carbon backbone. Different polymer families include novolacs, resoles, acrylates, styrenics, ureathanes, rubbers (neoprenes, styrene-butadienes, etc.), nylons, etc. The preparation of any of these polymer resins can occur via a number of different processes including sol gel, emulsion/suspension, solid state, solution state, melt state, etc for either polymerization and crosslinking processes.

The polymer gel may be prepared by a sol gel process. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. Other polymer precursors include nitrogen containing compounds such as melamine, urea and ammonia.

In some embodiments an electrochemical modifier is incorporated into the material as polymer. For example, the organic or carbon containing polymer, RF for example, is copolymerized with the polymer, which contains the electrochemical modifier. In one embodiment, the electrochemical modifier-containing polymer contains silicon. In one embodiment the polymer is tetraethylorthosiliane (TEOS). In one embodiment, a TEOS solution is added to the RF solution prior to or during polymerization. In another embodiment the polymer is a polysilane with organic side groups. In some cases these side groups are methyl groups, in other cases these groups are phenyl groups, in other cases the side chains include phenyl, pyrol, acetate, vinyl, siloxane fragments. In some cases the side chain includes a group 14 element (silicon, germanium, tin or lead). In other cases the side chain includes a group 13 element (boron, aluminum, boron, gallium, indium). In other cases the side chain includes a group 15 element (nitrogen, phosphorous, arsenic). In other cases the side chain includes a group 16 element (oxygen, sulfur, selenium).

In another embodiment the electrochemical modifier is a silole. In some cases it is a phenol-silole or a silafluorene. In other cases it is a poly-silole or a poly-silafluorene. In some cases the silicon is replaced with germanium (germole or germafluorene), tin (stannole or stannaflourene) nitrogen (carbazole) or phosphorous (phosphole, phosphafluorene). In all cases the heteroatom containing material can be a small molecule, an oligomer or a polymer. Phosphorous atoms may or may not be also bonded to oxygen.

In certain embodiments, the electrochemical modifier is silicon. In certain preferred embodiments, the electrochemical modifier is a nano-featured silicon. In certain further preferred embodiments, the electrochemical modifier is a nano-sized silicon. In certain further preferred embodiments, the electrochemical modifier is a nano sized and comprises nano features.

In certain cases the heteroatom containing polymer can be a physical mixture with the carbon polymer. In another case it can be a copolymer. In another case a block or multi-block copolymer.

In another embodiment the electrochemical modifier is a silicon dendrimer. In one case it is a first generation dendrimer. In another case it is a higher generation dendrimer. In some embodiments the polymer and dendrimer form a mixture. In other embodiments the dendrimer is covalently bonded to the polymer. In other embodiments the dendrimer is ionically bonded to the polymer.

In some embodiments the reactant contains phosphorous. In certain other embodiments, the phosphorus is in the form of phosphoric acid. In certain other embodiments, the phosphorus can be in the form of a salt, wherein the anion of the salt comprises one or more phosphate, phosphite, phosphide, hydrogen phosphate, dihydrogen phosphate, hexafluorophosphate, hypophosphite, polyphosphate, or pyrophosphate ions, or combinations thereof. In certain other embodiments, the phosphorus can be in the form of a salt, wherein the cation of the salt comprises one or more phosphonium ions. The non-phosphate containing anion or cation pair for any of the above embodiments can be chosen for those known and described in the art. In the context, exemplary cations to pair with phosphate-containing anions include, but are not limited to, ammonium, tetraethylammonium, and tetramethylammonium ions. In the context, exemplary anions to pair with phosphate-containing cations include, but are not limited to, carbonate, dicarbonate, and acetate ions.

In some cases the crosslinker is important because of its chemical and electrochemical properties. In other cases the crosslinker is important because it locks in the polymer geometry. In other cases both polymer geometry and chemical composition are important.

The crosslinker can react at either low or high temperatures. In some cases a portion of the reaction will occur at low temperatures with the rest of the reaction occurring at higher temperatures. Both extent of crosslinking and reaction kinetics can be measured by a variety of chemical techniques (TGA, FTIR, NMR, XRD, etc.) and physical techniques (indentation, tensile testing, modulus, hardness, etc.).

In some cases it will be favorable to have the electrochemical modifier and/or crosslinker evenly distributed throughout the initial co-polymer—a homogenous mixture. In other cases it is important to have an uneven distribution of crosslinker and/or electrochemical modified throughout the initial co-polymer.

The structure of the polymer precursors is not particularly limited, provided that the polymer precursor is capable of reacting with another polymer precursor or with a second polymer precursor to form a polymer. In some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide, an alkene, an alkyne, an acrylate, an epoxide and an isocyanate.

Various monomers, molecular components, oligomers and polymeric materials may be combined to make a variety of polymers including, novolacs, resoles, novolac epoxides (comprised of one or more of phenol, resorcinol, formaldehyde, epichlorohydrin, bisphenol-A, bisphenol-F, epoxide), rubbers (isoprene, styrene-butadiene, styrene-butadiene-styrene, isobutylene, polyacrylate rubber, ethylenene-acrylate rubber, bromo-isobutylene, isoprene, polybutadiene, chloro isobutadiene isoprene, polychloroprene, epichlorohydrin, ethylene propylene, ethylene propylene diene monomer, polyethere urethane, perfluorocarbon rubber, fluorosilicone, hydrogenated nitrile butadiene, acrylonitrile butadiene, polyurethane), nylons (including nylon-6; nylon-6,6; nylon-6,9; nylon-6,10; nylon-6,12; nylon-11; nylon-12; and nylon-4,6), acrylates (methylacrylate, ethyl acrylate, 2-Chloroethyl-vinyl ether, 2-Ethylhexyl acrylate, hydroyethyl methacrylate, butyl acrylate, butyl methacrylate, acrylonitrile), polystyrene, and polyurethanes (composed of ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, ethanolamine, diethanolamine, methyldiethanolamine, pehnyldiethanolamine, glycerol, trimethylolpropane, 1,2,6-hexanetriol, triethanolamine, pentaerythritol, diethyltoluenediamine, dimethylthiotoluenediamine).

In some cases the polymer precursor materials include (a) alcohols, phenolic compounds, and other mono- or polyhydroxy compounds and (b) aldehydes, ketones, and combinations thereof. Representative alcohols in this context include straight chain and branched, saturated and unsaturated alcohols. Another exemplary phenol compound is bisphenol A and related bisphenol molecules. Suitable phenolic compounds include polyhydroxy benzene, such as a dihydroxy or trihydroxy benzene. Another exemplary phenol compound is bisphenol A and related bisphenol molecules. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In one embodiment, the method comprises use of a first and second polymer precursor, and in some embodiments the first or second polymer precursor is a carbonyl containing compound and the other of the first or second polymer precursor is an alcohol-containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor is a urea or an amine-containing compound. For example, in some embodiments the polymer precursor is urea or melamine. Other embodiments include polymer precursors selected from isocyanates or other activated carbonyl compounds such as acid halides and the like. Yet other embodiments employ phenolic precursors, including but not limited to phenol, resorcinol, and other hydroxy- and aromatic-ring containing molecules.

In some embodiments of the methods described herein, the molar ratio of precursor to catalyst is from about 5:1 to about 2000:1 or the molar ratio of precursor to catalyst is from about 20:1 to about 200:1. In further embodiments, the molar ratio of precursor to catalyst is from about 25:1 to about 100:1. In further embodiments, the molar ratio of precursor to catalyst is from about 5:1 to about 10:1. In further embodiments, the molar ratio of precursor to catalyst is from about 100:1 to about 5:1.

In one specific embodiment wherein one of the polymer precursors is resorcinol and/or phenol and another polymer precursor is formaldehyde, the resorcinol and/or phenol to catalyst ratio can be varied to obtain the desired properties of the resultant polymer gel and carbon materials. In some embodiments of the methods described herein, the molar ratio of resorcinol and/or phenol to catalyst is from about 10:1 to about 2000:1 or the molar ratio of resorcinol and/or phenol to catalyst is from about 20:1 to about 200:1. In further embodiments, the molar ratio of resorcinol and/or phenol to catalyst is from about 25:1 to about 100:1. In further embodiments, the molar ratio of resorcinol and/or phenol to catalyst is from about 5:1 to about 10:1. In further embodiments, the molar ratio of resorcinol and/or phenol to catalyst is from about 100:1 to about 5:1.

The total solids content in the solution or suspension prior to polymer gel formation can be varied. The weight ratio of resorcinol and/or phenol to water is from about 0.05 to 1 to about 0.70 to 1. Alternatively, the ratio of resorcinol and/or phenol to water is from about 0.15 to 1 to about 0.6 to 1. Alternatively, the ratio of resorcinol and/or phenol to water is from about 0.15 to 1 to about 0.35 to 1. Alternatively, the ratio of resorcinol and/or phenol to water is from about 0.25 to 1 to about 0.5 to 1. Alternatively, the ratio of resorcinol and/or phenol to water is from about 0.3 to 1 to about 0.35 to 0.6.

Examples of solvents useful in the preparation of the polymer gels disclosed herein include but are not limited to water or alcohols such as, for example, ethanol, t-butanol, methanol or combinations thereof as well as aqueous mixtures of the same. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of the polymer gels include volatile basic catalysts that facilitate polymerization of the precursor materials into a monolithic polymer. The catalyst can also comprise various combinations of the catalysts described above. In embodiments comprising phenolic compounds or other polymer precursors, such catalysts can be used in the range of molar ratios of 5:1 to 200:1 phenolic compound:catalyst. For example, in some specific embodiments such catalysts can be used in the range of molar ratios of 5:1 to 10:1 phenolic compound:catalyst.

In some embodiments, the gel polymerization process is performed under catalytic conditions. Accordingly, in some embodiments, the method comprises admixing a catalyst with the solvent-free mixture. In some embodiments, the catalyst is a solid at room temperature and pressure.

In some embodiments, the catalyst is a liquid at room temperature and pressure. In some embodiments, the catalyst is a liquid at room temperature and pressure that does not provide dissolution of one or more of the other polymer precursors.

In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to polymer precursor (e.g., phenolic compound) may have an effect on the final properties of the polymer gel as well as the final properties of the carbon materials. Thus, in some embodiments such catalysts are used in the range of molar ratios of 5:1 to 2000:1 polymer precursor:catalyst. In some embodiments, such catalysts can be used in the range of molar ratios of 10:1 to 400:1 polymer precursor:catalyst. For example in other embodiments, such catalysts can be used in the range of molar ratios of 5:1 to 100:1 polymer precursor:catalyst. For example, in some embodiments the molar ratio of catalyst to polymer precursor is about 400:1. In other embodiments the molar ratio of catalyst to polymer precursor is about 100:1. In other embodiments the molar ratio of catalyst to polymer precursor is about 50:1. In other embodiments the molar ratio of catalyst to polymer precursor is about 10:1. In certain of the foregoing embodiments, the polymer precursor is a phenolic compound such as resorcinol or phenol.

In still other embodiments, the method comprises admixing an acid. In certain embodiments, the acid is a solid at room temperature and pressure. In some embodiments, the acid is a liquid at room temperature and pressure. In some embodiments, the acid is a liquid at room temperature and pressure that does not provide dissolution of one or more of the other polymer precursors.

The acid may be selected from any number of acids suitable for the polymerization process. For example, in some embodiments the acid is acetic acid and in other embodiments the acid is oxalic acid. In further embodiments, the acid is mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid.

The total content of acid in the mixture can be varied to alter the properties of the final product. In some embodiments, the acid is present from about 1% to about 50% by weight of mixture. In other embodiments, the acid is present from about 5% to about 25%. In other embodiments, the acid is present from about 10% to about 20%, for example about 10%, about 15% or about 20%.

In certain embodiments, the polymer precursor components are blended together and subsequently held for a time and at a temperature sufficient to achieve polymerization. One or more of the polymer precursor components can have particle size less than about 20 mm in size, for example less than 10 mm, for example less than 7 mm, for example, less than 5 mm, for example less than 2 mm, for example less than 1 mm, for example less than 100 microns, for example less than 10 microns. In some embodiments, the particle size of one or more of the polymer precursor components is reduced during the blending process.

In some embodiments, the fraction of solvent in the reaction mixture is low or the reaction can be essentially solvent free. For example, the fraction of solvent in the reaction mixture can be can less than 80% of the total mass of reaction mixture, for example less than 70%, for example less than 60%, for example less than 50%, for example less than 40%, for example less than 30%, for example less than 20%, for example less than 10%, for example less than 5%, for example less than 1%, for example less than 0.1%, for example less than 0.01%. Without being bound by theory, a pyrolyzed carbon yield from a polymeric material can be about 50%. Accordingly, the ratio of pyrolzyed carbon produced per unit mass of polymer processed can be less than about 10, less than about 7, less than about 5, less than about 4, less than about 3, less than about 2.5, less than about 2.1. In some embodiments, the ratio of pyrolzyed carbon produced per unit mass of polymer processed is about 2. In some embodiments, the ratio of pyrolzyed carbon produced per unit mass of polymer processed is less than 2.

The pyrolzyed carbon produced from low solvent or essentially solvent-free reaction mixtures can be activated, and the ratio of active carbon to polymer processed is higher than the ratio of pyrolzyed carbon to polymer processed, depending on the level of activation desired. Without being bound by theory, a activated carbon yield from a pyrolyzed carbon material can be about 50%. Accordingly, the ratio of activated carbon produced per unit mass of polymer processed can be less than about 14, less than about 10, less than about 8, less than about 6, less than about 5, less than about 4.5, less than about 4.1. In some embodiments, the ratio of activated carbon produced per unit mass of polymer processed is about 4 or lower.

The structure of the polymer precursors suitable for use in a low solvent or essentially solvent free reaction mixture is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment employing a low or essentially solvent free reaction mixture, the method comprises use of a first and second polymer precursor, and in some embodiments the first or second polymer precursor is a carbonyl containing compound and the other of the first or second polymer precursor is an alcohol containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials suitable for low or essentially solvent free reaction mixture as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Other suitable compounds in this regard are bisphenols, for instance, bisphenol A. Mixtures of two or more polyhydroxy benzenes can also be used. Phenol (monohydroxy benzene) can also be used. Representative polyhydroxy compounds include sugars, such as glucose, sucrose, fructose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3 butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor in the low or essentially solvent free reaction mixture is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor in the low or essentially solvent free reaction mixture is a urea or an amine containing compound. For example, in some embodiments the polymer precursor is urea, melamine, hexamethylenetetramine or combination thereof. Other embodiments include polymer precursors selected from isocyanates or other activated carbonyl compounds such as acid halides and the like.

Some embodiments of the disclosed methods include preparation of low or solvent-free polymer gels (and carbon materials) comprising electrochemical modifiers. Such electrochemical modifiers include, but are not limited to nitrogen, silicon, and sulfur. In other embodiments, the electrochemical modifier comprises fluorine, iron, tin, silicon, nickel, aluminum, zinc, or manganese. The electrochemical modifier can be included in the preparation procedure at any step. For example, in some the electrochemical modifier is admixed with the mixture, the polymer phase or the continuous phase.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplished before, during, and/or after (or combinations thereof) incubation at the reaction temperature.

Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours).

In certain embodiments, an electrochemical modifier is incorporated during the above described polymerization process. For example, in some embodiments, an electrochemical modifier in the form of metal particles, metal paste, metal salt, metal oxide or molten metal can be dissolved or suspended into the mixture from which the gel resin is produced Exemplary electrochemical modifiers for producing composite materials may fall into one or more than one of the chemical classifications. In some embodiments, the electrochemical modifier is a saccharide, including but not limited to, chitin, chitosan, glucose, sucrose, fructose, cellulose, and combinations thereof. In one embodiment, the electrochemical modifier is a biopolymer such as lignin. In one embodiment, the electrochemical modifier is a protein such as gelatin. In one embodiment, the electrochemical modifier is a biopolymer such as lignin. In one embodiment, the electrochemical modifier is an amine compound such as urea or melamine, or combinations thereof. In certain embodiments, the electrochemical modifier is a halogen salt, including but not limited to sodium chloride, lithium bromide, potassium fluoride, and combinations thereof. In certain embodiments, the electrochemical modifier is a nitrate salt, including but not limited to lithium nitrate, sodium nitrate, and combinations thereof. In certain embodiments, the electrochemical modifier is a carbide compound, including but not limited to calcium carbide, silicon carbide, and combinations thereof. In certain embodiments, the electrochemical modifier comprises a metal, and exemplary species includes, but are not limited to aluminum isoproproxide, manganese acetate, nickel acetate, iron acetate, tin chloride, silicon chloride, and combinations thereof. In certain embodiments, the electrochemical modifier is a phosphate compound, including but not limited to phytic acid, phosphoric acid, ammonium dihydrogenphosphate, and combinations thereof. In certain embodiments, the electrochemical modifier comprises silicon, and exemplary species includes, but are not limited to silicon powders, silicon nanotubes, polycrystalline silicon, nanocrystalline silicon, amorphous silicon, porous silicon, nano sized silicon, nano-featured silicon, nano-sized and nano-featured silicon, silicyne, and black silicon, and combinations thereof.

Electrochemical modifiers can combined with a variety of polymer systems through either physical mixing or chemical reactions with latent (or secondary) polymer functionality. Examples of latent polymer functionality include, but are not limited to, epoxide groups, unstaturation (double and triple bonds), acid groups, alcohol groups, amine groups, basic groups. Crosslinking with latent functionality can occur via heteroatoms (e.g. vulcanization with sulfur, acid/base/ring opening reactions with phosphoric acid), reactions with organic acids or bases (described above), coordination to transition metals (including but not limited to Ti, Cr, Mn, Fe, Co, Ni, Cu, Zn, Zr, Nb, Mo, Ag, Au), ring opening or ring closing reactions (rotaxanes, spiro compounds, etc).

Polymerization to form a polymer gel can be accomplished by various means described in the art and may include addition of an electrochemical modifier. For instance, polymerization can be accomplished by incubating suitable polymer precursor materials, and optionally an electrochemical modifier, in the presence of a suitable catalyst for a sufficient period of time. The time for polymerization can be a period ranging from minutes or hours to days, depending on the temperature (the higher the temperature the faster, the reaction rate, and correspondingly, the shorter the time required). The polymerization temperature can range from room temperature to a temperature approaching (but lower than) the boiling point of the starting solution. For example, in some embodiments the polymer gel is aged at temperatures from about 20° C. to about 120° C., for example about 20° C. to about 100° C. Other embodiments include temperature ranging from about 30° C. to about 90° C., for example about 45° C. or about 85° C. In other embodiments, the temperature ranges from about 65° C. to about 80° C., while other embodiments include aging at two or more temperatures, for example about 45° C. and about 75-85° C. or about 80-85° C.

Electrochemical modifiers can also be added to the polymer system through physical blending. Physical blending can include but is not limited to melt blending of polymers and/or co-polymers, the inclusion of discrete particles, chemical vapor deposition of the electrochemical modifier and coprecipitation of the electrochemical modifier and the main polymer material.

In another embodiment the electrochemical modifier is a particle. The particles of electrochemical modifier can be added with differing particle size distributions. In one embodiment the electrochemical modifier particles have a D50 of 10 nm or 50 nm or 100 nm or 150 nm or 200 nm or 500 nm or 1um or 1.5 um or 2 um or 3 um or 5um or 10 um or 20 um or 40 um or up to 50 um, or up to 100 um. In some embodiments the polymer and particle form a mixture. In other embodiments the particle is covalently bonded to the polymer. In other embodiments the particle is ironically bonded to the polymer. In some cases the particle is silicon, in other cases the particles are a different Group 14 elements (Ge, Sn, Pb), Group 15 elements (P, As, Sb), Group 16 elements (S, Se, Te). In some cases the particle is comprised of a single element, in other cases it is comprised of a mixture of two or more elements.

Electrochemical modifier particles can be dispersed in the organic polymer solution or pre-polymer in a variety of ways. In one embodiment, the particles are dispersed by sonication. In another embodiment, the particles are dispersed by mixing. In another embodiment, the particles are dispersed by modifying the surface chemistry of the particles or the pH of the solution. In another embodiment, the particles are dispersed by use of a surfactant. In one embodiment, the surfactant is SPAN 80. In another embodiment the particles are dispersed in an emulsion or suspension. In one embodiment the surfactant is used in combination with a hydrocarbon solvent. In one embodiment, the hydrocarbon is cyclohexane. In one embodiment the hydrocarbon is mineral oil. In another embodiment the hydrocarbon is vegetable oil.

In some instances the electrochemical modifier can be added via a metal salt solution. The metal salt solution or suspension may comprise acids and/or alcohols to improve solubility of the metal salt. In yet another variation, the polymer gel (either before or after an optional drying step) is contacted with a paste comprising the electrochemical modifier. In yet another variation, the polymer gel (either before or after an optional drying step) is contacted with a metal or metal oxide sol comprising the desired electrochemical modifier.

In addition to the above exemplified electrochemical modifiers, the composite materials may comprise one or more additional forms (i.e., allotropes) of carbon. In this regard, it has been found that inclusion of different allotropes of carbon such as graphite, amorphous carbon, diamond, C60, carbon nanotubes (e.g., single and/or multi-walled), graphene and/or carbon fibers into the composite materials is effective to optimize the electrochemical properties of the composite materials. The various allotropes of carbon can be incorporated into the carbon materials during any stage of the preparation process described herein. For example, during the solution phase, during the gelation phase, during the curing phase, during the pyrolysis phase, during the milling phase, or after milling. In some embodiments, the second carbon form is incorporated into the composite material by adding the second carbon form before or during polymerization of the polymer gel as described in more detail herein. The polymerized polymer gel containing the second carbon form is then processed according to the general techniques described herein to obtain a carbon material containing a second allotrope of carbon.

In some embodiments the organic polymer and the electrochemical modifier have different solvents, ratios of solvents, mixtures of solvents, catalysts type, catalyst ratios, solvent pH, type of acid, or base.

It is expected that by changing either the relative solids concentration of the carbon containing polymer solution and/or the relative solids concentration of the electrochemical modifier containing polymer solution, the electrochemical modifier content of the final composite can be varied. In one embodiment the solids concentration of the organic polymer solution can be varied between 1% to 99% solids or from 10% to 90% solids, or from 20% to 80% solids or from 20% to 50% or from 30% to 40% solids. In one embodiment the solids concentration of the polymer solution is 35%. In one embodiment the solids concentration of the electrochemical modifier polymer solution can be varied between 1% to 99% solids or from 10% to 90% solids, or from 20% to 80% solids or from 20% to 50% or from 30% to 40% solids. In one embodiment the solids concentration of the electrochemical modifier solution is 35%. In one embodiment the electrochemical modifier is a TEOS polymer is mixed with ethanol. In other embodiments, the TEOS polymer is mixed with acetone, or isopropyl alcohol.

Changing the ratio of organic polymer to the electrochemical modifier polymer solutions in any given mixture is expected to alter the final ratio of the carbon to electrochemical modifier in the final composite. In one embodiment the ratio of organic polymer to electrochemical modifier polymer is about 10:1 or 9:1 or 8:1 or 7:1 or 6:1 or 5:1 or 4:1 or 3:1 or 2:1, or 1:1, or 1:2, or 1:3 or 1:4 or 1:5, or 1:6 or 1:7 or 1:8 or 1:9 or 1:10.

In one embodiment the organic polymer/electrochemical modifier polymer solution is heated until a gel is formed. In one embodiment a TEOS/RF solution is heated until a gel is formed. In one embodiment the heating is carried out in a sealed container. In one embodiment the heating is carried out in a polymer reactor. For example, a stirred polymer reactor. In one embodiment the solution is heated in an emulsion, or in an inverse emulsion or in a suspension. The temperature at which gelation takes place is known to impact the structure of the polymer and can be modified to control the structure of the final composite material. In one embodiment the gel is formed at 40 C or 50 C or 60 C or 70 C or 80 C or 90 C or 100 C or 110 C or 120 C or 130 C. In one embodiment the gel is formed in a two-step reaction. For example one temperature to cause the organic polymer to gel and a different temperature to cause the electrochemical modifier polymer to gel. In one embodiment the two step polymerization is carried out at 40 C or 50 C or 60 C or 70 C or 80 C or 90 C or 100 C or 110 C or 120 C or 130 C and then the second step is carried out at 40 C or 50 C or 60 C or 70 C or 80 C or 90 C or 100 C or 110 C or 120 C or 130 C. In some embodiments the organic polymer is fully gelled and then a electrochemical modifier polymer solution is added through a solvent exchange to dope the organic polymer. In some embodiments the electrochemical modifier polymer is fully gelled and then an organic polymer solution is added through a solvent exchange to dope the electrochemical modifier polymer.

In alternate embodiments, the porous nano-featured silicon or porous nano-featured and nano-sized silicon can be coated with a precursor solution as known in the art, followed by a carbonization process. For example, the porous nano-featured silicon or porous nano-featured and nano-sized silicon particles can be coated by a wurster process to apply a thin layer of precursor material on the particles. The precursor coating can then be pyrolyzed, for example by further fluidization of the wurster-coated porous nano-featured silicon or porous nano-featured and nano-sized silicon particles in the presence of elevated temperature and an inert gas as disclosed elsewhere herein.

In alternate embodiments, composites comprising carbon and porous nano-featured silicon, or comprising carbon and porous nano-featured and nano-sized silicon can be secondarily coated with a precursor solution as known in the art, followed by a carbonization process. For example, such composites can be coated by a wurster process to apply a thin layer of precursor material on the composite particles. The precursor coating can then be pyrolyzed, for example by further fluidization of the wurster-coated composite particles comprising carbon and porous nano-featured silicon or comprising carbon and porous nano-featured and nano-sized silicon particles in the presence of elevated temperature and an inert gas as disclosed elsewhere herein.

In alternate embodiments, the nano featured porous silicon material can be covered in a carbonaceous layer accomplished by chemical vapor deposition (CVD). Methodologies for CVD generally described in the art can be applied to the porous silicon materials disclosed herein, for example nano-featured. CVD is generally accomplished by subjecting the porous silicon material for a period of time at elevated temperature in the presence of a suitable deposition gas containing carbon atoms. Suitable gases in this context include, but are not limited to methane, propane, butane, cyclohexane, ethane, propylene, and acetylene. The temperature can be varied, for example between 350 to 1050 C, for example between 350 and 450 C, for example between 450 and 550 C, for example between 550 and 650 C, for example between 650 and 750 C, for example between 750 and 850 C, for example between 850 and 950 C, for example between 950 and 1050 C. The deposition time can be varied, for example between 0 and 5 min, for example between 5 and 15 min, for example between 15 and 30 min, for example between 30 and 60 min, for example between 60 and 120 min, for example between 120 and 240 min. In some embodiments, the deposition time is greater than 240 min. In certain embodiments, the deposition gas is methane and the deposition temperature is greater than or equal to 900 C. In certain embodiments, the deposition gas is propane and the deposition temperature is less than or equal to 800 C. In certain embodiments, the deposition gas is cyclohexane and the deposition temperature is greater than or equal to 800 C. In certain embodiments, the reactor itself can be agitated, in order to agitate the porous nano-featured silicon material to be carbon coated.

For example, the CVD can be carried out in a static mode, wherein the particles are not agitated, and the CVD gas flows over, around, or otherwise permeates the particles to be coated. In other exemplary modes, the particles can be fluidized, for example CVD can be carried out in a fluidized bed reactor. A variety of different reactor designs can be employed in this context as known in the art, including, but not limited to, elevator kiln, roller hearth kiln, rotary kiln, box kiln, and fluidized bed designs.

Accordingly, the present disclosure provides for the manufacturing of a composite silicon-carbon material, wherein the silicon material is a porous nano-featured silicon material, and wherein the carbon coating is achieved by CVD. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield silicon material with nano-sized features;
 c) removing liquid medium to yield dried porous silicon material with nano-sized features;
 d) treating the porous nano-featured silicon via CVD to yield a composite comprising porous nano-featured silicon coated by a carbon layer.

In another embodiment, the present disclosure provides for the manufacturing of a composite silicon-carbon material, wherein the silicon material is a nano-sized silicon material with nano-sized features, and wherein the carbon coating is achieved via CVD. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features;
 c) removing the liquid medium to yield dried highly friable silicon material with nano-sized features;
 d) particle size reduction of the friable silicon material with nano-sized features to yield nano-sized silicon particles with nano-sized features; and
 e) treating the porous nano-featured and nano-sized silicon via CVD to yield a composite comprising porous nano-featured and nano-sized silicon coated by a carbon layer.

The porous nano-featured silicon or porous nano-featured and nano-sized silicon can be coated by carbon via a hydrothermal carbonization wherein the particles are processed by various modes according to the art. Hydrothermal carbonization of porous nano-featured or porous nano-featured and nano-sized silicon can be accomplished in an aqueous environment at elevated temperature and pressure to obtain a silicon-carbon composite. Examples of temperature to accomplish the hydrothermal carbonization vary, for example between 150 C and 300 C, for example, between 170 C and 270 C, for example between 180 C and 260 C, for example, between 200 and 250 C. Alternatively, the hydrothermal carbonization can be carried out at higher temperatures, for example, between 200 and 800 C, for example, between 300 and 700 C, for example between 400 and 600 C. In some embodiments, the hydrothermal carbonization can be carried out at a temperature and pressure to achieve graphitic structures. The range of pressures suitable for conducting the hydrothermal carbonization are known in the art, and the pressure can vary, for example, increase, over the course of the reaction. The pressure for hydrothermal carbonization can vary from 0.1 MPa to 200 MPA. In certain embodiments the pressure of hydrothermal carbonization is between 0.5 MPa and 5 MPa. In other embodiments, the pressure of hydrothermal carbonization is between 1 MPa and 10 MPa, or between 5 and 20 MPa. In yet other embodiments, the pressure of hydrothermal carbonization is between 10 MPa and 50 MPa. In yet other embodiments, the pressure of hydrothermal carbonization is between 50 MPa and 150 MPa. In yet other embodiments, the pressure of hydrothermal carbonization is between 100 MPa and 200 MPa. Feedstock suitable as carbon source for hydrothermal carbonization are also known in the art. Such feedstocks for hydrothermal carbonization typically comprise carbon and oxygen, these include, but are not limited to, sugars, oils, biowastes, polymers, and polymer precursors described elsewhere within this disclosure.

Accordingly, the present disclosure provides for the manufacturing of a composite silicon-carbon material, wherein the silicon material is a porous nano-featured silicon material, and wherein the carbon coating is achieved by hydrothermal carbonization. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon metal in to the liquid medium to yield silicon material with nano-sized features;
  c) removing the liquid medium to yield dried porous silicon material with nano-sized features; and
  d) treating the porous nano-featured silicon via hydrothermal carbonization to yield a composite comprising porous nano-featured silicon coated by a carbon layer.

In another embodiment, the present disclosure provides for the manufacturing of a composite silicon-carbon material, wherein the silicon material is a nano-sized silicon material with nano-sized features, and wherein the carbon coating is achieved via hydrothermal carbonization. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield highly friable silicon material with nano-sized features.
  c) removing the liquid medium to yield dried highly friable silicon material with nano-sized features;
  d) particle size reduction of the highly friable silicon material with nano-sized features to yield nano-sized silicon particles with nano-sized features; and
  e) treating the porous nano-featured and nano-sized silicon via hydrothermal carbonization to yield a composite comprising porous nano-featured and nano-sized silicon coated by a carbon layer.

In another embodiment, the present disclosure provides for the manufacturing of a composite silicon-carbon material, wherein the silicon material is a nano-sized silicon material or nano-sized silicon material with nano-sized features, and wherein the carbon coating is achieved via application of a conductive polymer. In certain embodiments, the conductive polymer is pyrolyzed to achieve a pyrolyzed conductive polymer coating. There are various embodiments whereby the conductive polymer can be added as a second carbon composite with the composite of nano-featured and/or nano-sized and nano-featured silicon and first carbon coating. For example, the silicon-carbon composite can be suspended in a solvent containing dissolved conductive polymer, the suspension can then be dried as known in the art. In an alternate embodiment, solid particles of conductive polymer can be mixed with solid silicon particles, and the mixture of particles stored at elevated temperature. In preferred embodiments, the temperature is near or above the glass transition temperature of the polymer. In additional preferred embodiments, the temperature is near or above the softening temperature of the polymer. In additional preferred embodiments, the temperature is near or above the melting temperature of the polymer. The elevated temperature may be about 100 C, or about 120 C, or about 140 C, or about 160 C, or about 180 C, or about 200 C. The pyrolysis can be conducted at elevated temperature as known in the art, for example at 300 C, or 350 C, or 400 C, or 450 C, or 500 C, or 600 C, or 700 C, or 800 C. In certain embodiments, the mixture of nano-featured or nano-featured and nano-sized silicon can be pyrolyzed at 850 C, 900 C, 1000 C, 1050 C, or 1100 C. Exemplary conductive polymers include, but are not limited to, polyacrylonitrile (PAN), polyaniline, polypyrrole, polyacetylene, polyphenylene, polyphenylene sulfide, polythiophene, poly(fluorene)s, polypyrenes, polyazulenes, polynaphthalenes, polycarbazoles, polyindoles, polyazepines, poly(3,4-ethylenedioxythiophene) (PEDOT), poly(p-phenylene sulfide) (PPS), poly(p-phenylene vinylene) (PPV), and mixtures thereof. The ratio of nano-featured or nano-featured and nano-sized silicon to conductive polymer can be varied, for example, from 95:5 to 9:95. In certain embodiments, the ratio of silicon to conductive polymer is 95:5 to 60:40, or 90:10 to 70:30.

In another embodiment, the present disclosure provides for the manufacturing of a composite silicon-carbon material, wherein the silicon material is a nano-sized silicon material or nano-sized silicon material with nano-sized features that is composited with carbon according to the methods generally described herein, and the resulting silicon carbon composite is further coating with a second carbon coating, wherein the second carbon coating is achieved via application of a conductive polymer. In certain embodiments, the conductive polymer is pyrolyzed to achieve a pyrolyzed conductive polymer coating. There are various embodiments whereby the conductive polymer can be composited with the composite of nano-featured and/or nano-sized and nano-featured silicon with the carbon. For example, the silicon carbon composite can be suspended in a solvent containing dissolved conductive polymer, the suspension can then be dried as known in the art. In an alternate embodiment, solid particles of conductive polymer can be mixed with solid silicon carbon composite particles, and the mixture of particles stored at elevated temperature. In preferred embodiments, the temperature is near or above the glass transition temperature of the polymer. In additional preferred embodiments, the temperature is near or above the softening temperature of the polymer. In additional preferred embodiments, the temperature is near or above the melting temperature of the polymer. The elevated temperature may be about 100 C, or about 120 C, or about 140 C, or about 160 C, or about 180 C, or about 200 C. The pyrolysis can be conducted at elevated temperature as known in the art, for example at 300 C, or 350 C, or 400 C, or 450 C, or 500 C, or 600 C, or 700 C, or 800 C. In certain embodiments, the mixture of nano-featured or nano-featured and nano-sized silicon can be pyrolyzed at 850 C, 900 C, 1000 C, 1050 C, or 1100 C. Exemplary conductive polymers include, but are not limited to, polyacrylonitrile (PAN), polyaniline, polypyrrole, polyacetylene, polyphenylene, polyphenylene sulfide, polythiophene, poly(fluorene)s, polypyrenes, polyazulenes, polynaphthalenes, polycarbazoles, polyindoles, polyazepines, poly(3,4-ethylenedioxythiophene) (PEDOT), poly(p-phenylene sulfide) (PPS), poly(p-phenylene vinylene) (PPV), and mixtures thereof. The ratio of composite of nano-featured or nano-featured and nano-sized silicon with carbon to conductive polymer can be varied, for example, from 95:5 to 9:95. In certain embodiments, the ratio of composite to conductive polymer is 95:5 to 60:40, or 90:10 to 70:30.

In certain embodiments, the composite is comprised of porous, nano-featured silicon and carbon, wherein the carbon is comprised of a conductive polymer precursor, which can be pyrolyzed, for example pyrolzyed between 350 and 1050 C. In certain embodiments, the porous, nano-featured silicon is also nano-sized. In certain embodiments, the conductive polymer precursor is polyacrylonitrile (PAN), and the pyrolysis temperature is between 350 and 550 C. In some embodiments, the composite comprising porous, nano-featured silicon and carbon pyrolyzed from conductive polymer precursor exhibits a surface area between 10 and 200 m2/g and a pore volume between 0.01 and 0.2 cm3/g. In other embodiments, the composite comprising porous, nano-featured silicon and carbon pyrolyzed from conductive polymer precursor exhibits a surface area between 30 and 150 m2/g and a pore volume between 0.02 and 0.1 cm3/g.

In certain embodiments, the composite comprising porous, nano-featured silicon and carbon pyrolyzed from conductive polymer precursor exhibits less than 10% micropores, 20-40% mesopores, and greater than 60% macropores. In a further embodiment, the composite comprising porous, nano-featured silicon and carbon pyrolyzed from conductive polymer precursor exhibits less than 10% micropores, 20-40% mesopores, and greater than 60% macropores, and exhibits a surface area less than 30 m2/g and a pore volume less than 0.05 cm3/g.

In certain other embodiments, the composite comprising porous, nano-featured silicon and carbon pyrolyzed from conductive polymer precursor exhibits 10-40% micropores, 20-40% mesopores, and 25-55% macropores. In a further embodiment, the composite comprising porous, nano-featured silicon and carbon pyrolyzed from conductive polymer precursor exhibits 10-40% micropores, 20-40% mesopores, and 25-55% macropores, and exhibits a surface area of 20-100 m2/g and a pore volume of 0.02-0.08 cm3/g.

In yet other embodiments, the composite comprising porous, nano-featured silicon and carbon pyrolyzed from conductive polymer precursor exhibits greater than 60% micropores, less than 30% mesopores, and less than 20% macropores. In a further embodiment, the composite comprising porous, nano-featured silicon and carbon pyrolyzed from conductive polymer precursor exhibits greater than 60% micropores, less than 30% mesopores, and less than 20% macropores, and exhibits a surface area greater than 100 m2/g and a pore volume greater than 0.05 cm3/g.

In certain embodiments, the composite is comprised of porous, nano-featured silicon and carbon, wherein the carbon exists as two distinct layers, a primary layer and a secondary layer. The primary carbon within the composite comprising nano-featured silicon can be produced from various precursors and by various methods as generally described herein. The secondary carbon within the composite can be comprised of a conductive polymer precursor pyrolyzed between 350 and 1050 C. In certain embodiments, the porous, nano-featured silicon is also nano-sized. In certain embodiments, the secondary carbon within composite is comprised of a conductive polymer precursor, for example, polyacrylonitrile (PAN), and can be pyrolzyed, for example at a pyrolysis temperature between 350 and 550 C. In some embodiments, the composite comprising porous, nano-featured silicon and primary and secondary carbon pyrolyzed from conductive polymer precursor exhibits a surface area between 10 and 200 m2/g and a pore volume between 0.01 and 0.2 cm3/g. In other embodiments, the composite comprising porous, nano-featured silicon and primary and secondary carbon pyrolyzed from conductive polymer precursor exhibits a surface area between 30 and 150 m2/g and a pore volume between 0.02 and 0.1 cm3/g.

In certain embodiments, the composite comprising porous, nano-featured silicon and primary and secondary carbon pyrolyzed from conductive polymer precursor exhibits less than 10% micropores, 20-40% mesopores, and greater than 60% macropores. In a further embodiment, the composite comprising porous, nano-featured silicon and primary and secondary carbon pyrolyzed from conductive polymer precursor exhibits less than 10% micropores, 20-40% mesopores, and greater than 60% macropores, and exhibits a surface area less than 30 m2/g and a pore volume less than 0.05 cm3/g.

In certain other embodiments, the composite comprising porous, nano-featured silicon and primary and secondary carbon pyrolyzed from conductive polymer precursor exhibits 10-40% micropores, 20-40% mesopores, and 25-55% macropores. In a further embodiment, the composite comprising porous, nano-featured silicon and primary and secondary carbon pyrolyzed from conductive polymer precursor exhibits 10-40% micropores, 20-40% mesopores, and 25-55% macropores, and exhibits a surface area of 20-100 m2/g and a pore volume of 0.02-0.08 cm3/g.

In yet other embodiments, the composite comprising porous, nano-featured silicon and primary and secondary carbon pyrolyzed from conductive polymer precursor exhibits greater than 60% micropores, less than 30% mesopores, and less than 20% macropores. In a further embodiment, the composite comprising porous, nano-featured silicon and primary and secondary carbon pyrolyzed from conductive polymer precursor exhibits greater than 60% micropores, less than 30% mesopores, and less than 20% macropores, and exhibits a surface area greater than 100 m2/g and a pore volume greater than 0.05 cm3/g.

C. Electrochemical Performance of Composites Comprising Porous Silicon and Carbon Materials As noted above, the present disclosure is directed to composite materials comprising porous silicon materials that are useful as anode material in lithium-based (or sodium-based) and other electrical storage devices. While not wishing to be bound by theory, it is believed that the alloying electrochemical modifier content of a composite, alloying electrochemical modifier structure within the composite, purity profile of the carbon, surface area of the carbon, porosity of the carbon and other properties of the carbon materials are related, at least in part, to its preparation method, and variation of the preparation parameters may yield composite materials having different properties. Accordingly, in some embodiments, the composite material is a pyrolyzed polymer gel with high silicon content.

In certain embodiments, the electrochemical performance of the composite comprising porous nano-featured silicon is tested in a half-cell; alternatively the performance of the composite comprising porous nano-featured silicon is tested in a full cell, for example a full cell coin cell, a full cell pouch cell, a prismatic cell, or other battery configurations known in the art. The anode composition comprising the composite comprising porous nano-featured silicon can further comprise various species, as known in the art. Additional formulation components include, but are not limited to, conductive additives, such as conductive carbons such as Super P, Ketjenblack carbons, and the like, conductive polymers and the like, binders such as styrene-butadiene rubber sodium carboxymethylcellulose (SBR-Na CMC), polyvinylidene difluoride (PVDF), and the like, and combinations thereof. The various types and species comprising the electrode are known in the art. The % of active material in the electrode by weight can vary, for example between 1 and 5%, for example between 5 and 15%, for example between 15 and 25%, for example between 25 and 35%, for example between 35 and 45%, for example between 45 and 55%, for example between 55 and 65%, for example between 65 and 75%, for example between 75 and 85%, for example between 85 and 95%. In preferred embodiments, the active material comprises between 80 and 95% of the electrode. In certain embodiment, the amount of conductive additive in the electrode can vary, for example between 1 and 5%, between 5 and 15%, for example between 15 and 25%, for example between 25 and 35%. In preferred embodiments, the amount of conductive additive in the electrode is between 5 and 25%. In certain embodiments, the amount of binder can vary, for example between 1 and 5%, between 5 and 15%, for example between 15 and 25%, for example between 25 and 35%. In preferred embodiments, the amount of conductive additive in the electrode is between 5 and 25%.

The silicon-carbon composite material may be prelithiated, as known in the art. In certain embodiments, the prelithiation is achieved electrochemically, for example in a half cell, prior to assembling the lithiated anode comprising the porous silicon material into a full cell lithium ion battery. In certain embodiments, prelithiation is accomplished by doping the cathode with a lithium-containing compound, for example a lithium containing salt. Examples of suitable lithium salts in this context include, but are not limited to, dilithium tetrabromonickelate(II), dilithium tetrachlorocuprate(II), lithium azide, lithium benzoate, lithium bromide, lithium carbonate, lithium chloride, lithium cyclohexanebutyrate, lithium fluoride, lithium formate, lithium hexafluoroarsenate(V), lithium hexafluorophosphate, lithium hydroxide, lithium iodate, lithium iodide, lithium metaborate, lithium perchlorate, lithium phosphate, lithium sulfate, lithium tetraborate, lithium tetrachloroaluminate, lithium tetrafluoroborate, lithium thiocyanate, lithium trifluoromethanesulfonate, lithium trifluoromethanesulfonate, and combinations thereof.

The anode comprising the silicon-carbon composite material can be paired with various cathode materials to result in a full cell lithium ion battery. Examples of suitable cathode materials are known in the art. Examples of such cathode materials include, but are not limited to LiCoO$_2$ (LCO), LiNi$_{0.8}$Co$_{0.15}$Al$_{0.05}$O$_2$ (NCA), LiNi$_{1/3}$Co$_{1/3}$Mn$_{1/3}$O$_2$ (NMC), LiMn$_2$O$_4$ and variants (LMO), and LiFePO$_4$ (LFP).

For the full cell lithium ion battery comprising an anode further comprising the silicon-carbon composite material, pairing of cathode to anode can be varied. For example, the ratio of cathode-to-anode capacity can vary from 0.7 to 1.3. In certain embodiments, the ratio of cathode-to-anode capacity can vary from 0.7 to 1.0, for example from 0.8 to 1.0, for example from 0.85 to 1.0, for example from 0.9 to 1.0, for example from 0.95 to 1.0. In other embodiments, the ratio of cathode-to-anode capacity can vary from 1.0 to 1.3, for example from 1.0 to 1.2, for example from 1.0 to 1.15, for example from 1.0 to 1.1, for example from 1.0 to 1.05. In yet other embodiments, the ratio of cathode-to-anode capacity can vary from 0.8 to 1.2, for example from 0.9 to 1.1, for example from 0.95 to 1.05.

For the full cell lithium ion battery comprising an anode further comprising the silicon-carbon composite material, the voltage window for charging and discharging can be varied. In this regard, the voltage window can be varied as known in the art, depending on various properties of the lithium ion battery. For instance, the choice of cathode plays a role in the voltage window chosen, as known in the art. Examples of voltage windows vary, for example, in terms of potential versus Li/Li+, from 2.0 V to 5.0 V, for example from 2.5 V to 4.5V, for example from 2.5V to 4.2V.

For the full cell lithium ion battery comprising an anode further comprising the silicon-carbon composite material, the strategy for conditioning the cell can be varied as known in the art. For example, the conditioning can be accomplished by one or more charge and discharge cycles at various rate(s), for example at rates slower than the desired cycling rate. As known in the art, the conditioning process may also include a step to unseal the lithium ion battery, evacuate any gases generated within during the conditioning process, followed by resealing the lithium ion battery.

For the full cell lithium ion battery comprising an anode further comprising the silicon-carbon composite material, the cycling rate can be varied as known in the art, for example, the rate can between C/20 and 20 C, for example between C10 to 10 C, for example between C/5 and 5 C. In certain embodiments, the cycling rate is C/10. In certain embodiments, the cycling rate is C/5. In certain embodiments, the cycling rate is C/2. In certain embodiments, the cycling rate is 1 C. In certain embodiments, the cycling rate is 1 C, with periodic reductions in the rate to a slower rate, for example cycling at 1 C with a C/10 rate employed every 20$^{th}$ cycle. In certain embodiments, the cycling rate is 2 C. In certain embodiments, the cycling rate is 4 C. In certain embodiments, the cycling rate is 5 C. In certain embodiments, the cycling rate is 10 C. In certain embodiments, the cycling rate is 20 C The disclosed composite materials comprising porous silicon materials improve the properties of any number of electrical energy storage devices, for example the carbon materials have been shown to improve the first cycle efficiency of a lithium-based battery. Accordingly, one embodiment of the present disclosure provides a carbon material, wherein the carbon material has a first cycle efficiency of greater than 50% when the carbon material is incorporated into an electrode of a lithium based energy storage device, for example a lithium ion battery. For example, some embodiments provide a composite material having a surface area of greater than 50 m$^2$/g, wherein the carbon material has a first cycle efficiency of greater than 50% and a reversible capacity of at least 600 mAh/g when the carbon material is incorporated into an electrode of a lithium based energy storage device. In other embodiments, the first cycle efficiency is greater than 55%. In some other embodiments, the first cycle efficiency is greater than 60%. In yet other embodiments, the first cycle efficiency is greater than 65%. In still other embodiments, the first cycle efficiency is greater than 70%. In other embodiments, the first cycle efficiency is greater than 75%, and in other embodiments, the first cycle efficiency is greater than 80%, greater than 90%, greater than 95%, greater than 98%, or greater than 99%.

The properties of the composite material comprising a porous silicon material (e.g., first cycle efficiency, capacity, etc.) can be determined by incorporating into an electrode, known to those versed in the art. The composite is tested electrochemically. The methods of testing may vary depending on the carbon:electrochemical modifier composition, as known in the art. In one example, pure silicon is tested between upper and lower voltages of 1.0V and 10 mV at a current of 400 mA/g, after two formation cycles between 1.0V and 70 mV at a current of 200 mA/g, with respect to the mass of the composite material. Alternatively, the composite materials are tested by limiting the capacity at a predefined value and measuring the stability and voltage fluctuations of the composite.

The first cycle efficiency of the composite material comprising a porous silicon material can be determined by comparing the lithium inserted into the anode during the first cycle to the lithium extracted from the anode on the first cycle, prior prelithiation modification. When the insertion and extraction are equal, the efficiency is 100%. As known in the art, the anode material can be tested in a half-cell, where the counter electrode is lithium metal, the electrolyte is a 1M $LiPF_6$ 1:1 ethylene carbonate:diethylcarbonate (EC:DEC), using a commercial polypropylene separator. Also known in the art, the ratio of EC:DEC can be varied, for example can be 2:1. Also known in art, the electrolyte solvent can also include fluoroethylene carbonate (FEC), for example at 10% (w/w), for example at 20%, for example 30%.

In some embodiments, the first cycle efficiency of the composite material comprising a porous silicon material can is between 10% and 99.9%. In other embodiments, the first cycle efficiency of the composite anode material is between 50% and 98%. In yet other embodiments, the first cycle efficiency of the composite anode material is between 80% and 95%. In still other embodiments, the first cycle efficiency of the composite anode material is between 85% and 90%. In another embodiment the first cycle efficiency is around 80%.

Coulombic efficiency can be averaged, for example averaged over cycles 7 to cycle 25. In certain embodiments, the average efficiency is greater than 0.9, or 90%. In certain embodiments, the average efficiency is greater than 0.95, or 95%. In preferred embodiments, the average efficiency is greater than 0.98, or 98%. In further preferred embodiments, the average efficiency is greater than 0.99, or 99%. In further preferred embodiments, the average efficiency is greater than 0.991, or 99.1%. In further preferred embodiments, the average efficiency is greater than 0.992, or 99.2%. In further preferred embodiments, the average efficiency is greater than 0.993, or 99.3%. In further preferred embodiments, the average efficiency is greater than 0.994, or 99.4%. In further preferred embodiments, the average efficiency is greater than 0.995, or 99.5%. In further preferred embodiments, the average efficiency is greater than 0.996, or 99.6%. In further preferred embodiments, the average efficiency is greater than 0.997, or 99.7%. In further preferred embodiments, the average efficiency is greater than 0.998, or 99.8%. In further preferred embodiments, the average efficiency is greater than 0.999, or 99.9%. In further preferred embodiments, the average efficiency is greater than 0.9999, or 99.99%.

In another embodiment the present disclosure provides a composite material comprising a porous silicon material can, wherein the carbon material component of the composite has a volumetric capacity (i.e., reversible capacity) independent of the alloying electrochemical modifier of at least 400 mAh/cc when the carbon material is incorporated into an electrode of a lithium based energy storage device, for example a lithium ion battery. The volumetric capacity of the carbon materials can be calculated from multiplying the maximum gravimetric capacity (mAh/g) with the pycnometer, skeletal density (g/cc), without the presence of the electrochemical modifier. In other embodiments, the volumetric capacity is at least 450 mAh/cc. In some other embodiments, the volumetric capacity is at least 500 mAh/cc. In yet other embodiments, the volumetric capacity is at least 550 mAh/cc. In still other embodiments, the volumetric capacity is at least 600 mAh/cc. In other embodiments, the volumetric capacity is at least 650 mAh/cc, and in other embodiments, the volumetric capacity is at least 700 mAh/cc. In another embodiment, the volumetric capacity of the carbon component of the composite is between 700 and 1100 mAh/cc.

In another embodiment the present disclosure provides a composite material comprising a porous silicon material can, wherein the carbon material component has a gravimetric capacity (i.e., reversible capacity) independent of the alloying electrochemical modifier of at least 150 mAh/g when the carbon material is incorporated into an electrode of a lithium based energy storage device, for example a lithium ion battery. In other embodiments, the gravimetric capacity is at least 200 mAh/g. In some other embodiments, the gravimetric capacity is at least 300 mAh/g. In yet other embodiments, the gravimetric capacity is at least 400 mAh/g. In still other embodiments, the gravimetric capacity is at least 500 mAh/g. In other embodiments, the gravimetric capacity is at least 600 mAh/g, and in other embodiments, the gravimetric capacity is at least 700 mAh/g, at least 800 mAh/g, at least 900 mAh/g, at least 1000 mAh/g, at least 1100 mAh/g or even at least 1200 mAh/g. In yet other embodiments, the gravimetric capacity is between 1200 and 3500 mAh/g. In some particular embodiments the carbon materials have a gravimetric capacity ranging from about 550 mAh/g to about 750 mAh/g. Certain examples of any of the above carbons may comprise an electrochemical modifier as described in more detail below.

In another embodiment the present disclosure provides a composite material comprising a porous silicon material can, wherein the composite has a gravimetric capacity (i.e., reversible capacity) of at least 400 mAh/g when the composite material is incorporated into an electrode of a lithium based energy storage device, for example a lithium ion battery. In other embodiments, the gravimetric capacity is at least 450 mAh/g. In some other embodiments, the gravimetric capacity is at least 500 mAh/g. In yet other embodiments, the gravimetric capacity is at least 600 mAh/g. In still other embodiments, the gravimetric capacity is at least 700 mAh/g. In other embodiments, the gravimetric capacity is at least 800 mAh/g, and in other embodiments, the gravimetric capacity is at least 900 mAh/g, at least 1000 mAh/g, at least 1100 mAh/g, at least 1200 mAh/g, at least 1300 mAh/g or even at least 1400 mAh/g. In yet other embodiments, the gravimetric capacity is between 1400 and 4200 mAh/g. In some particular embodiments the composite materials have a gravimetric capacity ranging from about 1200 mAh/g to about 1600 mAh/g.

In another embodiment the present disclosure provides a composite anode material comprising a porous silicon material can wherein the composite has a volumetric capacity (i.e., reversible capacity) of at least 800 mAh/cc when the composite material is incorporated into an electrode of a lithium based energy storage device, for example a lithium ion battery. The volumetric capacity of the composite materials can be calculated from multiplying the maximum gravimetric capacity (mAh/g) with the pycnometer, skeletal density (g/cc) prior to electrochemical testing. In other embodiments, the gravimetric capacity is at least 900 mAh/cc. In some other embodiments, the gravimetric capacity is at least 1000 mAh/cc. In yet other embodiments, the gravimetric capacity is at least 1100 mAh/cc. In still other embodiments, the gravimetric capacity is at least 1200 mAh/cc. In other embodiments, the gravimetric capacity is at least 1300 mAh/cc, and in other embodiments, the gravimetric capacity is at least 1400 mAh/cc, at least 1500 mAh/cc, at least 1600 mAh/cc, at least 1700 mAh/cc, at least 1800 mAh/cc or even at least 1900 mAh/cc. In yet other embodiments, the gravimetric capacity is between 2000 and 8000 mAh/cc. In still other embodiments, the gravimetric capacity is between 4000 and 7000 mAh/cc. In some particular embodiments the composite materials have a gravimetric capacity ranging from about 2500 mAh/cc to about 3500 mAh/cc.

D. Physicochemical Properties of Composites Comprising Porous Silicon and Carbon Materials that Influence Electrochemical Performance The volumetric and gravimetric capacity can be determined through the use of any number of methods known in the art, for example by incorporating into an electrode half-cell with lithium metal counter electrode in a coin cell. The gravimetric specific capacity is determined by dividing the measured capacity by the mass of the electrochemically active carbon materials. The volumetric specific capacity is determined by dividing the measured capacity by the volume of the electrode, including binder and conductivity additive. Methods for determining the volumetric and gravimetric capacity are described in more detail in the Examples.

The carbon may contain lithium metal, either through doping or through electrochemical cycling) in the pores of the carbon. Lithium plating within pores is seen as beneficial to both the capacity and cycling stability of the hard carbon. Plating within the pores can yield novel nanofiber lithium. In some cases lithium may be plated on the outside of the particle. External lithium plating is detrimental to the overall performance as explained in the examples. The presence of both internal and external lithium metal may be measured by cutting a material using a focused ion beam (FIB) and a scanning electron microscope (SEM). Metallic lithium is easily detected in contrast to hard carbon in an SEM. After cycling, and when the material has lithium inserted below 0V, the carbon may be sliced and imaged. In one embodiment the carbon displays lithium in the micropores. In another embodiment the carbon displays lithium in the mesopores. In still another embodiment, the carbon displays no lithium plating on the surface of the carbon. In yet still another embodiment carbon is stored in multiple pore sizes and shapes. The material shape and pore size distribution may uniquely and preferentially promote pore plating prior to surface plating. Ideal pore size for lithium storage is explained below.

The particle size distribution of the composite material comprising a porous silicon material can is important to both determine power performance as well as volumetric capacity. As the packing improves, the volumetric capacity may increase. In one embodiment the distributions are either Gaussian with a single peak in shape, bimodal, or polymodal (>2 distinct peaks). The properties of particle size of the composite can be described by the DO (smallest particle in the distribution), D50 (average particle size) and D100 (maximum size of the largest particle). The optimal combined of particle packing and performance will be some combination of the size ranges below.

In one embodiment the DO of the composite material comprising a porous silicon material can range from 1 nm to 5 microns. In another embodiment the DO of the composite ranges from 5 nm to 1 micron, 5 nm to 500 nm, 5 nm to 100 nm, 10 nm to 50 nm. In another embodiment the DO of the composite ranges from 500 to 2 microns, 750 nm to 1 micron, 1 microns to 2 microns. In still another embodiment, the DO of the composite ranges from 2 to 5 microns or even greater than 5 microns.

In one embodiment the D50 of the composite material comprising a porous silicon material can range from 5 nm to 20 microns. In another embodiment the D50 of the composite ranges from 5 nm to 1 micron, 5 nm to 500 nm, 5 nm to 100 nm, 10 nm to 50 nm. In another embodiment the D50 of the composite ranges from 500 to 2 microns, 750 nm to 1 micron, 1 microns to 2 microns. In still another embodiment, the D50 of the composite ranges from 2 to 20 microns, 3 microns to 10 microns, 4 microns to 8 microns, greater than 20 microns.

In one embodiment the D100 of the composite material comprising a porous silicon material can range from 8 nm to 100 microns. In another embodiment the D100 of the composite ranges from 5 nm to 1 micron, 5 nm to 500 nm, 5 nm to 100 nm, 10 nm to 50 nm. In another embodiment the D100 of the composite ranges from 500 to 2 microns, 750 nm to 1 micron, 1 microns to 2 microns. In still another embodiment, the D100 of the composite ranges from 2 to 100 microns, 5 to 50 microns, 8 to 40 microns, 10 to 35 microns, 15 to 30 microns, 20 to 30 microns, around 25 microns, greater than 100 microns.

In certain embodiments, the porous silicon has nano sized features. In certain embodiments, the nano-sized silicon features are between 1 nm and 1 um, for example between 300 nm and 1 um, for example between 150 nm and 300 nm, for example between 50 nm and 150 um, for example between 30 nm and 50 nm, for example between 10 nm and 30 nm, for example between 1 nm and 10 nm. It is also envisioned that certain embodiments comprise combination of the above descriptions of preferred nano-sized features.

In still other embodiments the present disclosure provides a composite material comprising a porous silicon material can, wherein when the composite material is incorporated into an electrode of a lithium based energy storage device the composite material has a volumetric capacity at least 10% greater than when the lithium based energy storage device comprises a graphite electrode. In some embodiments, the lithium based energy storage device is a lithium ion battery. In other embodiments, the composite material has a volumetric capacity in a lithium based energy storage device that is at least 5% greater, at least 10% greater, at least 15% greater than the volumetric capacity of the same electrical energy storage device having a graphite electrode. In still other embodiments, the composite material has a volumetric capacity in a lithium based energy storage device that is at least 20% greater, at least 30% greater, at least 40% greater, at least 50% greater, at least 200% greater, at least 100% greater, at least 150% greater, or at least 200% greater than the volumetric capacity of the same electrical energy storage device having a graphite electrode.

While not wishing to be bound by theory, the present applicants believe the superior properties of the disclosed composite anode material comprising a porous silicon material is related, at least in part, to its unique properties such as surface area, purity, pore structure, crystallinity and surface chemistry, etc. Furthermore, the surface of the porous silicon material may be modified through various treatments. The treatments include exposure to elevated temperature and various gases. The range of temperature can vary, including, but not limited to, 100 to 200 C, 200 to 300 C, 300 to 400 C, 400 to 500 C, 500 to 600 C, 600 to 700 C, 700 to 800 C, 800 to 900 C, 900 to 1000 C, or 1000 to 1100 C. The gas(es) employed can vary, and can comprise one or more of the following: nitrogen, carbon dioxide, ammonia, or steam. The various surface treatments can alter the porous silicon surface and its tendency to produce an unstable solid electrolyte interface (SEI). Creation of s stable SEI layer is important for stable cycling of an anode material for lithium ion battery storage.

Alternatively, the porous silicon material can be processed to add an artificial SEI layer, and several strategies to this end have appeared in the art. For example, a facile chemical vapor deposition process involving mixed gases of CO2 and CH4 can yields thin and conformal artificial SEI layer consisting of alkyl lithium carbonate and lithium carbonate on nickel-rich active cathode powder. Another example is the use of Li3PO4 as a SEI layer, one that has been demonstrated to be stable in the organic electrolyte, even during the Li deposition/dissolution process. Thus, the Li-conducting Li3PO4 SEI layer with a high Young's modulus can effectively reduce side reactions between Li metal and the electrolyte and can restrain Li dendrite growth in lithium-metal batteries during cycling.

The surface area and pore volume of the composite material comprising porous nano-featured silicon and carbon can be varied. For example, the surface area of the composite material comprising porous nano-featured silicon and carbon can range between 10 m2/g and 200 m2/g. In certain embodiments, the surface area of the composite material comprising porous nano-featured silicon and carbon can range between 10 m2/g and 100 m2/g, for example between 20 m2/g and 200 m2/g, for example between 20 m2/g and 150 m2/g, for example between 10 m2/g and 100 m2/g. In some embodiments, the surface area of the composite material comprising porous nano-featured silicon and carbon can range between 20 m2/g and 80 m2/g, for example between 20 m2/g and 70 m2/g, for example between 30 m2/g and 70 m2/g, for example between 40 m2/g and 60 m2/g. In some embodiments the surface area ranges from about 0.1 $m^2$/g to about 50 $m^2$/g for example from about 1 $m^2$/g to about 20 $m^2$/g. In other particular embodiments, the surface area ranges from about 5 $m^2$/g to about 10 $m^2$/g for example the surface area may be about 8 $m^2$/g.

In some embodiments of the foregoing, the composite materials also comprise a surface area ranging from about 5 $m^2$/g to about 400 $m^2$/g or a pore volume ranging from about 0.05 to about 1.0 cc/g or both. For example, in some embodiments the surface area ranges from about 200 $m^2$/g to about 300 $m^2$/g or the surface area is about 250 $m^2$/g.

In certain embodiments, the composite material has a surface area below 200 m2/g, for example below 100 m2/g, for example below 50 m2/g. In further embodiments, the composite material has a surface area below 30 m2/g, for instance below 20 m2/g, for instance below 10 m2/g, for instance below 5 m2/g.

In other embodiments the composite material comprising porous silicon materials has a surface area of less than 50 $m^2$/g, wherein the carbon material has a first cycle efficiency of greater than 50% and a reversible capacity of at least 600 mAh/g when the carbon material is incorporated into an electrode of a lithium based energy storage device. In other embodiments, the first cycle efficiency is greater than 55%. In some other embodiments, the first cycle efficiency is greater than 60%. In yet other embodiments, the first cycle efficiency is greater than 65%. In still other embodiments, the first cycle efficiency is greater than 70%. In other embodiments, the first cycle efficiency is greater than 75%, and in other embodiments, the first cycle efficiency is greater than 80%, greater than 90%, greater than 95%, greater than 98%, or greater than 99%. In some embodiments of the foregoing, the composite materials also comprise a surface area ranging from about 5 $m^2$/g to about 400 $m^2$/g or a pore volume ranging from about 0.05 to about 1.0 cc/g or both. For example, in some embodiments the surface area ranges from about 200 $m^2$/g to about 300 $m^2$/g or the surface area is about 250 $m^2$/g.

The silicon content within the composite material comprising porous nano-featured silicon and carbon can be varied. For example, the silicon content within the composite can range from 5 to 95%. In certain embodiments, the content of porous nano-featured silicon within the composite can range from 10% to 80%, for example, 20% to 70%, for example 30% to 60%, for example 40 to 50%. In some embodiments, the content of porous nano-featured silicon within the composite can range from 10% to 50%, for example, 20% to 40%, for example 30% to 40%. In other embodiments, the content of porous nano-featured silicon within the composite can range from 40% to 80%, for example, 50% to 70%, for example 60% to 70%. In specific embodiments, the content of porous nano-featured silicon within the composite can range from 10% to 20%. In specific embodiments, the content of porous nano-featured silicon within the composite can range from 15% to 25%. In specific embodiments, the content of porous nano-featured silicon within the composite can range from 25% to 35%. In specific embodiments, the content of porous nano-featured silicon within the composite can range from 35% to 45%. In specific embodiments, the content of porous nano-featured silicon within the composite can range from 45% to 55%. In specific embodiments, the content of porous nano-featured silicon within the composite can range from 55% to 65%. In specific embodiments, the content of porous nano-featured silicon within the composite can range from 65% to 75%. In specific embodiments, the content of porous nano-featured silicon within the composite can range from 75% to 85%.

The pore volume of the composite material comprising porous nano-featured silicon and carbon can range between 0.01 cm3/g and 0.2 cm3/g. In certain embodiments, the pore volume of the composite material comprising porous nano-featured silicon and carbon can range between 0.01 cm3/g and 0.15 cm3/g, for example between 0.01 cm3/g and 0.1 cm3/g, for example between 0.01 cm3/g and 0.05 cm2/g.

The pore volume distribution of the composite material comprising porous nano-featured silicon and carbon can vary, for example the % micropores can comprise less than 30%, for example less than 20%, for example less than 10%, for example, less than 5%, for example less than 4%, for example, less than 3%, for example, less than 2%, for example, less than 1%, for example, less than 0.5%, for example, less than 0.2%, for example, less than 0.1%. In certain embodiments, there is no detectable micropore volume in the composite material comprising porous nano-featured silicon and carbon.

In some embodiments, the pore volume distribution of the composite material comprising porous nano-featured silicon and carbon comprises less than 30% mesopores, for example less than 20% mesopores, for example less than 10% mesopores, for example less than 5% mesopores, for example less than 4% mesopores, for example less than 3% mesopores, for example less than 2% mesopores, for example less than 1% mesopores, for example less than 0.5% mesopores, for example less than 0.2% mesopores, for example less than 0.1% mesopores. In some embodiments, there is no detectable mesopore volume in the composite material comprising porous nano-featured silicon and carbon.

In some embodiments, the pore volume distribution of the composite material comprising porous nano-featured silicon and carbon comprises more than 50% macropores, for example more than 60% macropores, for example more than 70% macropores, for example more than 80% macropores, for example more than 90% macropores, for example more than 95% macropores, for example more than 98% macropores, for example more than 99% macropores, for example more than 99.5% macropores, for example more than 99.9% macropores.

Certain embodiment of the pore volume distribution of the composite material comprising porous nano-featured silicon and carbon comprises a variety of the embodiments of the above several paragraphs. For example, the composite material comprising porous nano-featured silicon and carbon comprises less than 30% micropores, less than 30% mesopores, and greater than 40% macropores. In other embodiments, the composite material comprising porous nano-featured silicon and carbon comprises less than 20% micropores, less than 20% mesopores, and greater than 70% macropores. In other embodiments, the composite material comprising porous nano-featured silicon and carbon comprises less than 10% micropores, less than 10% mesopores, and greater than 80% macropores. In other embodiments, the composite material comprising porous nano-featured silicon and carbon comprises less than 10% micropores, less than 10% mesopores, and greater than 90% macropores. In other embodiments, the composite material comprising porous nano-featured silicon and carbon comprises less than 5% micropores, less than 5% mesopores, and greater than 90% macropores. In other embodiments, the composite material comprising porous nano-featured silicon and carbon comprises less than 5% micropores, less than 5% mesopores, and greater than 95% macropores.

The surface area of the composite material comprising a porous silicon material may be modified through activation. The activation method may use steam, chemical activation, CO2 or other gasses. Methods for activation of carbon material are well known in the art.

The carbon material may be prelithiated, as known in the art. These lithium atoms may or may not be able to be separated from the carbon. The number of lithium atoms to 6 carbon atoms can be calculated by techniques known to those familiar with the art:

$$\#Li=Q\times 3.6\times MM/(C\%\times F)$$

Wherein Q is the lithium extraction capacity measured in mAh/g between the voltages of 5 mV and 2.0V versus lithium metal, MM is 72 or the molecular mass of 6 carbons, F is Faraday's constant of 96500, C % is the mass percent carbon present in the structure as measured by CHNO or XPS.

The material can be characterized by the ratio of lithium atoms to carbon atoms (Li:C) which may vary between about 0:6 and 2:6. In some embodiments the Li:C ratio is between about 0.05:6 and about 1.9:6. In other embodiments the maximum Li:C ratio wherein the lithium is in ionic and not metallic form is 2.2:6. In certain other embodiments, the Li:C ratio ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the Li:C ratio is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

In certain other embodiments, the carbon materials comprise an Li:C ratio ranging from about 1:6 to about 2.5:6, from about 1.4:6 to about 2.2:6 or from about 1.4:6 to about 2:6. In still other embodiments, the carbon materials may not necessarily include lithium, but instead have a lithium uptake capacity (i.e., the capability to uptake a certain quantity of lithium, for example upon cycling the material between two voltage conditions (in the case of a lithium ion half cell, an exemplary voltage window lies between 0 and 3 V, for example between 0.005 and 2.7 V, for example between 0.005 and 1 V, for example between 0.005 and 0.8 V). While not wishing to be bound by theory, it is believed the lithium uptake capacity of the carbon materials contributes to their superior performance in lithium based energy storage devices. The lithium uptake capacity is expressed as a ratio of the atoms of lithium taken up by the carbon per atom of carbon. In certain other embodiments, the carbon materials comprise a lithium uptake capacity ranging from about 1:6 to about 2.5:6, from about 1.4:6 to about 2.2:6 or from about 1.4:6 to about 2:6.

In certain other embodiments, the lithium uptake capacity ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the lithium uptake capacity is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

Different methods of doping lithium may include chemical reactions, electrochemical reactions, physical mixing of particles, gas phase reactions, solid phase reactions, and liquid phase reactions. In other embodiments the lithium is in the form of lithium metal.

Since the total pore volume (as determined by nitrogen gas sorption) may partially relate to the storage of lithium ions, the internal ionic kinetics, as well as the available composite/electrolyte surfaces capable of charge-transfer, this is one parameter that can be adjusted to obtain the desired electrochemical properties. Some embodiments include composite materials having low total pore volume (e.g., less than about 0.2 cc/g). In one embodiment, the total pore volume of the composite materials is less than about 0.15 cc/g. In one embodiment, the total pore volume of the composite materials is less than about 0.1 cc/g. In one embodiment, the total pore volume of the composite materials is less than about 0.05 cc/g. In one embodiment, the total pore volume of the composite materials is less than about 0.03 cc/g. In one embodiment, the total pore volume of the composite materials is less than about 0.02 cc/g. In one embodiment, the total pore volume of the composite materials is less than about 0.01 cc/g. In another embodiment, the total pore volume of the composite materials is less than about 0.001 cc/g. In yet another embodiment, the total pore volume of the composite materials is less than about 0.0001 cc/g.

In one embodiment, the total pore volume of the composite material comprising a porous silicon material ranges from about 0.00001 cc/g to about 0.2 cc/g, for example from about 0.0001 cc/g to about 0.001 cc/g. In some other embodiments, the total pore volume of the composite materials ranges from about 0.001 cc/g to about 0.01 cc/g. In some other embodiments, the total pore volume of the composite materials ranges from about 0.01 cc/g to about 0.02 cc/g. In some other embodiments, the total pore volume of the composite materials ranges from about 0.02 cc/g to about 0.03 cc/g. In some other embodiments, the total pore volume of the composite materials ranges from about 0.03 cc/g to about 0.05 cc/g. In some other embodiments, the total pore volume of the composite materials ranges from about 0.05 cc/g to about 0.1 cc/g. In some other embodiments, the total pore volume of the composite materials ranges from about 0.1 cc/g to about 0.2 cc/g.

The composite material comprising a porous silicon material may comprise a majority (e.g., >50%) of the total pore volume residing in pores of certain diameter. For example, in some embodiments greater than 50%, greater than 60%, greater than 70%, greater than 80%, greater than 90% or even greater than 95% of the total pore volume resides in pores having a diameter of 1 nm or less. In other embodiments greater than 50%, greater than 60%, greater than 70%, greater than 80%, greater than 90% or even greater than 95% of the total pore volume resides in pores having a diameter of 100 nm or less. In other embodiments greater than 50%, greater than 60%, greater than 70%, greater than 80%, greater than 90% or even greater than 95% of the total pore volume resides in pores having a diameter of 0.5 nm or less.

In some embodiments, the tap density of the composite material comprising a porous silicon material may be predictive of their electrochemical performance, for example the volumetric capacity. While not limiting in any way, the pore volume of a composite material may be related to its tap density and composite s having low pore volume are sometimes found to have high tap density (and vice versa). Accordingly, composite materials having low tap density (e.g., <0.3 cc/cc), medium tap density (e.g., from 0.3 to 0.75 g/cc) or high tap density (e.g., >0.75 g/cc) are provided.

In some other embodiments, the composite material comprising a porous silicon material comprises a tap density less than 0.3 g/cc. In yet some other embodiments, the composite material comprises a tap density ranging from about 0.05 g/cc to about 0.25 g/cc. In some embodiments, the composite material comprises a tap density ranging from about 0.1 g/cc to about 0.2 g/cc.

In yet some other embodiments, the composite material comprising a porous silicon material comprises a tap density greater than or equal to 0.3 g/cc. In yet some other embodiments, the composite material comprises a tap density ranging from about 0.3 g/cc to about 0.75 g/cc. In some embodiments, the composite material comprises a tap density ranging from about 0.35 g/cc to about 0.45 g/cc. In some other embodiments, the composite material comprises a tap density ranging from about 0.30 g/cc to about 0.40 g/cc. In some embodiments, the composite material comprises a tap density ranging from about 0.40 g/cc to about 0.50 g/cc. In some embodiments, the composite material comprises a tap density ranging from about 0.5 g/cc to about 0.75 g/cc. In some embodiments, the composite materials comprises a tap density ranging from about 0.75 g/cc to about 0.9 g/cc. In some embodiments, the composite material comprises a tap density ranging from about 0.9 g/cc to about 1.2 g/cc. In some embodiments, the composite material comprises a tap density ranging from about 1 g/cc to 1.2 g/cc.

In yet some other embodiments, the composite material comprising a porous silicon material comprises a tap density greater than about 0.5 g/cc. In some other embodiments, the composite material comprises a tap density ranging from about 0.5 g/cc to about 2.0 g/cc. In some other embodiments, the composite material comprises a tap density ranging from about 0.5 g/cc to about 1.0 g/cc. In some embodiments, the composite material comprises a tap density ranging from about 0.5 g/cc to about 0.75 g/cc. In some embodiments, the composite material comprises a tap density ranging from about 0.75 g/cc to about 1.0 g/cc, for example from about 0.75 g/cc to about 0.95 g/cc The density of the composite material comprising a porous silicon material can also be characterized by their skeletal density as measured by helium pycnometry. In certain embodiments, the skeletal density of the composite material ranges from about 1 g/cc to about 3 g/cc, for example from about 1.5 g/cc to about 2.3 g/cc. In other embodiments, the skeletal density ranges from about 1.5 cc/g to about 1.6 cc/g, from about 1.6 cc/g to about 1.7 cc/g, from about 1.7 cc/g to about 1.8 cc/g, from about 1.8 cc/g to about 1.9 cc/g, from about 1.9 cc/g to about 2.0 cc/g, from about 2.0 cc/g to about 2.1 cc/g, from about 2.1 cc/g to about 2.2 cc/g or from about 2.2 cc/g to about 2.4 cc/g.

As discussed in more detail below, the surface functionality of the presently disclosed composite material comprising a porous silicon material may be altered to obtain the desired electrochemical properties. One property which can be predictive of surface functionality is the pH of the composite materials. The presently disclosed composite materials comprise pH values ranging from less than 1 to about 14, for example less than 5, from 5 to 8 or greater than 8. In some embodiments, the pH of the composite materials is less than 4, less than 3, less than 2 or even less than 1. In other embodiments, the pH of the composite materials is between about 5 and 6, between about 6 and 7, between about 7 and 8 or between 8 and 9 or between 9 and 10. In still other embodiments, the pH is high and the pH of the composite materials ranges is greater than 8, greater than 9, greater than 10, greater than 11, greater than 12, or even greater than 13.

Pore size distribution of the composite material may be important to both the storage capacity of the material and the kinetics and power capability of the system as well as the ability to incorporate large amounts of electrochemical modifiers. The pore size distribution can range from micro- to meso- to macropore sized and may be either monomodal, bimodal or multimodal. Micropores, with average pore sizes less than 1 nm, may create additional storage sites as well as lithium (or sodium) ion diffusion paths. Graphite sheets typically are spaced 0.33 nm apart for lithium storage. While not wishing to be bound by theory, it is thought that large quantities of pores of similar size may yield graphite-like structures within pores with additional hard carbon-type storage in the bulk structure. Mesopores are typically below 100 nm. These pores are ideal locations for nano particle dopants, such as metals, and provide pathways for both conductive additive and electrolyte for ion and electron conduction. In some embodiments the carbon materials comprise macropores greater than 100 nm which may be especially suited for large particle doping.

Pore size distribution of the composite material comprising a porous silicon material may be important to both the storage capacity of the material and the kinetics and power capability of the system as well as the ability to incorporate large amounts of electrochemical modifiers. The pore size distribution can range from micro to meso to macro and may be either monomodal, bimodal or multimodal. In some embodiments the composite materials comprise micropores less than 100 nm which may be especially suited for lithium diffusion.

Accordingly, in one embodiment, the composite material comprises a fractional pore volume of pores at or below 1 nm that comprises at least 50% of the total pore volume, at least 75% of the total pore volume, at least 90% of the total pore volume or at least 99% of the total pore volume. In other embodiments, the carbon material comprises a fractional pore volume of pores at or below 10 nm that comprises at least 50% of the total pore volume, at least 75% of the total pore volume, at least 90% of the total pore volume or at least 99% of the total pore volume. In other embodiments, the carbon material comprises a fractional pore volume of pores at or below 50 nm that comprises at least 50% of the total pore volume, at least 75% of the total pore volume, at least 90% of the total pore volume or at least 99% of the total pore volume.

In another embodiment, the composite material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or greater than 100 nm that comprises at least 50% of the total pore surface area, at least 75% of the total pore surface area, at least 90% of the total pore surface area or at least 99% of the total pore surface area.

In another embodiment, the composite material comprises pores predominantly in the range of 100 nm or lower, for example 10 nm or lower, for example 5 nm or lower. Alternatively, the carbon material comprises micropores in the range of 0-2 nm and mesopores in the range of 2-100 nm. The ratio of pore volume or pore surface in the micropore range compared to the mesopore range can be in the range of 95:5 to 5:95.

In some embodiments, the median particle diameter for the composite material comprising a porous silicon material ranges from 0.5 to 1000 microns. In other embodiments the median particle diameter for the composite materials ranges from 1 to 100 microns. Still in other embodiments the median particle diameter for the composite materials ranges from 1 to 50 microns. Yet in other embodiments, the median particle diameter for the composite materials ranges from 5 to 15 microns or from 1 to 5 microns. Still in other embodiments, the median particle diameter for the composite materials is about 10 microns. Still in other embodiments, the median particle diameter for the composite materials is less than 4, is less than 3, is less than 2, is less than 1 microns.

In some embodiments, the composite material comprising a porous silicon material exhibit a median particle diameter ranging from 1 micron to 5 microns. In other embodiments, the median particle diameter ranges from 5 microns to 10 microns. In yet other embodiments, the median particle diameter ranges from 10 nm to 20 microns. Still in other embodiments, the median particle diameter ranges from 20 nm to 30 microns. Yet still in other embodiments, the median particle diameter ranges from 30 microns to 40 microns. Yet still in other embodiments, the median particle diameter ranges from 40 microns to 50 microns. In other embodiments, the median particle diameter ranges from 50 microns to 100 microns. In other embodiments, the median particle diameter ranges in the submicron range <1 micron.

In other embodiments, the composite material is microporous (e.g., greater than 50% of pores less than 1 nm) and comprise monodisperse micropores. For example in some embodiments the carbon materials without electrochemical modifier are microporous, and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In other embodiments, the composite materials is mesoporous (e.g., greater than 50% of pores less than 100 nm) and comprise monodisperse mesopores. For example in some embodiments, the carbon materials without electrochemical modifier are mesoporous and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In other embodiments, the composite material is macroporous (e.g., greater than 50% of pores greater than 100 nm) and comprise monodisperse macropores. For example in some embodiments, the carbon materials without electrochemical modifier are macroporous and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In some other embodiments, the composite material has a bimodal pore size distribution. For example, the carbon materials without electrochemical modifier may comprise a population of micropores and a population of mesopores. In some embodiments, the ratio of micropores to mesopores ranges from about 1:10 to about 10:1, for example from about 1:3 to about 3:1.

In some embodiments, the composite material comprises pores having a peak height found in the pore volume distribution ranging from 1 nm to 2 nm. In other embodiments, the peak height found in the pore volume distribution ranges from 2 nm to 5 nm. Yet in other embodiments, the peak height found in the pore volume distribution ranges from 5 nm to 10 nm. Still in other embodiments, the peak height found in the pore volume distribution ranges from 1 nm to 5 nm. Yet still in other embodiments, the peak height found in the pore volume distribution ranges from 5 nm to 10 nm.

In some embodiments, the composite material comprises pores having a peak height found in the pore volume distribution ranging from 2 nm to 10 nm. In other embodiments, the peak height found in the pore volume distribution ranges from 10 nm to 20 nm. Yet in other embodiments, the peak height found in the pore volume distribution ranges from 20 nm to 30 nm. Still in other embodiments, the peak height found in the pore volume distribution ranges from 30 nm to 40 nm. Yet still in other embodiments, the peak height found in the pore volume distribution ranges from 40 nm to 50 nm. In other embodiments, the peak height found in the pore volume distribution ranges from 50 nm to 100 nm.

The present inventors have found that the extent of disorder in the carbon within the composite material may have an impact on the electrochemical properties. Thus, controlling the extent of carbon disorder in the composite material provides a possible avenue to improve the rate capability for carbons since a smaller crystallite size may allow for lower resistive lithium ion diffusion through the amorphous structure. The present invention includes embodiments which comprise both high and low levels of disorder.

Figure 4:
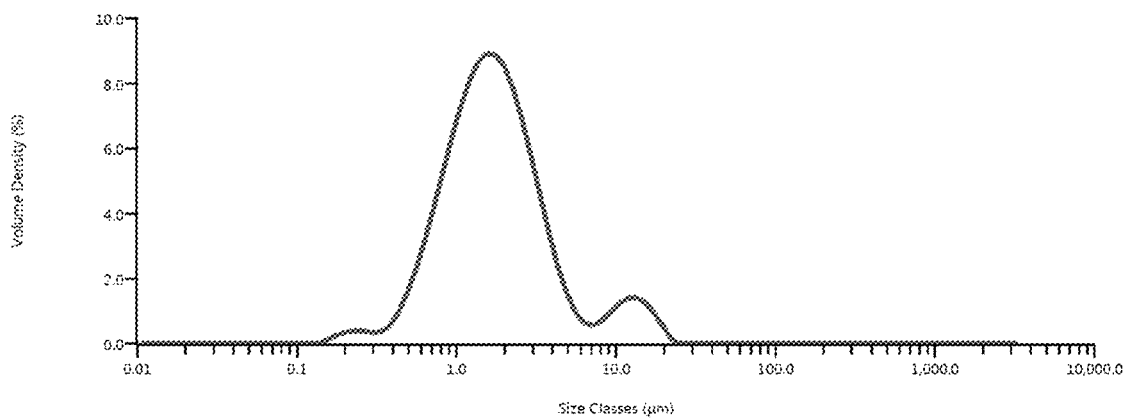
FIG. 4. Example particle size distribution for non-porous silicon.

Disorder, as recorded by RAMAN spectroscopy, is a measure of the size of the crystallites found within both amorphous and crystalline structures (M. A. Pimenta, G. Dresselhaus, M. S. Dresselhaus, L. G. Can ado, A. Jorio, and R. Saito, "Studying disorder in graphite-based systems by Raman spectroscopy," Physical Chemistry Chemical Physics, vol. 9, no. 11, p. 1276, 2007). RAMAN spectra of exemplary carbon are shown in FIG. 4. For carbon structures, crystallite sizes ($L_a$) can be calculated from the relative peak intensities of the D and G Raman shifts (Eq 1)

$$L_a(nm) = (2.4 \times 10^{10}) \lambda^4_{laser} R^{-1} \quad (1)$$

where $$R = I_D/I_G \quad (2)$$

The values for R and $L_a$ can vary in certain embodiments, and their value may affect the electrochemical properties of the carbon materials, for example the capacity of the $2^{nd}$ lithium insertion ($2^{nd}$ lithium insertion is related to first cycle efficiency since first cycle efficiency=(capacity at $1^{st}$ lithium insertion/capacity at $2^{nd}$ lithium insertion)×100). For example, in some embodiments R ranges from about 0 to about 1 or from about 0.50 to about 0.95. In other embodiments, R ranges from about 0.60 to about 0.90. In other embodiments, R ranges from about 0.80 to about 0.90. $L_a$ also varies in certain embodiments and can range from about 1 nm to about 500 nm. In certain other embodiments, $L_a$ ranges from about 5 nm to about 100 nm or from about 10 to about 50 nm. In other embodiments, $L_a$ ranges from about 15 nm to about 30 nm, for example from about 20 to about 30 nm or from about 25 to 30 nm.

In a related embodiment, the electrochemical properties of the composite material is related to the level of crystallinity as measured by X-ray diffraction (XRD). While Raman measures the size of the crystallites, XRD records the level of periodicity in the bulk structure through the scattering of incident X-rays. The present invention includes materials that are non-graphitic (crystallinity <10%) and semi-graphitic (crystallinity between 10 and 50%). The crystallinity of the carbon materials without electrochemical modifier ranges from about 0% to about 99%. In some embodiments, the carbon materials without electrochemical modifier comprise less than 10% crystallinity, less than 5% crystallinity or even less than 1% crystallinity (i.e., highly amorphous). In other embodiments, the carbon materials without electrochemical modifier comprise from 10% to 50% crystallinity. In still other embodiments, the carbon materials without electrochemical modifier comprise less than 50% crystallinity, less than 40% crystallinity, less than 30% crystallinity or even less than 20% crystallinity.

In a related embodiment, the electrochemical properties of the composite material comprising a porous silicon material are related to the level of crystallinity as measured by X-ray diffraction (XRD). The present invention includes materials that are non-crystalline (crystallinity <10%) and semi-crystalline (crystallinity between 10 and 50%) and crystalline (>50%). The crystallinity of the composite materials ranges from about 0% to about 99%. In some embodiments, the carbon materials without electrochemical modifier comprise less than 10% crystallinity, less than 5% crystallinity or even less than 1% crystallinity (i.e., highly amorphous). In other embodiments, the composite materials comprise from 10% to 50% crystallinity. In still other embodiments, the composite materials comprise less than 50% crystallinity, less than 40% crystallinity, less than 30% crystallinity or even less than 20% crystallinity.

The carbon materials without electrochemical modifier may also comprise varying amounts of carbon, oxygen, hydrogen and nitrogen as measured by gas chromatography CHNO analysis. In one embodiment, the carbon content is greater than 98 wt. % or even greater than 99.9 wt % as measured by CHNO analysis. In another embodiment, the carbon content ranges from about 10 wt % to about 99.9%, for example from about 50 to about 98 wt. % of the total mass. In yet other embodiments, the carbon content ranges 90 to 98 wt. %, 92 to 98 wt % or greater than 95% of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass. In yet other embodiments, the carbon content ranges of the composite from 50 to 60 wt. % of the total mass. In yet other embodiments, the carbon content ranges of the composite from 40 to 50 wt. % of the total mass. In yet other embodiments, the carbon content ranges of the composite from 30 to 40 wt. % of the total mass. In yet other embodiments, the carbon content ranges of the composite from 20 to 30 wt. % of the total mass. In yet other embodiments, the carbon content ranges of the composite from 10 to 20 wt. % of the total mass. In yet other embodiments, the carbon content ranges of the composite from 1 to 10 wt. % of the total mass.

In another embodiment, the nitrogen content ranges from 0 to 90 wt. % based on total mass of all components in the carbon material as measured by CHNO analysis. In another embodiment, the nitrogen content ranges from 1 to 10 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %. In some more specific embodiments, the nitrogen content ranges from about 1% to about 6%, while in other embodiments, the nitrogen content ranges from about 0.1% to about 1%. In certain of the above embodiments, the nitrogen content is based on weight relative to total weight of all components in the carbon material The carbon and nitrogen content may also be measured as a ratio of C:N (carbon atoms to nitrogen atoms). In one embodiment, the C:N ratio ranges from 1:0.001 to 0.001:1 or from 1:0.001 to 1:1. In another embodiment, the C:N ratio ranges from 1:0.001 to 1:0.01. In yet another embodiment, the C:N ratio ranges from 1:0.01 to 1:1. In yet another embodiment, the content of nitrogen exceeds the content of carbon, for example the C:N ratio can range from about 0.01:1 to about 0.1:1 or from 0.1:1 to about 0.5:1.

The composite material comprising a porous silicon material may also comprise varying amounts of carbon, oxygen, nitrogen, Cl, and Na, to name a few, as measured by XPS analysis. In one embodiment, the carbon content is greater than 98 wt. % as measured by XPS analysis. In another embodiment, the carbon content ranges from 50 to 98 wt. % of the total mass. In yet other embodiments, the carbon content ranges 90 to 98 wt. % of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass.

In other embodiments, the carbon content ranges from 10% to 99.9%, from 10% to 99%, from 10% to 98%, from 50% to 99.9%, from 50% to 99%, from 50% to 98%, from 75% to 99.9%, from 75% to 99% or from 75% to 98% of the total mass of all components in the carbon material as measured by XPS analysis In another embodiment, the nitrogen content ranges from 0 to 90 wt. % as measured by XPS analysis. In another embodiment, the nitrogen content ranges from 1 to 75 wt. % of the total mass. In another embodiment, the nitrogen content ranges from 1 to 50 wt. % of the total mass. In another embodiment, the nitrogen content ranges from 1 to 25 wt. % of the total mass. In another embodiment, the nitrogen content ranges from 1 to 20 wt. % of the total mass. In another embodiment, the nitrogen content ranges from 1 to 10 wt. % of the total mass. In another embodiment, the nitrogen content ranges from 1 to 6 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %.

The carbon and nitrogen content may also be measured as a ratio of C:N by XPS. In one embodiment, the C:N ratio of the composite ranges from 0.001:1 to 1:0.001. In one embodiment, the C:N ratio ranges from 0.01:1 to 1:0.01. In one embodiment, the C:N ratio ranges from 0.1:1 to 1:0.01. In one embodiment, the C:N ratio ranges from 1:0.5 to 1:0.001. In one embodiment, the C:N ratio ranges from 1:0.5 to 1:0.01. In one embodiment, the C:N ratio ranges from 1:0.5 to 1:0.1. In one embodiment, the C:N ratio ranges from 1:0.2 to 1:0.01. In one embodiment, the C:N ratio ranges from 1:0.001 to 1:1. In another embodiment, the C:N ratio ranges from 1:0.001 to 0.01. In yet another embodiment, the C:N ratio ranges from 1:0.01 to 1:1. In yet another embodiment, the content of nitrogen exceeds the content of carbon.

The carbon and phosphorus content of the composite may also be measured as a ratio of C:P by XPS. In one embodiment, the C:P ratio of the composite ranges from 0.001:1 to 1:0.001. In one embodiment, the C:P ratio ranges from 0.01:1 to 1:0.01. In one embodiment, the C:P ratio ranges from 0.1:1 to 1:0.01. In one embodiment, the C:P ratio ranges from 1:0.5 to 1:0.001. In one embodiment, the C:P ratio ranges from 1:0.5 to 1:0.01. In one embodiment, the C:P ratio ranges from 1:0.5 to 1:0.1. In one embodiment, the C:P ratio ranges from 1:0.2 to 1:0.01. In one embodiment, the C:P ratio ranges from 1:0.001 to 1:1. In another embodiment, the C:P ratio ranges from 1:0.001 to 0.01. In yet another embodiment, the C:P ratio ranges from 1:0.01 to 1:1. In yet another embodiment, the content of nitrogen exceeds the content of carbon.

XPS may also be used to detect individual bonds between elements. In the case of a modified carbon, the interface between the carbon and the electrochemical modifier may include an C—X bond, wherein X is the primary element that alloys with lithium (such as C—Si bond for a silicon electrochemical modifier). The presence of C—X may affect the performance of the material. This percent of C—X bonds within a composite can be characterized using XPS. In one embodiment the percent of C—X bonds as measured by XPS is between 0% and 50%. In another embodiment the percent of C—X bonds is between 0% and 10%, 0% and 5%, 0% and 3%, 0% and 2%, 0% and 1%, 1% and 2%, between 10% and 50%, or greater than 50%. In yet another embodiment, the C—X bond also produces a material in-situ that is also capable of alloying electrochemically with silicon.

The carbon material can include both sp3 and sp2 hybridized carbons. The percentage of sp2 hybridization can be measured by XPS using the Auger spectrum, as known in the art. It is assumed that for materials which are less than 100% sp2, the remainder of the bonds are sp3. The carbon materials range from about 1% sp2 hybridization to 100% sp2 hybridization. Other embodiments include carbon materials comprising from about 25% to about 95% sp2, from about 50%-95% sp2, from about 50% to about 75% sp2, from about 65% to about 95% sp2 or about 65% sp2.

In certain embodiments, XPS can be examined to determine the specific nature of specific bonding structures within the nano featured porous silicon. For example, XPS can be examined in the region in the vicinity of 100 eV to ascertain details of Si 2p bonding in the silicon structure. In certain embodiments, the porous silicon material comprises elemental silicon exhibiting an XPS peak located at 99.4 eV. In certain embodiments, the porous silicon material comprises Si3N4 exhibiting an XPS peak located at 101.7 eV. In certain embodiments, the porous silicon material comprises organic silicon exhibiting an XPS peak located at 102 eV. In certain embodiments, the porous silicon material comprises organic silicon exhibiting an XPS peak located at 103.5 eV.

The composite material comprising a porous silicon material may also be created by incorporation of an electrochemical modifier selected to optimize the electrochemical performance of the non-modified carbon materials. The electrochemical modifier may be incorporated within the pore structure and/or on the surface of the carbon material or incorporated in any number of other ways. For example, in some embodiments, the composite materials comprise a coating of the electrochemical modifier (e.g., silicon or $Al_2O_3$) on the surface of the carbon materials. In some embodiments, the composite materials comprise greater than about 100 ppm of an electrochemical modifier. In certain embodiments, the electrochemical modifier is selected from iron, tin, silicon, nickel, aluminum and manganese.

In certain embodiments the electrochemical modifier comprises an element with the ability to lithiate from 3 to 0 V versus lithium metal (e.g. silicon, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$. In yet other embodiments, the electrochemical modifier comprises titanium. In yet other embodiments, the electrochemical modifier comprises titanium oxide. In yet other embodiments, the electrochemical modifier comprises lithium. In yet other embodiments, the electrochemical modifier comprises sulfur. In yet other embodiments, the electrochemical modifier comprises phosphorous. In yet other embodiments, the electrochemical modifier comprises molybdenum. In yet other embodiments, the electrochemical modifier comprises germanium. In yet other embodiments, the electrochemical modifier comprises arsenic. In yet other embodiments, the electrochemical modifier comprises gallium. In yet other embodiments, the electrochemical modifier comprises phosphorous. In yet other embodiments, the electrochemical modifier comprises selenium. In yet other embodiments, the electrochemical modifier comprises antimony. In yet other embodiments, the electrochemical modifier comprises bismuth. In yet other embodiments, the electrochemical modifier comprises tellurium. In yet other embodiments, the electrochemical modifier comprises indium.

Accordingly, in some embodiments the composite material comprising a porous silicon material comprise a second carbon allotrope such as, but not limited to, graphite, amorphous carbon (soft and hard), diamond, C60, carbon nanotubes (e.g., single and/or multi-walled), graphene and carbon fibers. In some embodiments, the second carbon form is graphite. In other embodiments, the second form is soft carbon. The ratio of carbon material (e.g., hard carbon) to second carbon allotrope can be tailored to fit any desired electrochemical application. The second carbon allotrope is considered the electrochemical modifier of the hard carbon if and only if the second allotrope exhibits alloying behavior with lithium ions during an electrochemical reaction.

In certain embodiments, the mass ratio of hard carbon to second carbon allotrope in the composite materials ranges from about 0.01:1 to about 100:1. In other embodiments, the mass ratio of hard carbon to second carbon allotrope ranges from about 1:1 to about 10:1 or about 5:1. In other embodiments, the mass ratio of hard carbon to second carbon allotrope ranges from about 1:10 to about 10:1. In other embodiments, the mass ratio of hard carbon to second carbon allotrope ranges from about 1:5 to about 5:1. In other embodiments, the mass ratio of hard carbon to second carbon allotrope ranges from about 1:3 to about 3:1. In other embodiments, the mass ratio of hard carbon to second carbon allotrope ranges from about 1:2 to about 2:1.

Multiple carbon allotropes can be combined within a single composite to further improve electrochemical performance. For example, a hard carbon can be blended with both graphite and soft carbon to change the density as well as the capacity or first cycle efficiency. The three or more carbon allotropes will have a synergistic effect, creating a unique structure and performance. In certain embodiments, the mass ratio of hard carbon to the sum of the masses for all other carbon allotropes present in the composite material ranges from about 0.01:1 to about 100:1. In other embodiments, the mass ratio of hard carbon to the sum of the masses for all other carbon allotropes in the composite material ranges from about 1:1 to about 10:1 or about 5:1. In other embodiments the mass ratio of hard carbon to the sum of the masses for all other carbon allotropes in the composite material ranges from about 1:10 to about 10:1. In other embodiments, the mass ratio of hard carbon to the sum of the masses for all other carbon allotropes in the composite material ranges from about 1:5 to about 5:1. In other embodiments, the mass ratio of hard carbon to the sum of the masses for all other carbon allotropes in the composite material ranges from about 1:3 to about 3:1. In other embodiments, the mass ratio of hard carbon to the sum of the masses for all other carbon allotropes in the composite material ranges from about 1:2 to about 2:1.

The electrochemical properties of the composite material comprising a porous silicon material can be modified, at least in part, by the amount of the electrochemical modifier in the carbon material, wherein the electrochemical modifier is an alloying material such as silicon, tin, indium, aluminum, germanium, gallium. Accordingly, in some embodiments, the composite material comprising a porous silicon material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the composite materials comprise between 0.5% and 99.5% carbon and between 0.5% and 99.5% electrochemical modifier. In a preferred embodiment, the composite material comprises 70%-99% silicon, for example between 75% and 95%, for example between 80% and 95%. The percent of the electrochemical modifier is calculated on weight percent basis (wt %). In some other more specific embodiments, the electrochemical modifier comprises iron, tin, silicon, nickel and manganese. In a preferred embodiment, the composite material comprises 70%-99% silicon, for example between 75% and 95%, for example between 80% and 95%.

The silicon-carbon composite materials disclosed herein have purities not previously obtained for portion of their mass comprising carbon. While not wishing to be bound by theory, it is believed that the high purity of the carbon materials within the silicon-carbon composite contributes to the superior electrochemical properties of the same. In some embodiments, the carbon within the silicon-carbon composite comprises low total TXRF impurities (excluding any intentionally included electrochemical modifier). Thus, in some embodiments the total TXRF impurity content (excluding any intentionally included electrochemical modifier) of all other TXRF elements in the carbon material (as measured by proton induced x-ray emission) is less than 1000 ppm. In other embodiments, the total TXRF impurity content (excluding any intentionally included electrochemical modifier) of all other TXRF elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm.

In addition to low content of undesired TXRF impurities, the carbon within the silicon-carbon composite materials may comprise high total carbon content. In some examples, in addition to carbon, the carbon material may also comprise oxygen, hydrogen, nitrogen and an optional electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of the carbon within the silicon-carbon composite may, in some instances, have an effect on the electrochemical performance of the composite material. Accordingly, in some embodiments, the ash content (excluding any intentionally included electrochemical modifier) of the carbon within the silicon-carbon composite ranges from 0.1% to 0.001% weight percent ash, for example in some specific embodiments the ash content (excluding any intentionally included electrochemical modifier) of the carbon material is less than 0.1%, less than 0.08%, less than 0.05%, less than 0.03%, than 0.025%, less than 0.01%, less than 0.0075%, less than 0.005% or less than 0.001%.

In other embodiments, the composite material comprising a porous silicon material comprises a total TXRF impurity content of all other elements (excluding any intentionally included electrochemical modifier) of less than 500 ppm and an ash content (excluding any intentionally included electrochemical modifier) of less than 0.08%. In further embodiments, the composite material comprises a total TXRF impurity content of all other elements (excluding any intentionally included electrochemical modifier) of less than 300 ppm and an ash content (excluding any intentionally included electrochemical modifier) of less than 0.05%. In other further embodiments, the composite material comprises a total TXRF impurity content of all other elements (excluding any intentionally included electrochemical modifier) of less than 200 ppm and an ash content (excluding any intentionally included electrochemical modifier) of less than 0.05%. In other further embodiments, the composite material comprises a total TXRF impurity content of all other elements (excluding any intentionally included electrochemical modifier) of less than 200 ppm and an ash content (excluding any intentionally included electrochemical modifier) of less than 0.025%. In other further embodiments, the composite material comprises a total TXRF impurity content of all other elements (excluding any intentionally included electrochemical modifier) of less than 100 ppm and an ash content (excluding any intentionally included electrochemical modifier) of less than 0.02%. In other further embodiments, the composite material comprises a total TXRF impurity content of all other elements (excluding any intentionally included electrochemical modifier) of less than 50 ppm and an ash content (excluding any intentionally included electrochemical modifier) of less than 0.01%.

In other embodiments, the composite material comprising a porous silicon material comprises a total TXRF impurity content of all other elements (excluding any intentionally included electrochemical modifier) of greater than 500 ppm and an ash content (excluding any intentionally included electrochemical modifier) of greater than 0.08%. In further embodiments, the composite material comprises a total TXRF impurity content of all other elements (excluding any intentionally included electrochemical modifier) of greater than 5000 ppm and an ash content (excluding any intentionally included electrochemical modifier) of greater than 0.5%. In other further embodiments, the composite material comprises a total TXRF impurity content of all other elements (excluding any intentionally included electrochemical modifier) of greater than 1% and an ash content (excluding any intentionally included electrochemical modifier) of greater than 0.5%. In other further embodiments, the composite material comprises a total TXRF impurity content of all other elements (excluding any intentionally included electrochemical modifier) of greater than 2% and an ash content (excluding any intentionally included electrochemical modifier) of greater than 1%. In other further embodiments, the composite material comprises a total TXRF impurity content of all other elements (excluding any intentionally included electrochemical modifier) of greater than 3% and an ash content (excluding any intentionally included electrochemical modifier) of greater than 2%. In other further embodiments, the composite material comprises a total TXRF impurity content of all other elements (excluding any intentionally included electrochemical modifier) of greater than 4% and an ash content (excluding any intentionally included electrochemical modifier) of greater than 3%. In other further embodiments, the composite material comprises a total TXRF impurity content of all other elements (excluding any intentionally included electrochemical modifier) of greater than 5% and an ash content (excluding any intentionally included electrochemical modifier) of greater than 4%. In other further embodiments, the composite material comprises a total TXRF impurity content of all other elements (excluding any intentionally included electrochemical modifier) of greater than 6% and an ash content (excluding any intentionally included electrochemical modifier) of greater than 5%. In other further embodiments, the composite material comprises a total TXRF impurity content of all other elements (excluding any intentionally included electrochemical modifier) of greater than 7% and an ash content (excluding any intentionally included electrochemical modifier) of greater than 6%. In other further embodiments, the composite material comprises a total TXRF impurity content of all other elements (excluding any intentionally included electrochemical modifier) of greater than 8% and an ash content (excluding any intentionally included electrochemical modifier) of greater than 7%. In other further embodiments, the composite material comprises a total TXRF impurity content of all other elements (excluding any intentionally included electrochemical modifier) of greater than 9% and an ash content (excluding any intentionally included electrochemical modifier) of greater than 8%. In other further embodiments, the composite material comprises a total TXRF impurity content of all other elements (excluding any intentionally included electrochemical modifier) of greater than 10% and an ash content (excluding any intentionally included electrochemical modifier) of greater than 9%.

The amount of individual TXRF impurities present in the disclosed composite material comprising a porous silicon material can be determined by proton induced x-ray emission. Individual TXRF impurities may contribute in different ways to the overall electrochemical performance of the disclosed composite materials. Thus, in some embodiments, the level of sodium present in the composite material is less than 1000 ppm, less than 500 ppm, less than 100 ppm, less than 50 ppm, less than 10 ppm, or less than 1 ppm. In some embodiments, the level of magnesium present in the composite material is less than 1000 ppm, less than 100 ppm, less than 50 ppm, less than 10 ppm, or less than 1 ppm. In some embodiments, the level of aluminum present in the composite material is less than 1000 ppm, less than 100 ppm, less than 50 ppm, less than 10 ppm, or less than 1 ppm. In some embodiments, the level of silicon present in the composite material is less than 500 ppm, less than 300 ppm, less than 100 ppm, less than 50 ppm, less than 20 ppm, less than 10 ppm or less than 1 ppm. In some embodiments, the level of phosphorous present in the composite material is less than 1000 ppm, less than 100 ppm, less than 50 ppm, less than 10 ppm, or less than 1 ppm. In some embodiments, the level of sulfur present in the composite material is less than 1000 ppm, less than 100 ppm, less than 50 ppm, less than 30 ppm, less than 10 ppm, less than 5 ppm or less than 1 ppm. In some embodiments, the level of chlorine present in the composite material is less than 1000 ppm, less than 100 ppm, less than 50 ppm, less than 10 ppm, or less than 1 ppm. In some embodiments, the level of potassium present in the composite material is less than 1000 ppm, less than 100 ppm, less than 50 ppm, less than 10 ppm, or less than 1 ppm. In other embodiments, the level of calcium present in the composite material is less than 100 ppm, less than 50 ppm, less than 20 ppm, less than 10 ppm, less than 5 ppm or less than 1 ppm. In some embodiments, the level of chromium present in the composite material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the composite material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the composite material is less than 20 ppm, less than 10 ppm, less than 5 ppm, less than 4 ppm, less than 3 ppm, less than 2 ppm or less than 1 ppm. In some other embodiments, the level of copper present in the composite material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the composite material is less than 20 ppm, less than 10 ppm, less than 5 ppm, less than 2 ppm or less than 1 ppm. In yet other embodiments, the sum of all other TXRF impurities (excluding any intentionally included electrochemical modifier) present in the composite material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the unmodified composite material comprising a porous silicon material comprises undesired TXRF impurities near or below the detection limit of the proton induced x-ray emission analysis. For example, in some embodiments the unmodified composite material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some embodiments, the unmodified composite material comprising a porous silicon material comprises undesired TXRF impurities near or below the detection limit of the proton induced x-ray emission analysis. In some specific embodiments, the unmodified composite material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by TXRF. In other specific embodiments, the composite material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the unmodified composite material comprising a porous silicon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the unmodified composite material comprising a porous silicon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

In certain embodiments, the composite material comprising a porous silicon material comprises carbon and two or more different electrochemical modifiers. In embodiments, the composite material comprises silicon and one or more of the following species (or combinations thereof): phosphorus, nitrogen, sulfur, boron or aluminum. In certain embodiments, the composite material comprises carbon, silicon and 1-20% of a Group 13 element or combination thereof. In other certain embodiments, the composite material comprises carbon, silicon and 1-20% of a Group 15 element, or combination thereof. In other certain embodiments, the composite material comprises carbon, silicon and 1-20% of lithium, sodium, or potassium, or combinations thereof. In other certain embodiments, the composite material comprises carbon, silicon and 1-20% of lithium, sodium, or potassium, or combinations thereof.

The composite material comprising a porous silicon material may include various surface treatment or properties in order to further improve the electrochemical performance as defined by capacity, stability and power performance. In one embodiment the composite is covered by an ionically conductive polymer with a thickness between 1 nm and 10 microns. In another embodiment the composite is covered by a ceramic protective coating with a thickness between 1 nm and 10 microns. In yet another embodiment the composite is covered by an organic film with a thickness between 1 nm and 10 microns. The thickness can be measured with a variety of techniques known in the art such as but not limited to XPS sputtering, FIB/SEM or SIMS.

The particle size of the composite material comprising a porous silicon material may expand upon lithiation as compared to the non-lithiated state. For example, the expansion factor, defined as ratio of the average particle size of particles of composite material comprising a porous silicon material upon lithiation divided by the average particle size under non-lithiated conditions. As described in the art, this expansion factor can be relative large for previously known, non-porous silicon materials, for example about 4 (corresponding to a 400% volume expansion upon lithiation). The current inventors have discovered composite materials comprising a porous silicon material that can exhibit a lower extent of expansion, for example, the expansion factor can vary from 3.5 to 4, from 3.0 to 3.5, from 2.5 to 3.0, from 2.0 to 2.5, from 1.5 to 2.0, from 1.0 to 1.5.

E. Physicochemical and Electrochemical Properties of Composites Comprising Carbon and Porous Silicon Materials The physicochemical properties of the composite comprising carbon and porous silicon material can vary. For example, the average particle size of the composite comprising carbon and porous silicon material can range from 1 nm to 1 mm, for example from 1 nm to 10 nm, from 10 nm to 100 nm, from 100 nm to 1 um, from 1 um to 2 um, from 2 um to 5 um, from 5 um to 10 um, from 10 um to 20 um, from 20 um to 100 um, from 100 um to 1 mm. In some embodiments, the average particle size of the composite comprising carbon and porous silicon material is about 1 um, about 2 um, about 5 um, about 10 um, about 20 um. The span (Dv50)/(Dv90-Dv10), wherein Dv10, Dv50 and Dv90 represent the particle size at 10%, 50%, and 90% of the volume distribution, can be varied from example from 100 to 10, from 10 to 5, from 5 to 2, from 2 to 1; in some embodiments the span can be less than 1. In certain embodiments, the composite comprising carbon and porous silicon material particle size distribution can be multimodal, for example, bimodal, or trimodal.

In preferred embodiments, the porous silicon comprising the composite is nano-sized and comprises nano-sized features. The Dv50 for the nano-sized silicon particles comprising nano-sized features can be between 1 nm and 1 um, for example between 300 nm and 1 um, for example between 150 nm and 300 nm, for example between 50 nm and 150 nm, for example between 30 nm and 50 nm, for example between 15 nm and 30 nm, for example between 1 nm and 15 nm.

The surface area if the nano-featured composite comprising carbon and porous silicon material can vary, for example from 0.1 to 1 m2/g, from 1 to 10 m2/g, from 10 to 25 m2/gm from 25 to 50 m2/g, from 50 to 100 m2/g. In some embodiments, the nano-featured composite comprising carbon and porous silicon material can have a surface area of greater than 100 m2/g, for example between 100 m2/g and 500 m2/g, for example between 100 m2/g and 250 m2/g, for example between 100 m2/g and 150 m2/g, for example between 150 m2/g and 250 m2/g.

The average length of the webbing comprising the nano-featured porous silicon structure can vary. This average length can be determined as the average span from one point of contact to another. This characteristic length can be estimated by techniques known in the art, for example by atomic force microscopy or by scanning electron microscopy. In preferred embodiments, the average length of the webbing comprising the porous silicon structure in nano-sized, resulting in a porous silicon particle with nano-sized features. For example, the web structures can have a characteristic length of less than 1 nm, between 1 nm to 2 nm, between 2 to 5 nm, between 5 and 10 nm, between 10 and 30 nm, between 10 and 50 nm, between 50 and 100 nm, between 10 and 100 nm, between 100 and 200 nm, between 200 and 500 nm, between 500 and 750 nm.

The average length between the threads of the webbing comprising the nano-featured porous silicon structure within the composite can vary. This average length between the threads can be determined as the average distance from one thread to another thread. This characteristic length can be estimated by techniques known in the art, for example by atomic force microscopy or by scanning electron microscopy. For example, the web structures can have a characteristic length of less than 1 nm, between 1 nm to 2 nm, between 2 to 5 nm, between 5 and 10 nm, between 10 and 30 nm, between 10 and 50 nm, between 50 and 100 nm, between 10 and 100 nm, between 100 and 200 nm, between 200 and 500 nm, between 500 and 750 nm.

The pore volume distribution of the nano-featured porous silicon comprising the composite can vary. In certain embodiments, the percentage of pore volume comprising micropores (less than 20 A) can be less than 50%, for example less than 40%, for example less than 30%, for example less than 20%, for example less than 10%. In certain embodiments, the pore volume comprising micropores can be between 1% and 10%. In certain embodiments, the pore volume comprising micropores can be between 1% and 5%. In certain embodiments, the pore volume comprising mesopores (between 20 and 500 A) can be between 10% and 90%. For example, the pore volume comprising mesopores can be between 20% and 80%. For example, the pore volume comprising mesopores can be between 30% and 70%. For example, the pore volume comprising mesopores can be between 30% and 60%. For example, the pore volume comprising mesopores can be between 30% and 50%. For example, the pore volume comprising mesopores can be between 40% and 60%. In certain embodiments, the pore volume comprising macropores (greater than 500 A) can be between 10% and 90%. For example, the pore volume comprising macropores can be between 20% and 80%. For example, the pore volume comprising macropores can be between 30% and 70%. For example, the pore volume comprising macropores can be between 30% and 60%. For example, the pore volume comprising macropores can be between 30% and 50%. For example, the pore volume comprising macropores can be between 40% and 60%.

The particle size of the lithiated as compared to non lithiated composite particles comprising carbon and porous silicon can vary. For example, the expansion factor, defined as ratio of the average particle size of porous silicon particles after lithiation divided by the average particle size under non-lithiated conditions. As described in the art, this expansion factor can be relative large for previously known, non-composite comprising carbon and porous silicon materials, for example about 4 (corresponding to a 400% volume expansion upon lithiation). The current inventors have devised composite comprising carbon and porous silicon materials that can exhibit a lower extent of expansion, for example, the expansion factor can vary from 3.5 to 4, from 3.0 to 3.5, from 2.5 to 3.0, from 2.0 to 2.5, from 1.5 to 2.0, from 1.0 to 1.5.

EXAMPLES

Example 1

Etching of Al—Si Alloy to Yield Bulk Porous Silicon

Aluminum-silicon alloy was dispersed in water and mixed by overhead mixer. Hydrochloric acid was added the dispersion over time, generating heat and accomplishing the etching. To avoid boiling, the heat generated is removed from the reactor by adding water ice to the system. Other modes to remove heat, such as employing a heat exchanger of varying modes of other approaches can also be employed, as known in the art. After the etching reaction subsided, the solids were allowed to settle in the reaction tank, and excess water decanted. The wet cake was dried in an oven, for example at 130 C, to yield dried, porous silicon with nano-scaled features. Alternatively, additional drying at a higher temperature, for example 450 C under an inert environment such as nitrogen gas, is also employed to yield the final dried, porous silicon. Alternatively, additional drying at a higher temperature, for example 1050 C under an inert environment such as nitrogen gas, is also employed to yield the final dried, porous silicon with nano-scale features.

An example SEM for the porous silicon with nano-scaled features in presented in FIG. 1. The nano-sized features are evidenced in the SEM.

Example 2

Particle Size Reduction of Bulk Porous Silicon

Figure 2:
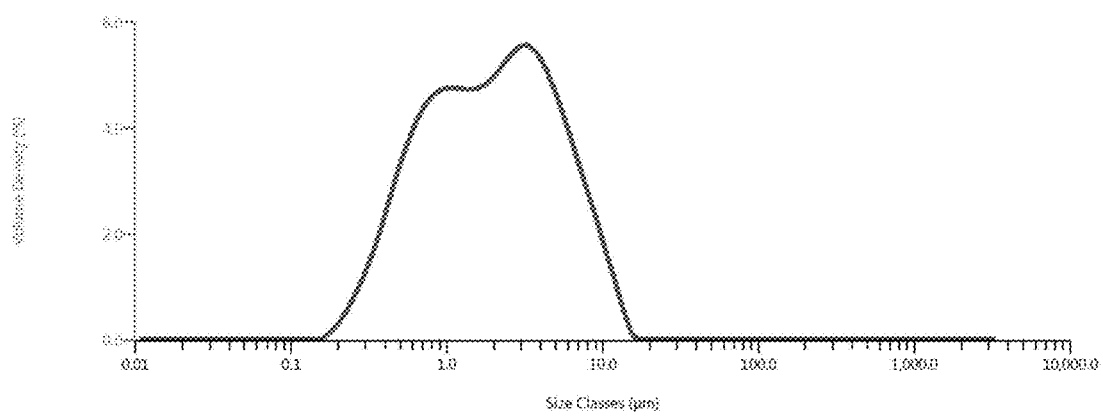
FIG. 2. Example particle size distribution for porous silicon.
Figure 3:
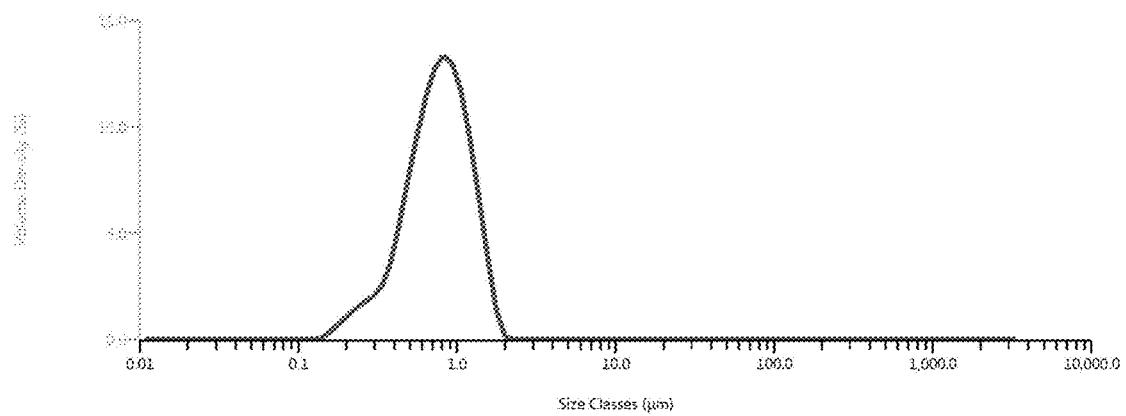
FIG. 3. Example particle size distribution for jet milled porous silicon.

The bulk porous silicon from Example 1 can be size reduced, for example by methods known in the art such as grinding, ball milling, jet milling, water jet milling, and other approaches known in the art. In one embodiment, the porous silicon is particle sized reduced by jet milling. Example particle size distributions before and after jet milling are shown in FIG. 2 and FIG. 3, respectively. Before jet milling, the measured Dv0, Dv1, Dv5, Dv10, Dv20, Dv50, Dv80, Dv890, Dv95, Dv100 were 167 nm, 250 nm, 384 nm, 506 nm, 742 nm, 1.96 um, 4.63 um, 6.64 um, 12.0 um, and 16.2 um, respectively. This material was predominantly micron-sized, for example the Dv50 was 1.96 microns. After jet milling, the measured Dv0, Dv1, Dv5, Dv10, Dv20, Dv50, Dv80, Dv90, Dv99, and Dv100 were 146 nm, 194 nm, 290 nm, 388 nm, 505 nm, 766 nm, 1.10 um, 1.28 um, 1.65 um, and 1.87 um, respectively.

As can be seen, the porous silicon described herein was sufficiently friable to achieve substantially nano-scale particles following jet milling, specifically, the Dv50 was 766 nm for the jet milled porous silicon comprising nano-scale features. The particle size reduction can be described in terms of the material friability, for example, friability is defined as the % reduction in volume average particle size upon employing standard jet milling processing as known in the art. By this criteria, the friability of the novel nano-featured porous silicon is [1−(0.766)/1.96] or 61%

Example 3

Particle Size Reduction of Non-Porous Silicon

Figure 5:
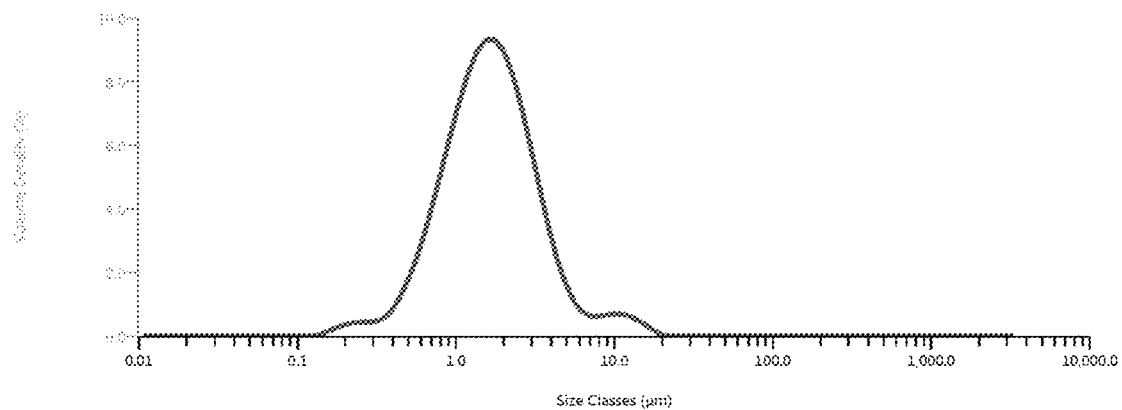
FIG. 5. Example particle size distribution for jet milled non-porous silicon.
Figure 6:
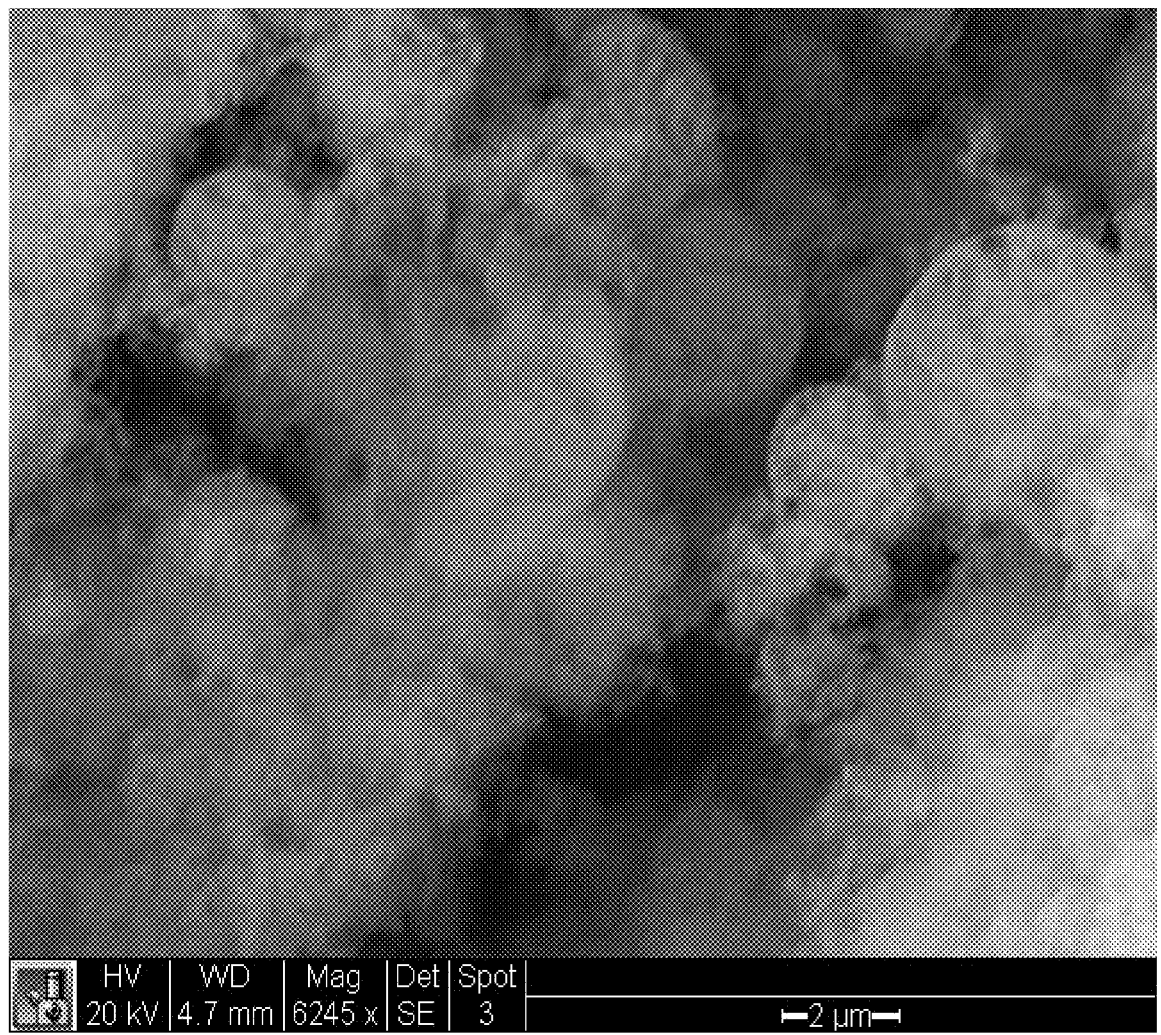
FIG. 6. SEM for material according to example 4-1.
Figure 7:
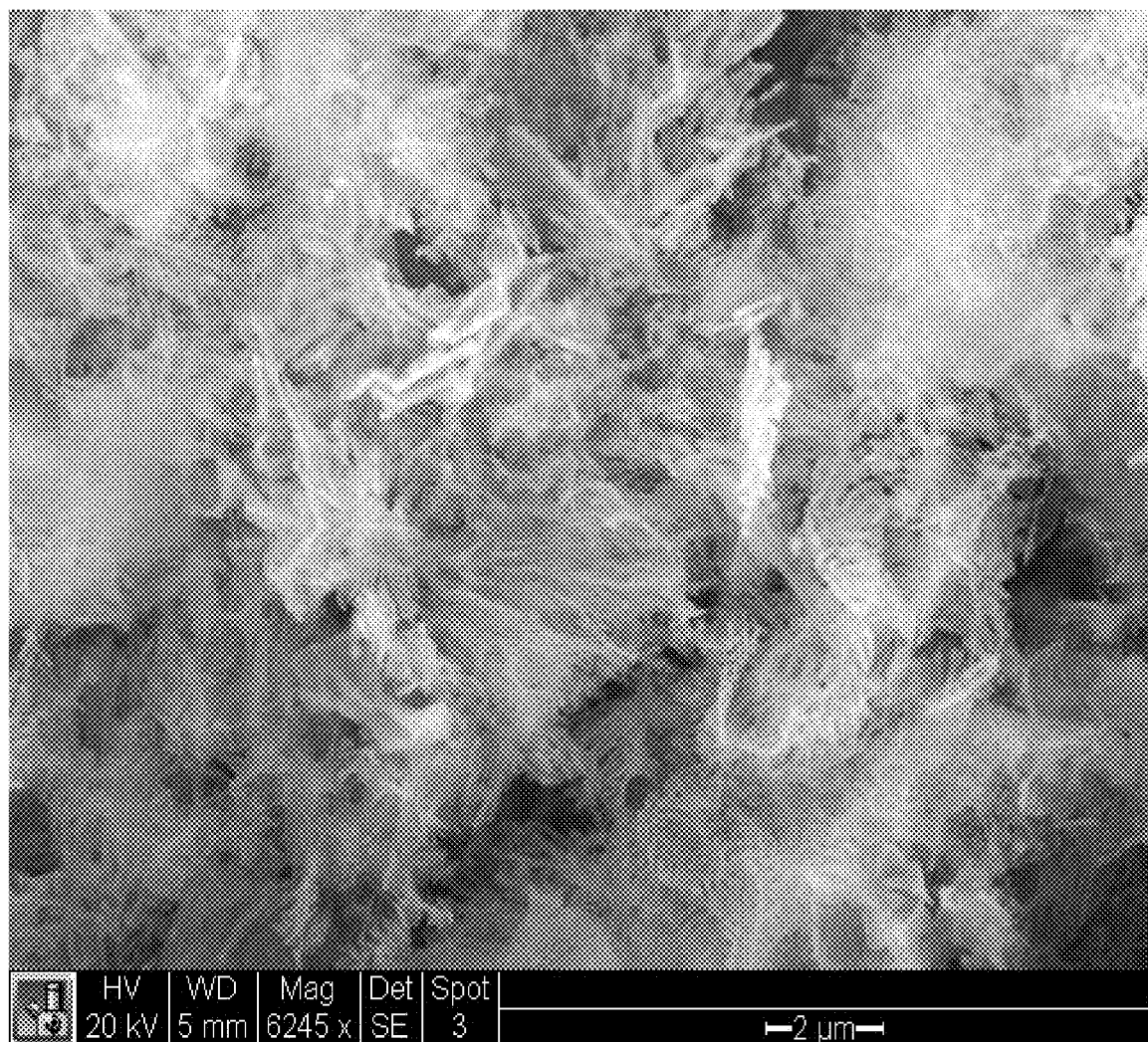
FIG. 7. SEM for material according to example 4-3.
Figure 8:
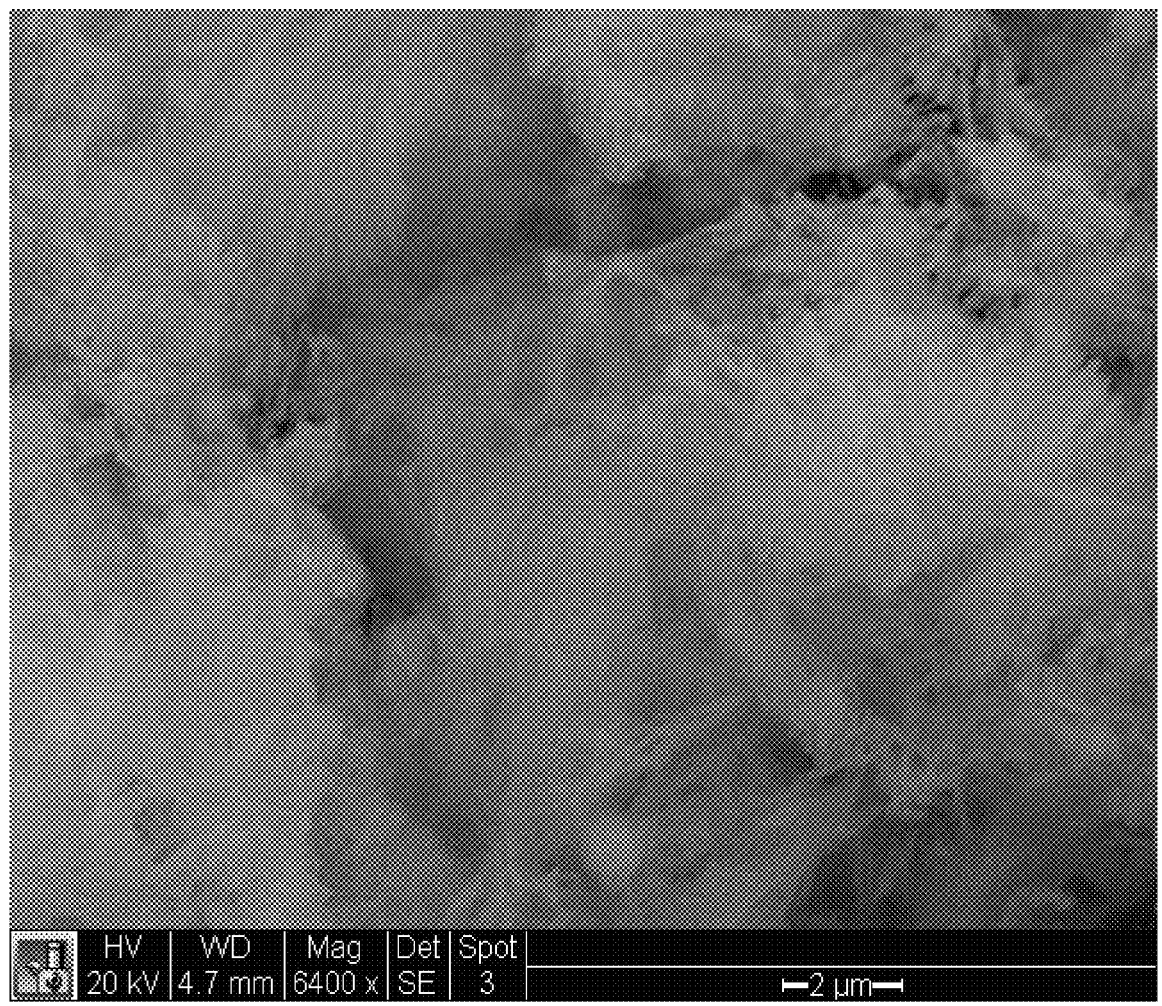
FIG. 8. SEM for material according to example 4-4.
Figure 9:
FIG. 9. SEM for material according to example 4-5.
Figure 10:
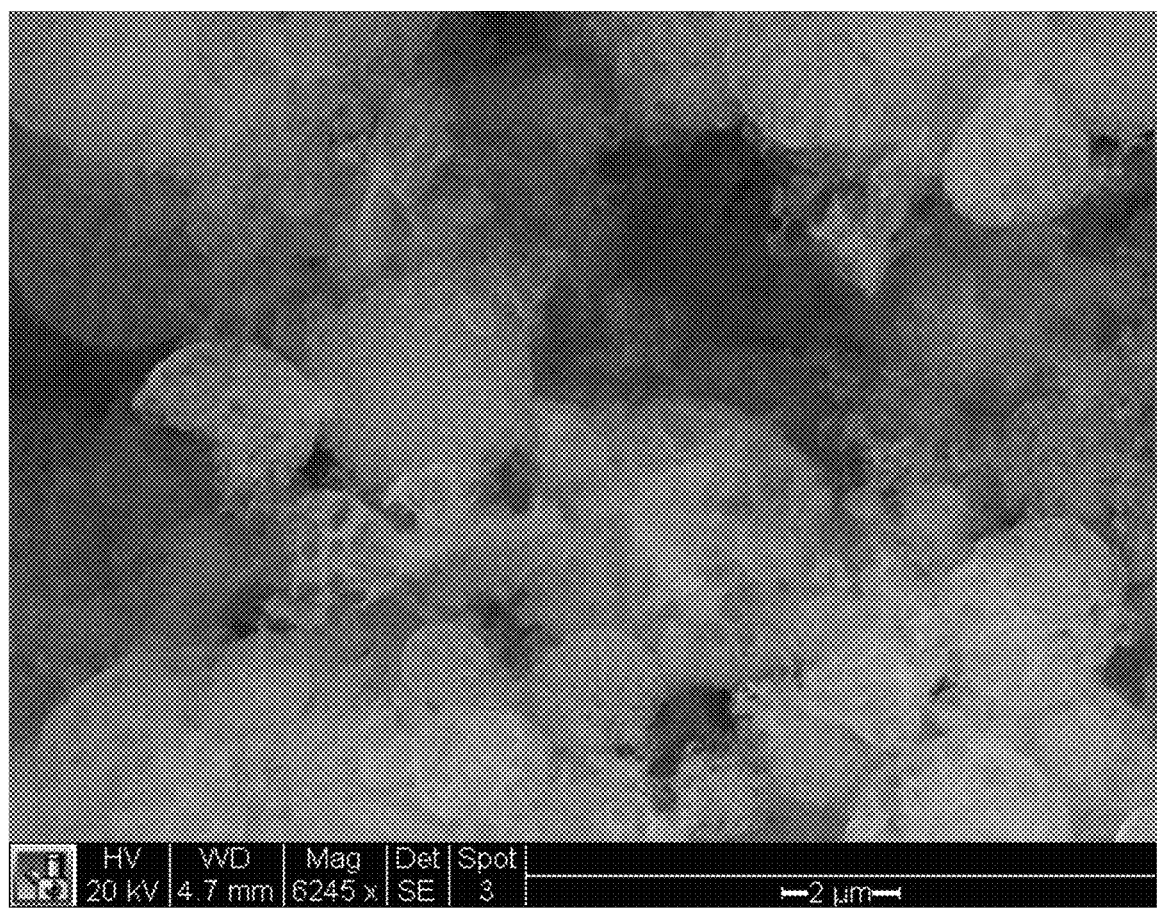
FIG. 10. SEM for material according to example 4-6.
Figure 11:
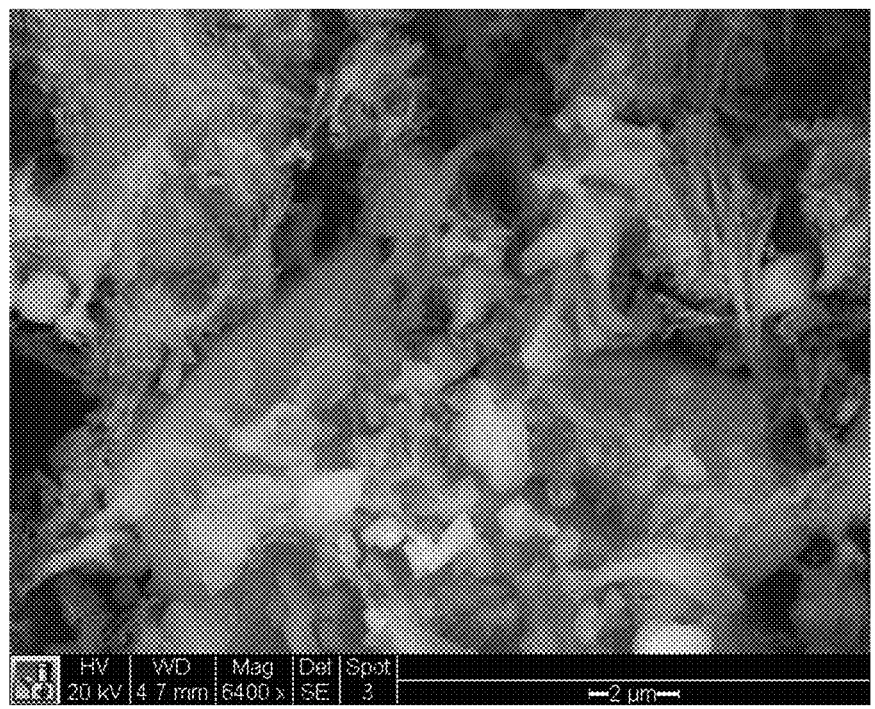
FIG. 11. SEM for material according to example 4-10.
Figure 12:
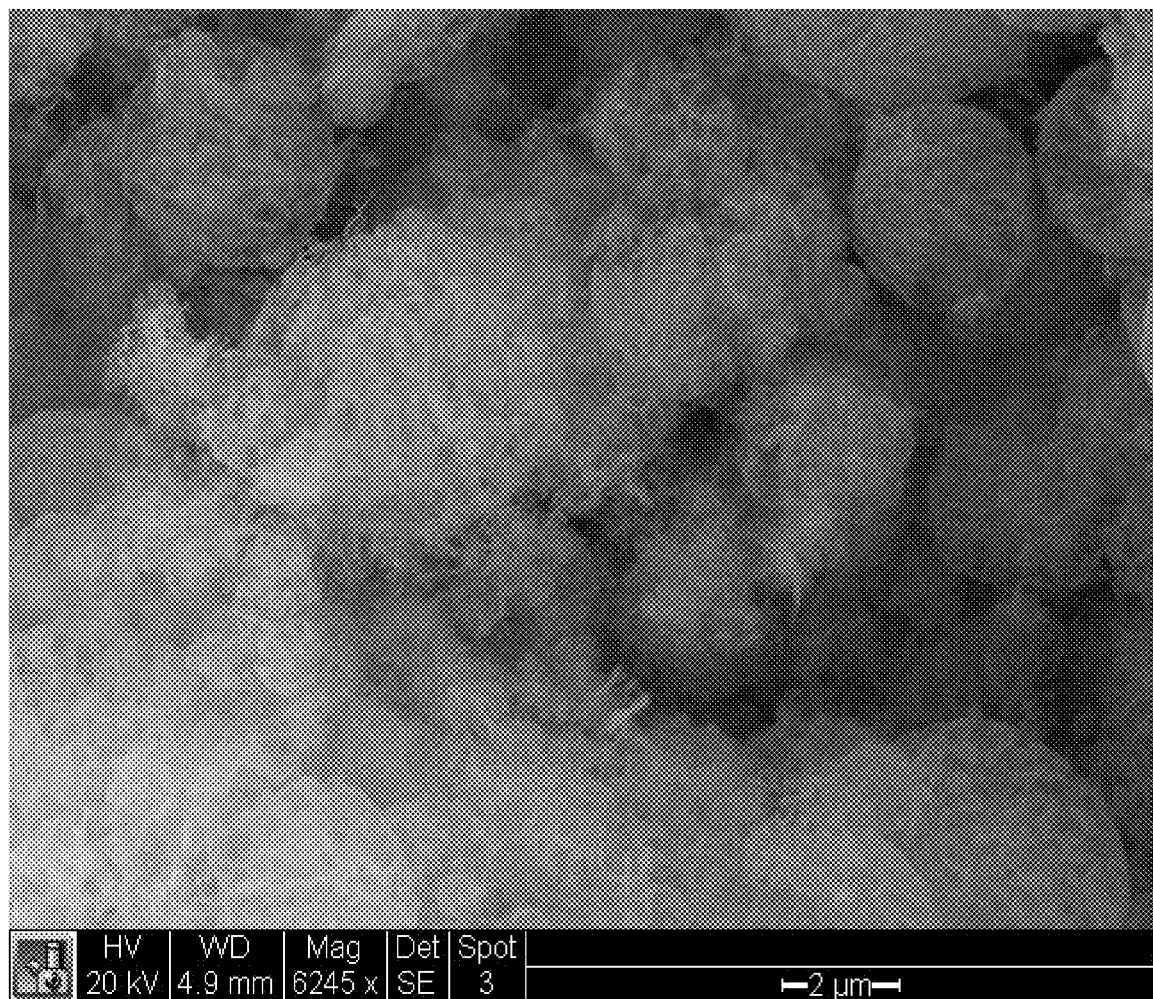
FIG. 12. SEM for material according to example 4-11.
Figure 13:
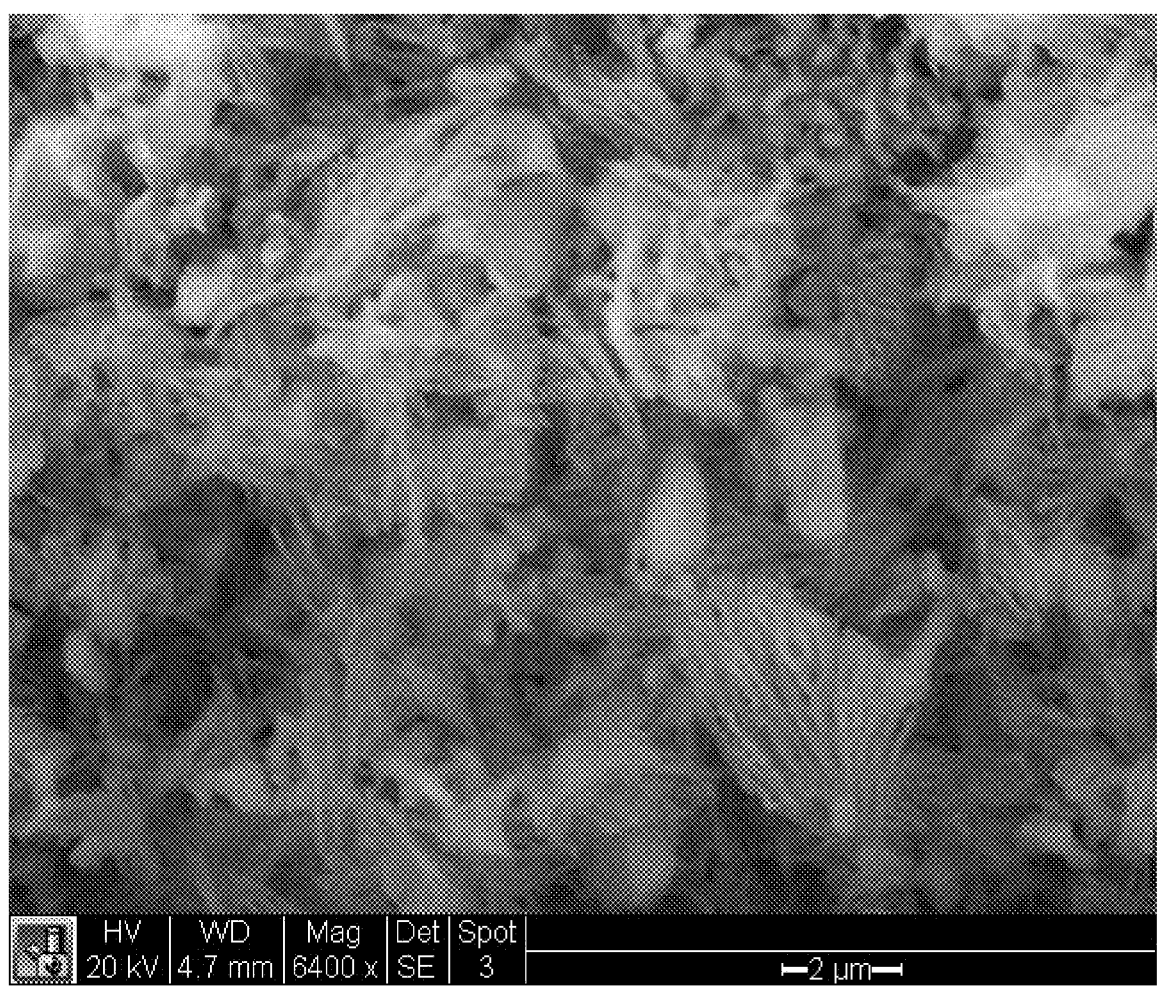
FIG. 13. SEM for material according to example 4-15.

Employing the same jet milling strategy as for Example 2, an attempt was conducted to particle size reduce a commercially available non-porous silicon. Example particle size distributions before and after jet milling are shown in FIG. 4 and FIG. 5, respectively. Before jet milling, the measured Dv0, Dv1, Dv5, Dv10, Dv20, Dv50, Dv80, Dv890, Dv95, Dv100 were 147 nm, 247 nm, 546 nm, 702 nm, 942 nm, 1.66 um, 3.03 um, 4.64 um, 17.1 um, and 23.9 um, respectively. This material was predominantly micron-sized, for example the Dv50 was 1.66 microns. After jet milling, the measured Dv0, Dv1, Dv5, Dv10, Dv20, Dv50, Dv80, Dv90, Dv99, and Dv100 were 147 nm, 245 nm, 525 nm, 685 nm, 924 nm, 1.62 nm, 2.79 um, 3.79 um, 12.5 um, and 18.6 um, respectively. As can be seen, the non-porous silicon was non-friable. There was no appreciable particle size reduction upon jet milling the jet milled non-porous silicon remained micron-sized, specifically, the Dv50 was 1.62 um.

The particle size reduction can be described in terms of the material friability, for example, friability is defined as the % reduction in volume average particle size upon employing standard jet milling processing as known in the art. By this criteria, the friability of the non-porous silicon is [1−(1.62)/1.66] or 2.4%.

Example 4

Production of Porous Nano-Featured Silicon at Various Conditions

Silicon-Aluminum alloy powders of varying particle sizes were etched to various levels of excess aluminum and characterized for physical and electrochemical properties. Si—Al powders were obtained with average particle sizes of 2 um, 8 um, and 15 um. Complete etching of the aluminum from the powders showed a decrease in specific surface area and total pore volume, with increasing alloy particle size. Samples also displayed a decrease in surface area and pore volume, with increased aluminum concentration in the final etched material. The data are presented in Table 1 for samples with 12% silicon in the alloy, and Table 2 presents data for samples with silicon content in the alloy varying from 12-25%.

TABLE 1

Production and characterization of various exemplary nano-featured porous silicon materials according to Example 4.

| Sample # | Alloy type | Dv50 | % Si in alloy | % Excess Al | BET SSA (m$^2$/g) | PV (cm$^3$/g) |
| --- | --- | --- | --- | --- | --- | --- |
| 4-1 | 12-S2 | 2 um | 12% | 0% | 229 | 0.449 |
| 4-2 | 12-S8 | 8 um | 12% | 0% | 104 | 0.302 |
| 4-3 | 12-S15 | 15 um | 12% | 0% | 81 | 0.219 |
| 4-6 | 12-S2 | 2 um | 12% | 10% | 178 | 0.331 |
| 4-7 | 12-S8 | 8 um | 12% | 10% | 74 | 0.201 |
| 4-8 | 12-S15 | 15 um | 12% | 10% | 72 | 0.230 |
| 4-11 | 12-S2 | 2 um | 12% | 30% | 125 | 0.322 |
| 4-12 | 12-S8 | 8 um | 12% | 30% | 78 | 0.248 |
| 4-13 | 12-S15 | 15 um | 12% | 30% | 73 | 0.208 |

Silicon-Aluminum alloy powders of varying silicon percentages were etched to different levels of excess aluminum and characterized for physical and electrochemical properties. Si—Al powders with 12, 20, and 20% silicon in the alloy were etched to 0, 10, and 30% aluminum. Fully etched powders had decreasing specific surface area with increased starting aluminum content.

TABLE 2

Production and characterization of various exemplary nano-featured porous silicon materials according to Example 4.

| Sample # | Alloy type | Dv50 | % Si in alloy | % Excess Al | BET SSA (m$^2$/g) | PV (cm$^3$/g) |
| --- | --- | --- | --- | --- | --- | --- |
| 4-2 | 12-S8 | 2 um | 12% | 0% | 104 | 0.302 |
| 4-4 | 20-10 um | 8 um | 20% | 0% | 81 | 0.232 |
| 4-5 | 25-10 um | 15 um | 25% | 0% | 57 | 0.160 |
| 4-7 | 12-S8 | 2 um | 12% | 10% | 74 | 0.201 |
| 4-9 | 20-10 um | 8 um | 20% | 10% | 82 | 0.219 |
| 4-10 | 25-10 um | 15 um | 25% | 10% | 38 | 0.110 |
| 4-12 | 12-S8 | 2 um | 12% | 30% | 78 | 0.248 |
| 4-14 | 20-10 um | 8 um | 20% | 30% | 72 | 0.239 |
| 4-15 | 25-10 um | 15 um | 25% | 30% | 34 | 0.120 |

SEM images for materials according to samples 4-1, 4-3, 4-4, 4-5, 4-6, 4-10, 4-11, 4-15 in FIG. 6, FIG. 7, FIG. 8, FIG. 9, FIG. 10, FIG. 11, FIG. 12, and FIG. 13 respectively. As can be seen, in all cases, the resulting material is a porous silicon material with nano-sized features.

Figure 14:
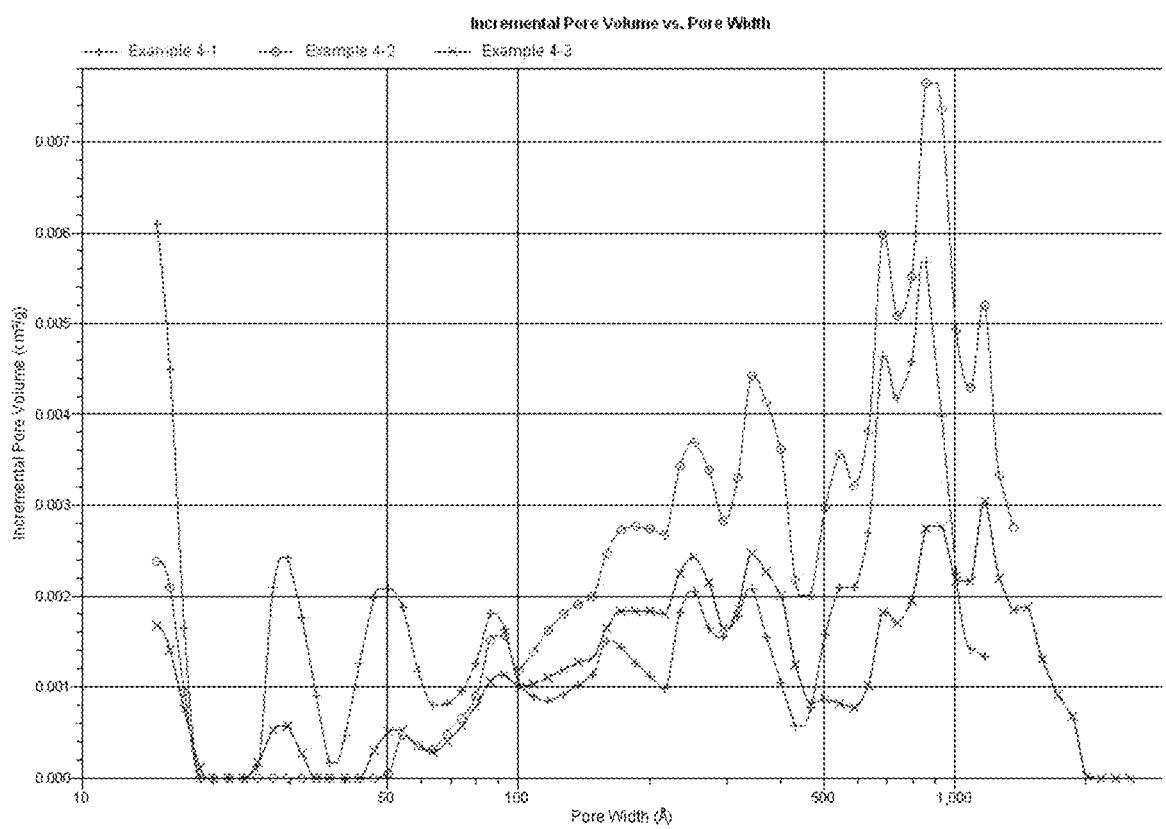
FIG. 14. Pore volume distribution for samples 4-1, 4-2, and 4-3.

Table 3 presents pore volume distributions for various exemplary nano-featured porous silicon materials according to Example 4. Representative pore distributions for samples 4-1, 4-2 and 4-3 are depicted in FIG. 14. Within this series, the samples are produced with increasing particle size, with no excess aluminum, and 12% silicon in the alloy. The data show a trend for the pore volume in decreased in the micropore range, for example pores less than 20 A.

Figure 15:
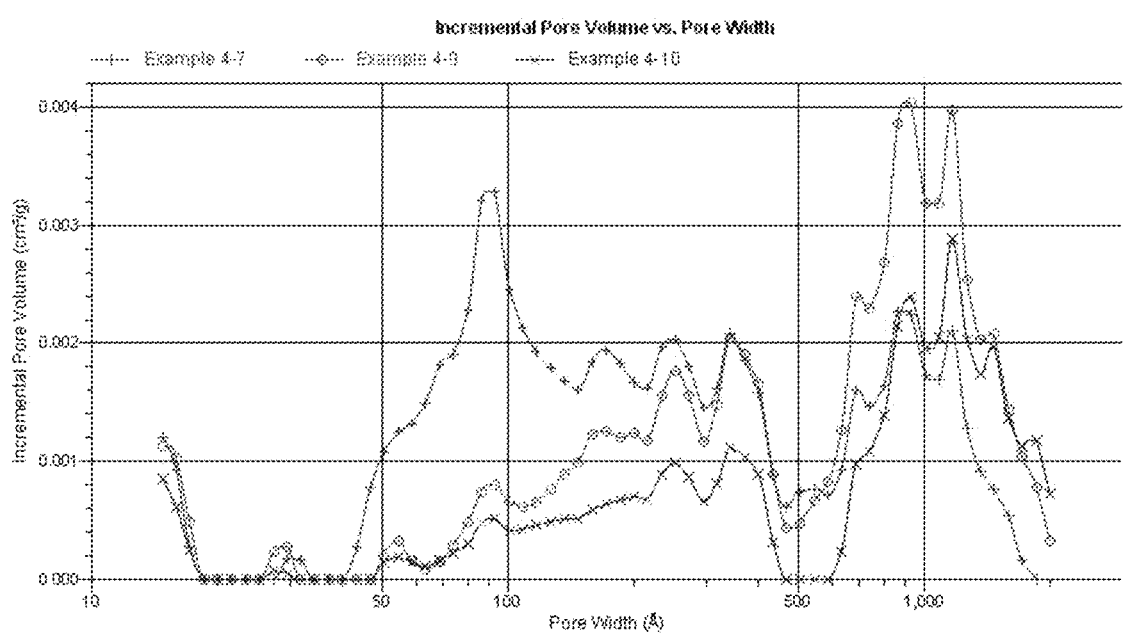
FIG. 15. Pore volume distribution for samples 4-7, 4-9, and 4-10.

The pore distribution of samples 4-7, 4-9 and 4-10 are depicted in FIG. 15. Within this series, the samples were produced from aluminum silicon alloys with increasing silicon alloy particle size and increasing % silicon in the alloy, but with the same residual aluminum content in the etched alloy. Samples 4-7 and 4-9 exhibited a higher surface area and pore volume compared to sample 7-10, although all three samples showed a similar micropore volume by DFT analysis. Sample 4-7 demonstrated a higher fraction of mesopores (20-500 A sized pores), whereas sample 4-9 demonstrated a higher fraction of macropores (>500 A sized pores).

TABLE 3

Pore volume distributions for various exemplary nano-featured porous silicon materials according to Example 4.

| Sample | Fractional pore volume micropores | Fractional Pore volume mesopores | Fractional pore volume macropores |
|---|---|---|---|
| 4-1 | 20.5% | 47.6% | 31.9% |
| 4-2 | 8.5% | 49.1% | 42.4% |
| 4-3 | 11.2% | 59.9% | 28.9% |
| 4-4 | 12.0% | 41.4% | 46.6% |
| 4-5 | 13.90 | 42.9% | 43.2% |
| 4-6 | 39.2% | 34.1% | 26.7% |
| 4-7 | 7.3% | 71.0% | 21.7% |
| 4-8 | 5.9% | 53.0% | 41.1% |
| 4-9 | 13.2% | 44.2% | 42.6% |
| 4-10 | 13.0% | 44.8% | 42.1% |
| 4-11 | 14.4% | 38.5% | 47.1% |
| 4-12 | 4.9% | 47.4% | 47.7% |
| 4-13 | 8.4% | 57.8% | 33.8% |
| 4-14 | 7.8% | 48.4% | 43.8% |
| 4-15 | 5.7% | 50.6% | 43.7% |

Samples 4-1, 4-2 and 4-3 were analyzed for the electrochemical performance in a half-cell, in an electrode comprising 10% conductive carbon, 10% binder, and 80% active material, wherein the active material is further comprised of 85% graphite and 15% nano-featured porous silicon. These samples were assembled into half-cells, and tested for five cycles at a rate of C/10, and further cycles at C/5. The average Coulombic efficiency was calculated over cycles 7 to cycle 25, and the capacity retention was calculated as the capacity at cycle 25 divided by the capacity at cycle 25. For sample 4-1, when tested in this system, the first cycle efficiency was 79%, the capacity was 561 mAh/g, the average Coulombic efficiency over cycles 7 to cycle 25 was 0.9925, and the capacity retention at cycle 25 relative to cycle 7 was 100%. For example 4-3 when tested in this system, the first cycle efficiency was 82%, the capacity was 673 mAh/g, the average Coulombic efficiency over cycles 7 to cycle 20 was 0.9898, and the capacity retention at cycle 20 relative to cycle 7 was 95.6%. These data demonstrate that the nano-featured porous silicon produced from the smaller alloy particle size (2 um vs. 15 um) provided a nano-featured porous silicon with slightly decreased capacity and substantially greater average Coulombic efficiency and capacity retention.

Example 5

Heat Treatment of Nano-Featured Porous Silicon

Figure 16:
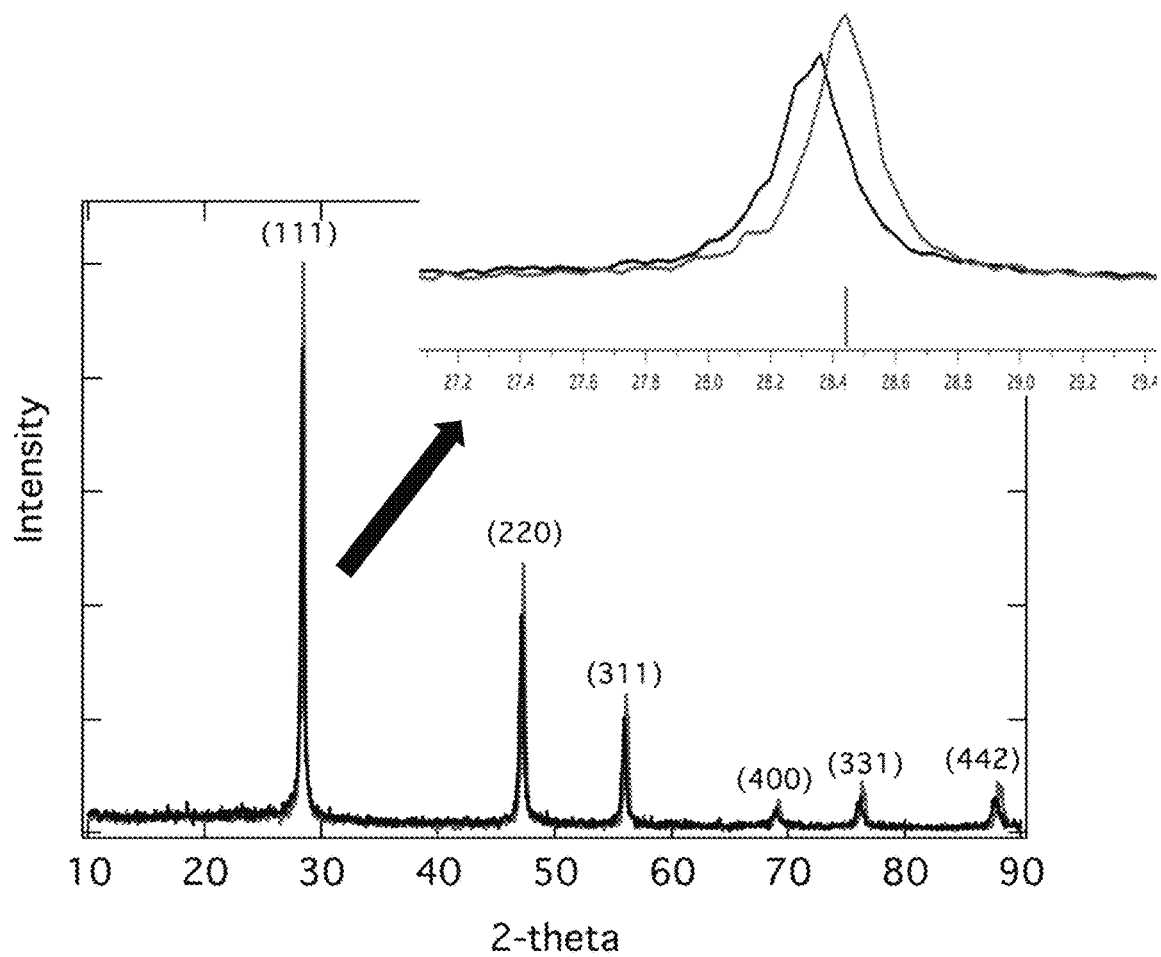
FIG. 16. XRD for nano-featured porous silicons (lighter curve=heat treated, heavier curve=non-heat treated).
Figure 17:
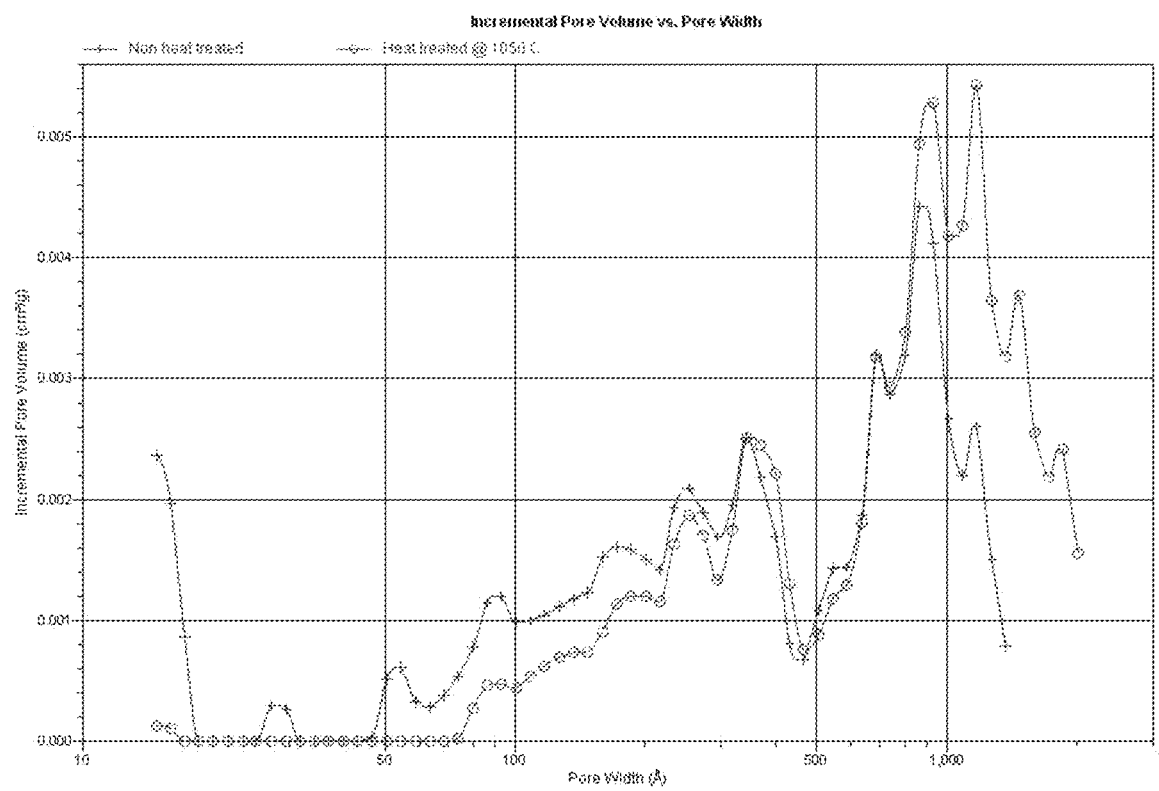
FIG. 17. Pore volume distribution for non-treated and heat-treated nano-featured porous silicons.
Figure 18:
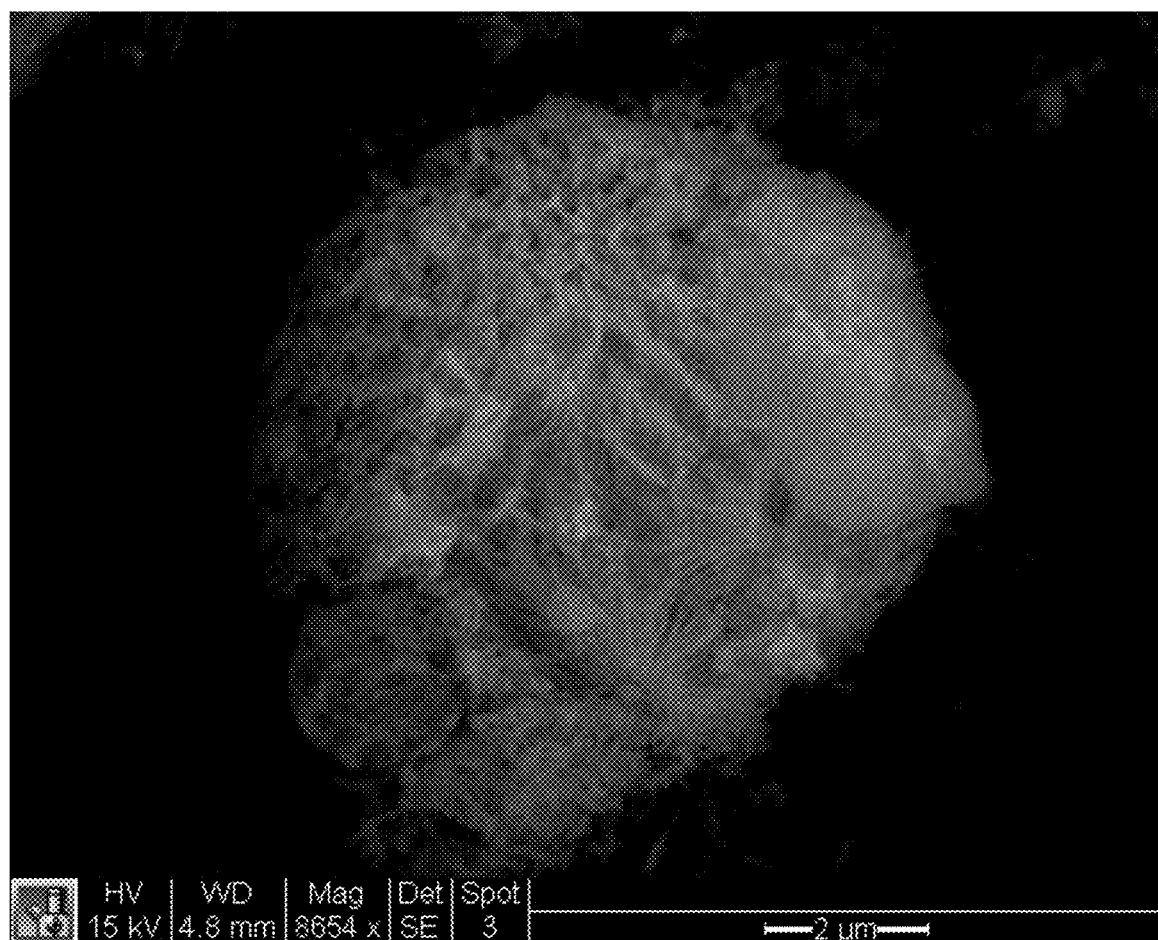
FIG. 18. SEM for heat-treated nano-featured porous silicon.

Nano-featured porous silicon was produced according to the general procedures described herein. Additionally, the nano-featured porous silicon was subjected to heat-treatment, namely incubation at 1050 C for 1 hour under an inert gas flow. The XRD pattern for the pre- and post heat-treatment are depicted in FIG. 16. For the heat-treated nano-featured porous silicon, a unique XRD pattern was observed, including the (111) peak position of 28.43° and calculated crystallite size of 31.91 nm. For comparison, the non-heat-treated webbed Si exhibited a peak position of 28.33° and crystallite size of 29.08 nm. The heat-treated webbed Si more closely matches the 2-theta peak position of a pure crystalline silicon standard (red bar shown in the insert in FIG. 16.). The surface area and pore volume for the non-treated nano-featured porous silicon were 118 m2/g and 0.246 cm3/g, respectively. The pore distribution for the non-treated nano-featured porous silicon was comprised of 18.9% micropores, 45.9% mesopores, and 35.2% macropores. There was a dramatic decrease in the surface area and pore volume after the heat-treatment; specifically, the surface area and pore volume for the heat-treated nano-featured porous silicon were 36 m2/g and 0.174 cm3/g, respectively. The pore distribution for the heat-treated nano-featured porous silicon was comprised of 1.4% micropores, 42.8% mesopores, and 55.9% macropores. A comparison of the pore volume distributions for the sample before and after the heat-treatment in presented in FIG. 17. The heat-treated nano-featured porous silicon was pressed in a pellet press under 1400 lbs. of force, resulting in a pellet, and the density of the pressed pellet was 0.90 g/cm3. The same pellet press density was measured for the non heat-treated nano-featured porous silicon, resulting in a value of 1 g/cm3. With respect to particle size, the Dv10, Dv50 and Dv90 for the were heat-treated nano-featured porous silicon were 888 nm, 3130 nm, and 6670 nm, respectively. A representative SEM for the heat-treated nano-featured porous silicon is depicted in FIG. 18. As can be seen, it is surprising and unexpected that the silicon retains the same nano-features, despite being heated and the resulting dramatic reduction in specific surface area and pore volume. Indeed, the nano features are retained and appear similar in nature to those before the heat-treatment. From the pore distributions, it is evident that the heat treatment resulted in decreased in pore volume corresponding to features leading to pores less than 100 A, particularly micropores (pores under 20 A). Also based on the pore distributions, it is evident that the heat treatment resulted in similar pore volume corresponding to features leading to pores between about 100 A and 1000 A, and after heat treatment there was an increase in pore volume corresponding to features greater than 1000 A.

Figure 19:
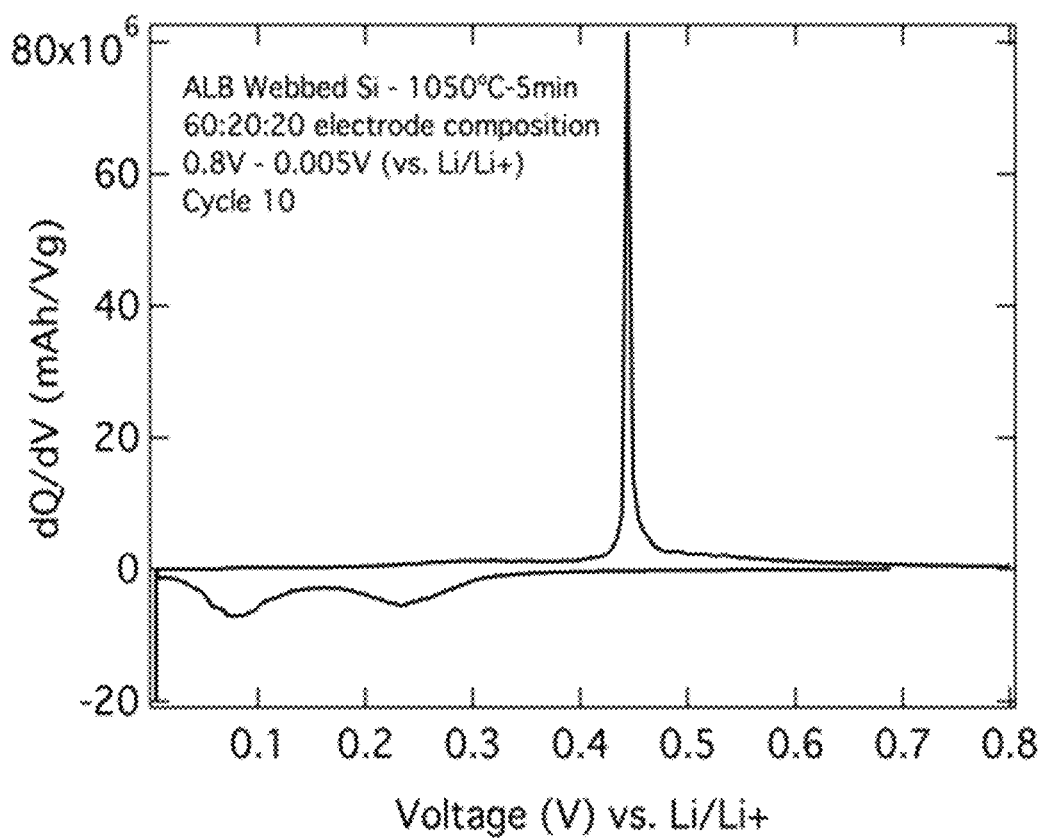
FIG. 19. Differential capacity vs. voltage profile for heat-treated nano-featured silicon in a half-cell (cycle 10).
Figure 20:
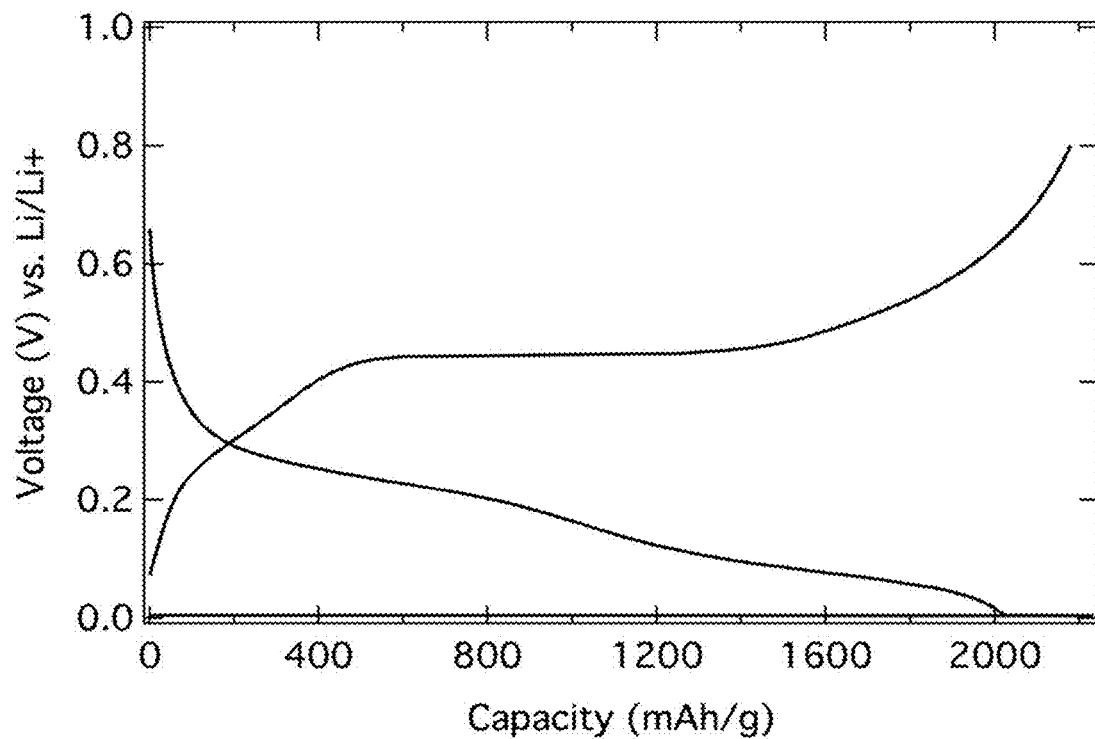
FIG. 20. Voltage profile for heat-threatened nano-featured silicon in a half-cell (cycle 10).

The heat-treated nano-featured porous silicon was tested for electrochemical performance in a lithium-ion half-cell employing techniques generally known in the art. The electrode formulation was comprised of 60% silicon material, 20% sodium CMC as a binder, and 20% conductive carbon (Super P). The first five cycles were conducted as a current rate corresponding to C/10, and the remaining cycles were conducted at a rate of C/5. The first cycle efficiency was 82% and average Coulombic efficiency, for example the average Coulombic efficiency from cycles 7-25 was 97.4%. The differential capacity vs. voltage curve is presented in FIG. 19, and the voltage profile is presented in FIG. 20, both for an exemplary cycle (cycle 10). It can be seen the extraction of lithium from the nano-featured porous silicon at cycle 10 is dominated by a peak located at about 0.4-0.5 V, associated with extraction from the Li15Si4 phase, and demonstrating full lithiation for the silicon phase.

Example 6

EDS Characterization of Nano-Featured Porous Silicon

Samples of the nano-featured porous silicon were examined by Scanning Electron Microscopy-Energy Dispersive Spectroscopy (SEM_EDS). SEM is the basic technique used for imaging. The typical accelerating voltages for the beam are 3-15 kV, with lower accelerating voltages being appropriate for less conductive samples. Generally, EDS can be used in conjunction with SEM to acquire compositional data. Backscattered electron images in the SEM display compositional contrast that results from different atomic number elements and their distribution. Energy Dispersive Spectroscopy (EDS) allows one to identify what those particular elements are and their relative proportions (Atomic % for example). Compositional analysis is achieved when the technique is used to obtain an average composition in a given area of a sample. Percentages (by weight or atomic %) are reported for each element detected in the sample. A "point and ID" method is used when individual particles are identified (used for webbed silicon), and an average area can also be analyzed if individual points of interest are not distinguishable in the sample (used for jet milled webbed silicon). A mapping analysis can also be achieved to obtain spatial distribution of the elements in a given sample.

For the nano-featured porous silicon, a total of 24 different particles on two different samples were analyzed for Si, O and Al content. The data showed the silicon content was 79±5%, the oxygen content was 16±5%, and the aluminum content was 5±1%.

Figure 21:
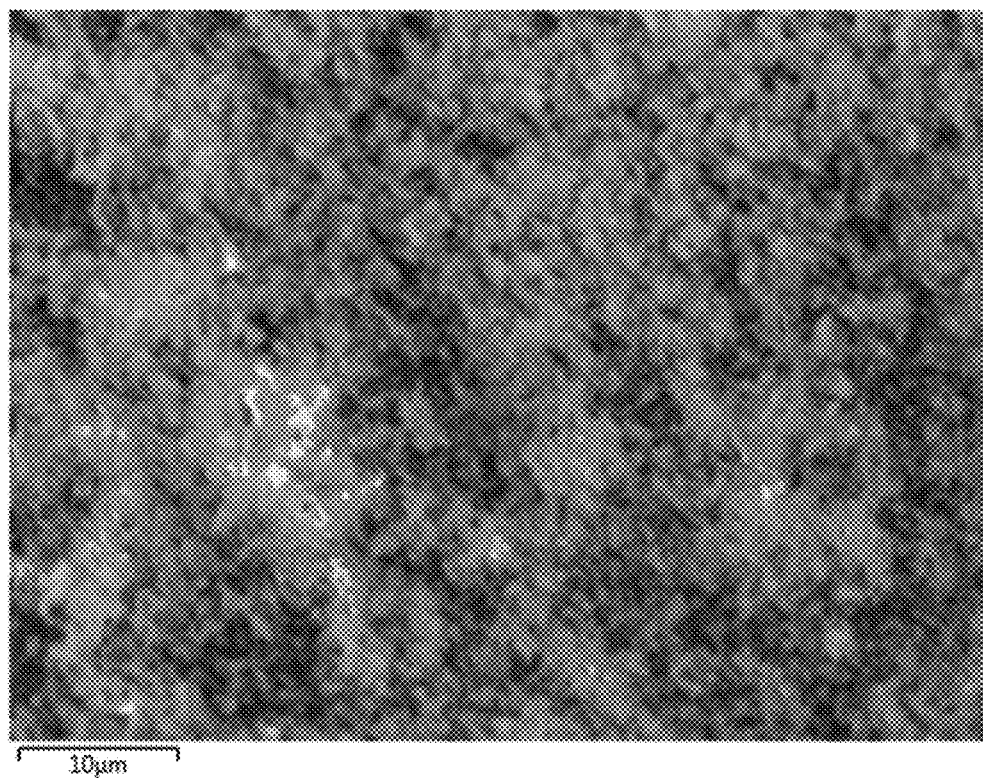
FIG. 21. SEM for nano-sized nano-featured porous silicon.

The nano-featured porous silicon was particle size reduced by jet milling as described elsewhere in this disclosure to yield a nano-sized nano-featured porous silicon. For the nano-sized nano-featured porous silicon, three different areas were analyzed. It was noted that by SEM (FIG. 21), this materials appeared to be sub-micron shards of materials, consistent with the particle size data for the jet milling nano-featured porous silicon presented elsewhere in this disclosure. It appeared to be many small shards of material, rather than particles, so the average of an area containing the material of interest was analyzed. The data showed the silicon content was 77±3%, the oxygen content was 17±3%, and the aluminum content was 6±1%.

Example 7

Electrochemical Characterization of Nano-Featured Porous Silicons

Nano-featured porous silicon was produced according to the general procedures described herein. A variety of different electrode formulations were tested, including the same formulation as described in Example 5, as well as two instances where the active material, binder, and conductive carbon comprised 80%, 10%, and 10% of the electrode mass respectively. In one case, the active material was further comprised of 90% graphite and 10% nano-feature porous silicon, and in the other case, the active material was further comprised of 85% graphite and 15% nano-feature porous silicon. These samples were assembled into half-cells, and tested for five cycles at a rate of C/10, and further cycles at C/5. The electrochemical testing data are summarized in Table 4. Unless otherwise stated, the average Coulombic efficiency and capacity retention are reported over cycle 7 to cycle 25, capacity is reported for cycle 6. A electrochemical half-cell comprising substantially the same sample as indicated in the first row of Table 4 was tested for expansion, after the half cell had been cycled 26 times and at 100% state of charge, resulting in a 67% expansion.

TABLE 4

Electrochemical characterization of nano-featured porous silicon in half-cells.

| % Graphite | First cycle efficiency | Capacity | Avg. Coulombic efficiency | Capacity retention |
|---|---|---|---|---|
| 85% | 76% | 629 mAh/g | 0.9901 | 96.9% |
| 90% | 80% | 457 mAh/g | 0.9928 | 97.6% |

The electrochemical performance of the jet milled vs. non jet milled nano-featured porous silicon was conducted. The jet milling, as described in Example 2, was sufficient to yield nano-sized nano-featured silicon particles. The electrochemical characterization is presented in Table 5. The data demonstrate a slightly lower capacity and higher average Coulombic efficiency for the jet milled (e.g., nano sized) nano-featured porous silicon.

TABLE 5

Electrochemical characterization of jet milled vs. non jet milled nano-featured porous silicon in half-cells.

| Jet milled | % Graphite | First cycle efficiency | Capacity | Avg Coulombic efficiency | Capacity retention |
|---|---|---|---|---|---|
| No | 0% | 75% | 2307 mAh/g | 0.9754 | 83.2% |
| Yes | 0% | 75% | 1600 mAh/g | 0.9839 | 100% |
| No | 85% | 76% | 629 mAh/g | 0.9928 | 97.6% |
| Yes | 85% | 80% | 618 mAh/g | 0.9909 | 98.2% |

For the samples processed in the absence of graphite, the average Coulombic efficiency is averaged over cycles 7 to 10, and the capacity retention is calculated as capacity at cycle 10 divided by capacity at cycle 7. The data are consistent with a stability advantage for the nano sized and nano-featured porous silicon over the non particle size reduced material. The data for the electrochemical performance in the presence of 85% graphite also is consistent with improved capacity retention for the case where the silicon particles were sized reduced by jet milling.

Example 8

Electrochemical Characterization of Comparator Silicons

A number of different non-nano-featured, non-porous silicons were obtained and characterized according to the general procedures described herein. The electrochemical testing data are summarized in Table 6.

TABLE 6

Electrochemical characterization of various comparator silicon materials.

| Silicon type | % graphite | First cycle efficiency | Capacity | Avg. Coulombic efficiency | Capacity retention |
|---|---|---|---|---|---|
| Comparator 1, 200 nm size | 0% | 91% | 1984 mAh/g | 0.9325 | 19.4% |
| Comparator 2, 400 nm size | 0% | 88% | 1756 mAh/g | 0.9293 | 19.6% |
| Comparator 3, nano sized | 0% | 65% | 1531 mAh/g | 0.9684 | 61.1% |
| Comparator 3, nano sized | 78.3% | 68% | 529 mAh/g | 0.9900 | 87.7% |

As can be seen, these nano-sized non-porous, comparator silicon all exhibited inferior electrochemical performance compared to the nano-featured, porous silicon materials herein.

Example 9

X-Ray Photoelectron Spectroscopy of Nano-Featured Porous Silicon

X-ray photoelectron spectroscopy (XPS) is a surface-sensitive quantitative spectroscopic technique that measures the elemental composition at the parts per thousand range, empirical formula, chemical state and electronic state of the elements that exist within a material. XPS spectra are obtained by irradiating a material with a beam of X-rays while simultaneously measuring the kinetic energy and number of electrons that escape from the top 0 to 10 nm of the material being analyzed.

Figure 22:
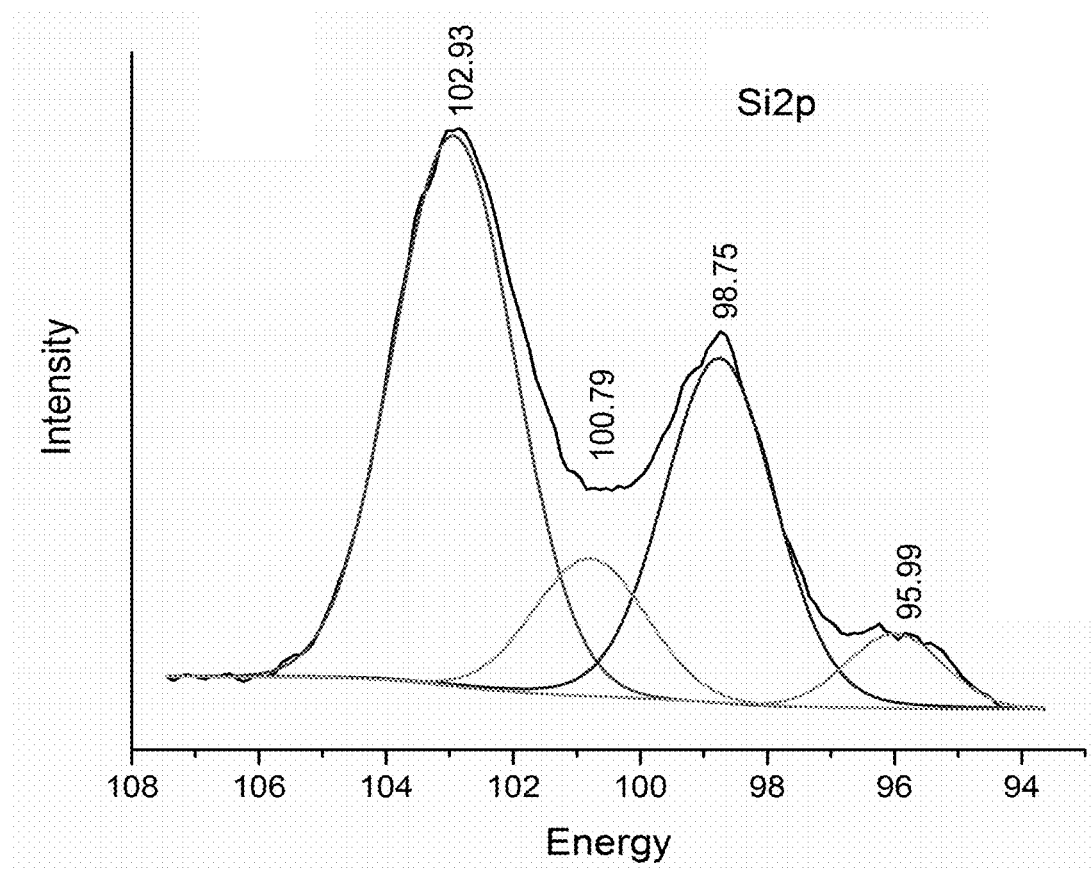
FIG. 22. XPS in the Si2p region for nano-featured porous silicon.

FIG. 22 depicts the curve-fitting of the XPS data for nano-featured porous silicon. The spin orbit splitting of the Si 2p states (binding energies around 100 eV) is clearly resolved. The data demonstrate distinct bonding species corresponding to 102.9 eV, 100.8 eV, 98.8 eV, and 96.0 eV. While not being bound by theory, such species can be assigned according to information available in the art, for example, the NIST database (http://srdata.nist.gov/xps/EnergyTypeValSrch.aspx). Accordingly in this regard, it is known that typical binding energies include Si—Si at ~99-100 eV, Si—C at ~100-101 eV, Si—N at ~102 eV, and SiOx at ~101-104 eV. A surprising and unexpected finding was a peak in the XPS for the nano-featured porous silicon located at 96.0 eV. No Si binding energies below 98 eV are reported in NIST database. This specific XPS feature is a unique property of the nano-featured porous silicon.

Example 10

Treatment of Nano-Featured Porous Silicon with Ammonia Gas

Nano-featured porous silicon was subjected to a flow of ammonia gas while held at 900 C for one hour. This material was tested for electrochemical performance in a half-cell, wherein the anode comprised 60% nano-featured porous silicon, 20% conductive carbon, and 20% binder. The first cycle efficiency was 80%, the capacity at cycle 6 was 1641 mAh/g, the average Coulombic efficiency over cycles 7 to cycle 25 was 0.9815, and the capacity retention at cycle 25 relative to cycle 10 was 98.2%.

Example 11

CVD Coating of Porous Nano-Featured Silicon

Figure 23:
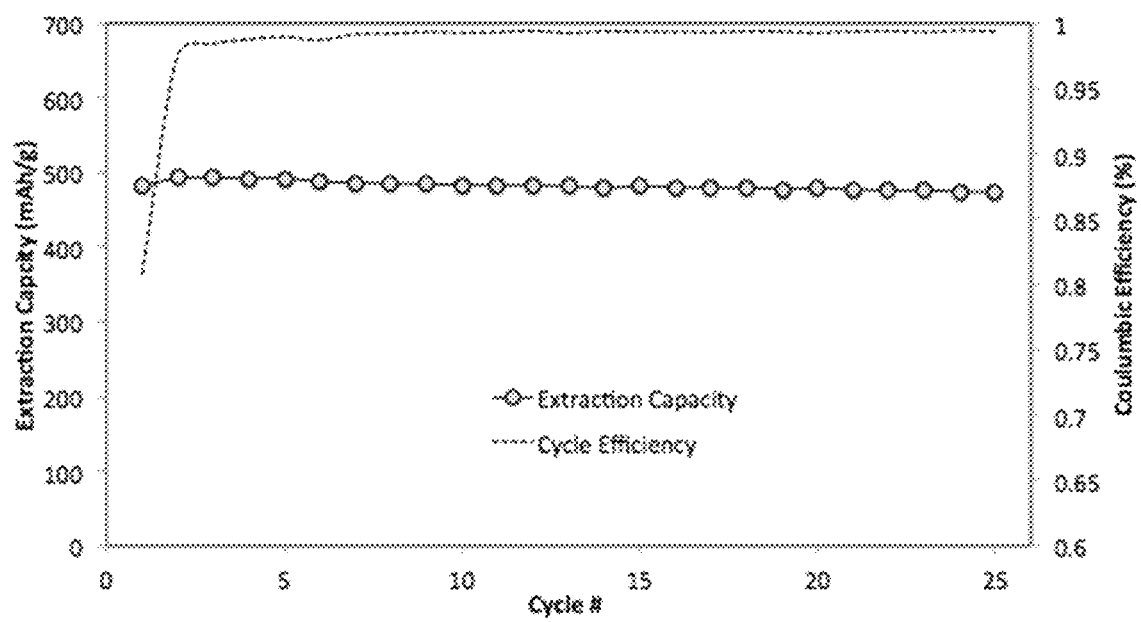
FIG. 23. Extraction capacity and Coulombic efficiency of composite comprising carbon and porous nano-featured silicon accomplished via CVD according to Example 11.
Figure 24:
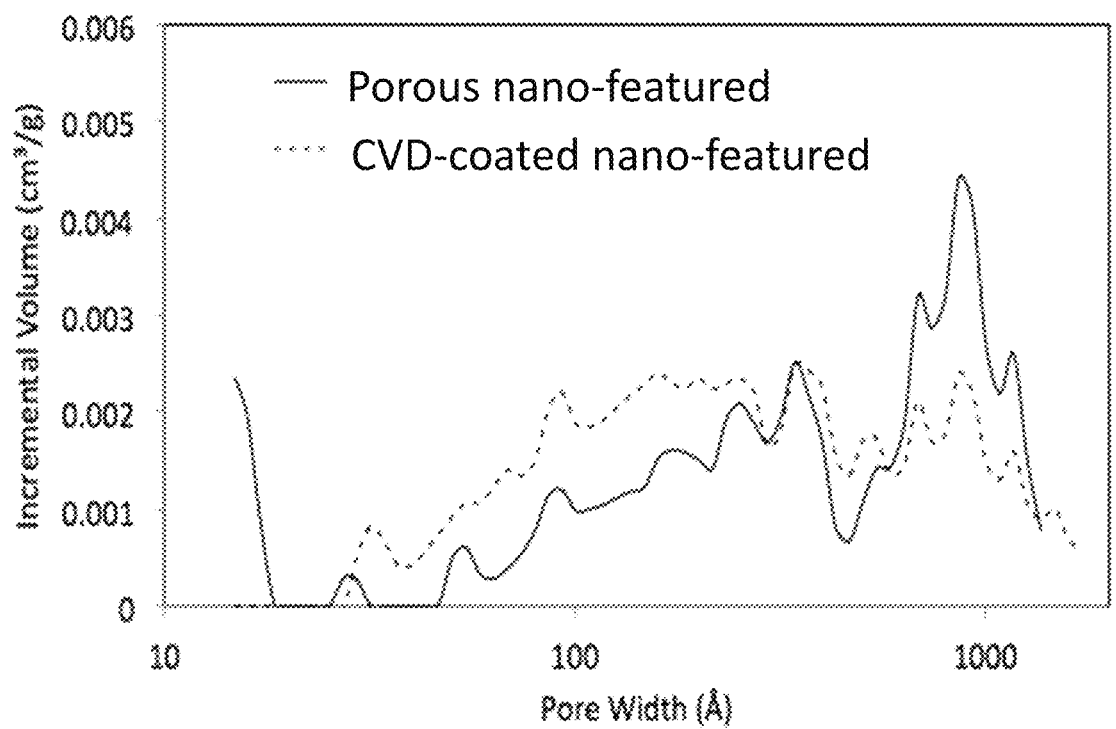
FIG. 24. Pore volume distribution of porous nano-featured silicon with and without carbon coating achieved via CVD.

Porous nano-featured silicon was obtained for carbon coating via CVD. Methane gas was used for carbon deposition using a tube furnace. The material was taken up to 1000° C. and methane was flowed through the furnace for varying amount of time, in order to deposit increasing amounts of carbon in the surface of the webbed silicon. Increasing dwell times lead to decreased surface area and pore volume. In order to maintain an adequate extraction capacity in a Lithium-Ion half-cell, the material exposed to methane for 15 minutes was used to test for electrochemical performance. An electrode was made with 80% active material, 10% conductivity enhancer and 10% binder. The active material was a blend of 15 wt % composite comprising carbon and porous nano-featured silicon and 85% graphite. A plot of the extraction capacity and Coulombic efficiency is shown in FIG. 23 for an exemplary composite material comprising porous nano-featured silicon and carbon produced via CVD (sample 11-3). The cell showed a first cycle efficiency of 78%, a stable extraction capacity of about 500 mAh/g (specifically, 493 mAh/g at cycle 6) and Coulombic efficiency reaching towards 100% (specifically, the average Coulombic efficiency over cycles 7 to 25 was 0.9968). As can be seen in Table 7, the carbon coating achieved via CVD resulted in substantial reduction of the pore volume and surface area in the composite, as compared to the non-composited porous nano-featured silicon. For sample 11-4, the pore volume was comprised of no detectable micropores, 6% mesopores, and 94% macropores. The pore volume distributions of porous nano-featured silicon with and without carbon coating achieved via CVD are depicted in FIG. 24.

The expansion of the anode was measured for an exemplary composite material comprising porous nano-featured silicon and carbon produced via CVD (sample 11-3), after the half-cell had been cycled for 26 cycles and at a 0% state of charge. For this case, the measured expansion was 21%. Another half-cell comprising substantially the same sample was also tested for expansion, after the half-cell had been cycled 38 times at 100% state of charge, resulting in a 43% expansion. This is substantially lower than the expansion for non-composited porous nano-featured silicon, as described in Example 7, wherein 67% expansion was measured at 100% state of charge.

TABLE 7

Characterization of composites comprising carbon and porous nano-featured silicon, said carbon achieved via CVD according to Example 11.

| Sample | Gas | Temp (° C.) | Time (mins) | % Carbon Added | SSA | PV |
|---|---|---|---|---|---|---|
| 11-1 (non CVD-coated) | NA | NA | 0 | NA | 118 | 0.246 |
| 11-2 | Methane | 1000 | 5 | 14% | 97 | 0.238 |
| 11-3 | Methane | 1000 | 15 | 37% | 79 | 0.225 |
| 11-4 | Methane | 1000 | 30 | 57% | 39 | 0.126 |

NA = not applicable.

Example 12

Composites Comprising Porous Nano Featured Silicon and Pyrolyzed Carbon Achieved Via Epoxy- and Phosphorous Containing Precursors with and without Further Carbon Coating Achieved Via CVD Porous nano-featured silicon was composited with carbon achieved as follows. The porous nano-featured silicon was compounded with precursors comprising a Novalac epoxy resin and phosphoric acid as a cross-linker, and extruded at elevated temperature to achieve a solid, particulate composite comprising the porous nano-featured silicon encased in the epoxy-phosphorus containing resin. This material was then pyrolyzed and jet milled as generally described elsewhere in this disclosure, to yield micronized composite particles comprising the porous nano-featured silicon and pyrolyzed carbon (sample 12-1). This material was further processed via CVD to achieve a secondary carbon coating (sample 12-2) in a tube furnace under nitrogen and exposure to methane at 1000° C. for 15 minutes.

Table 8 summarizes the physicochemical and electrochemical properties of the non-coated and CVD-carbon coated composite materials comprising porous nano-featured silicon and carbon achieved via epoxy- and phosphorus containing precursors.

TABLE 8

Physico- and electrochemical characterization of samples according to Example 12.

| Sample | SSA (m²/g) | PV (cm³/g) | % Si loading | FCE (%) | Capacity (mAh/g) | Avg CE (%) |
|---|---|---|---|---|---|---|
| 12-1 (composite) | 24.9 | 0.108 | 40-60% | 63 (no graphite) | 1158 (no graphite) | 0.9880 (no graphite) |
| | | | | 77 (85% graphite) | 399 (85% graphite) | 0.9958 (85% graphite) |
| 12-2 (CVD-coated composite) | 38.5 | 0.126 | 35-55% | 74 (70% graphite) | 582 (70% graphite) | 0.9937 (70% graphite) |

Figure 25:
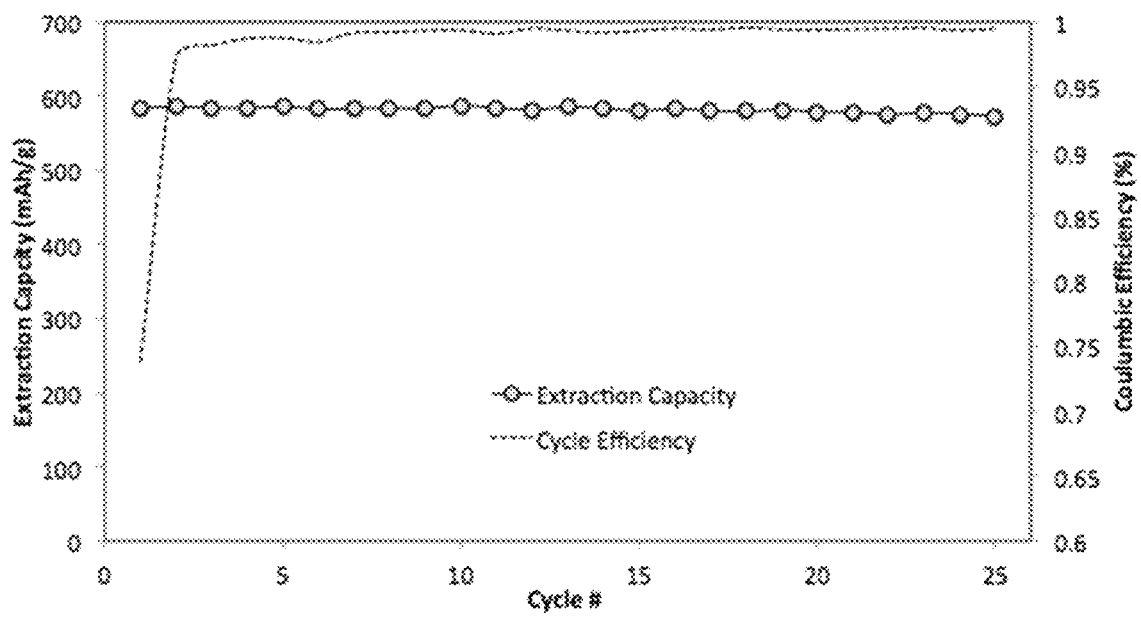
FIG. 25. Extraction capacity and Coulombic efficiency of composite comprising carbon and porous nano-featured silicon that was further CVD coated according to Example 12.

An electrode was made with 80% active material, 10% conductivity enhancer and 10% binder. The active material was a blend of 30 wt % silicon-carbon composite and 70% graphite. The extraction capacity and Coulombic efficiency are plotted in FIG. 25. The expansion of the anode was measured for an exemplary composite material comprising porous nano-featured silicon and carbon produced from epoxy- and phosphorus containing precursors, for the case wherein the anode was devoid of graphite, after the half-cell had been cycled for 2 cycles and at a 100% state of charge, resulting in a 45% expansion. Another half-cell comprising substantially the same sample was also tested for expansion, except the anode was comprised of 85% graphite, and the expansion was measured after the half-cell had been cycled 28 times and at a 100% state of charge, resulting in a 29% expansion.

Figure 26:
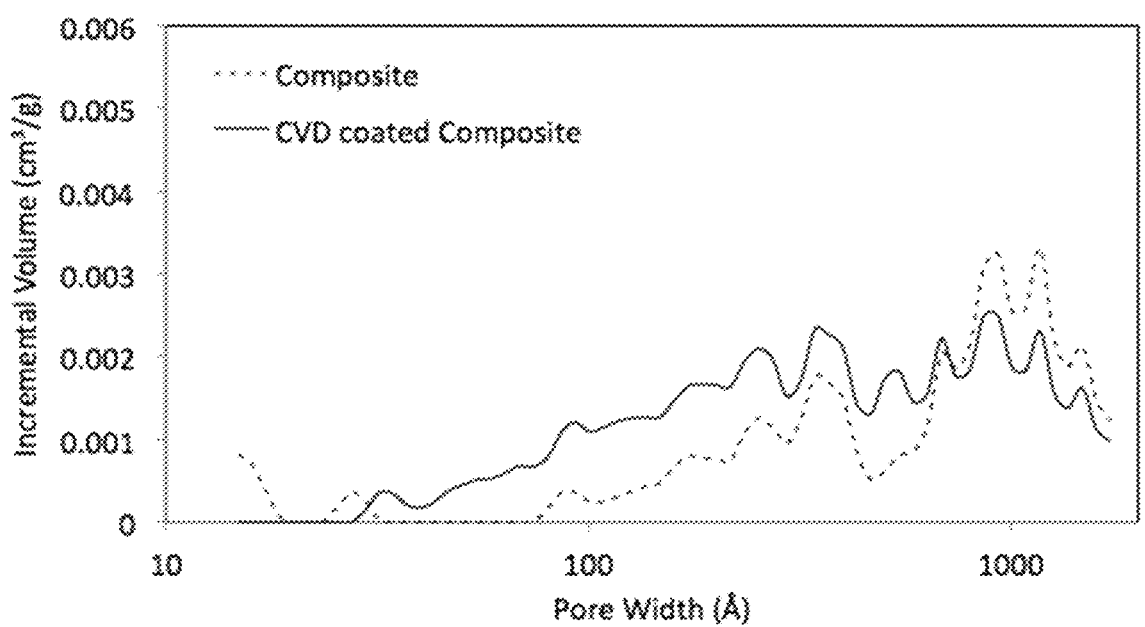
FIG. 26. Pore volume distribution of composite comprising porous nano featured silicon and pyrolyzed carbon via epoxy- and phosphorus-containing precursors, with and without further carbon coating achieved via CVD.

FIG. 26 compares the pore volume distribution for the composite and the CVD-coated composite. The composite material comprising porous nano-featured silicon and carbon achieved via epoxy- and phosphorus-containing precursors exhibited a pore volume distribution comprising 3.5% micropores, 1.4% mesopores, and 95.1% macropores. For the same sample further CVD-coated to create a secondary carbon coating, there was an elimination of micropores, namely this sample exhibited 0% micropores, 3% mesopores, and 97% macropores. From Table 8, it is evident that the CVD coating did not substantially lower the surface area or pore volume, yet there was an unexpected reduction specifically in the micropores, with concomitant increase in the percentage of mesopores and macropores.

Example 13

Physicochemical and Electrochemical Characterization of Physical Blend of Hard Carbon and Silicon-Carbon Composite A composite material comprising porous nano-featured silicon and carbon pyrolyzed from epoxy- and phosphorus-containing precursors was further physically blended with a hard carbon material (sans silicon) that was pyrolyzed also from a similar mixture of epoxy- and phosphorus-containing precursors. The material was tested in a half cell, with the anode comprised of 80% active material, 10% conductive carbon, and 10% binder, wherein the 80% active materials further comprised 70% graphite 30% of hard carbon and 30% of the silicon-carbon composite. The first cycle efficiency was 66% the extraction capacity was 443 mAh/g, and the average Coulombic efficiency from cycle 7 to 25 was 0.9883, and the capacity retention was 94.7% from cycle 25 to cycle 7.

Example 14

Urea Treatment of Porous Nano-Featured Silicon

Porous nano-featured silicon was prepared for nitrogen coating. Urea was used for the nitrogen treatment. The porous nano-featured silicon was taken up to 1000° C. at a 20° C./min ramp and held for 60 minutes. As the tube was taken to temperature, the urea breaks down into ammonia which subsequently interacts with the surface of the porous nano-featured silicon, without being bound by theory, resulting in increased nitrogen and/or reduced oxygen on the silicon surface. An electrode was made with 80% active material, 10% conductivity enhancer and 10% binder. The active material was a blend of 15 wt % silicon-carbon composite and 85% graphite. The first cycle efficiency was 80%, the capacity at cycle 6 was 461 mAh/g, the average Coulombic efficiency was 0.9922 over cycles 7 to 25, and the capacity retention from cycle 25 compared to cycle 7 was 100%.

Example 15

Figure 27:
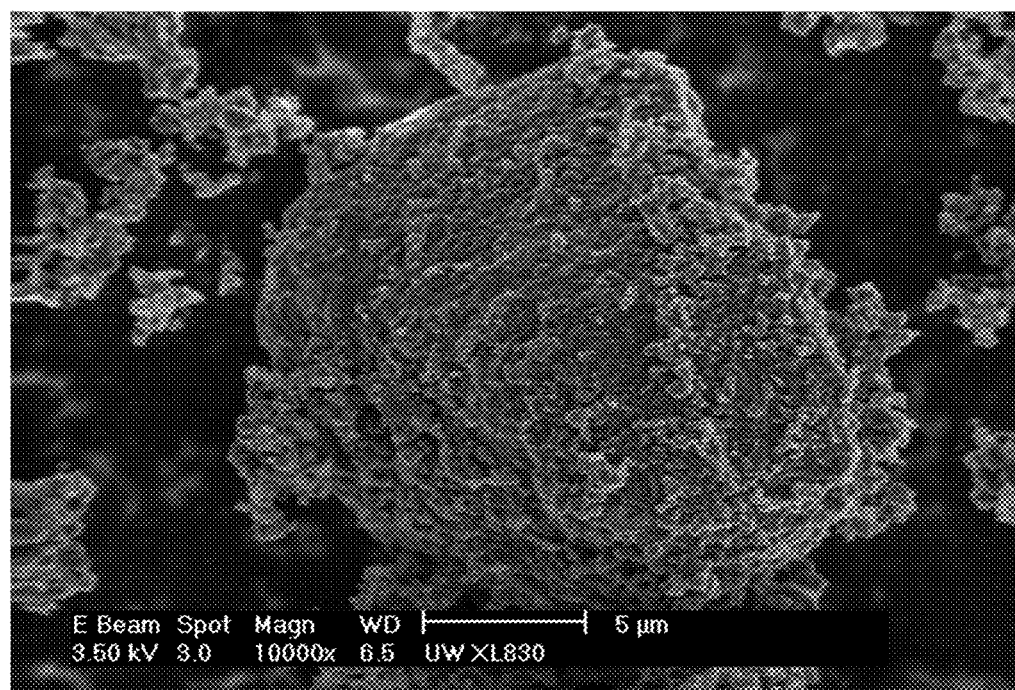
FIG. 27. SEM image for urea-treated and CVD coated porous nano-featured silicon according to Example 15.

Urea Treatment of Porous Nano-Featured Silicon, Followed by Carbon Coating Via CVD Porous nano-featured silicon was prepared for nitrogen and carbon coating. A mixture of webbed silicon and powdered urea was taken to 1000° C. in nitrogen gas as described in the example above, and then in a subsequent step, methane was used for carbon deposition. At 1000° C., methane was flowed through the furnace, in order to deposit carbon on the surface of the urea-treated porous nano-featured silicon. The SEM for this material is depicted in FIG. 27. As can be seen, the SEM shows essentially complete coverage of the porous nano-featured silicon and a lack of exposed silicon in the final material.

An electrode was made with 80% active material, 10% conductivity enhancer and 10% binder. The active material was a blend of 30 wt % silicon-carbon composite and 70% graphite. The first cycle efficiency was 78%, the capacity at cycle 6 was 652 mAh/g, the average Coulombic efficiency was 0.9918 over cycles 7 to 25, and the capacity retention from cycle 25 compared to cycle 7 was 98.6%. The expansion of the anode was measured following 28 cycles and at 100% state of charge, resulting in a measured expansion of 61%.

In addition, an electrode was made with 80% active material, 10% conductivity enhancer and 10% binder. The active material was a blend of 15 wt % silicon-carbon composite and 85% graphite. The first cycle efficiency was 82%, the capacity at cycle 6 was 486 mAh/g, the average Coulombic efficiency was 0.9941 over cycles 7 to 25, and the capacity retention from cycle 25 compared to cycle 7 was 99.6%. The expansion of the anode was measured following 26 cycles and at 100% state of charge, resulting in a measured expansion of 38%.

In addition, an electrode was made with 80% active material, 10% conductivity enhancer and 10% binder. The active material was a blend of 5 wt % silicon-carbon composite and 95% graphite. The first cycle efficiency was 84%, the capacity at cycle 6 was 361 mAh/g, the average Coulombic efficiency was essentially 100% over cycles 7 to 20, and the capacity retention from cycle 20 compared to cycle 7 was 100%. The expansion of the anode was measured following 21 cycles and at 100% state of charge, resulting in a measured expansion of 28%.

Porous nano-featured silicon was obtained for carbon coating. First, urea was used for nitrogen treatment. The material was taken up to 1000° C. at a 20° C./min ramp and held for 60 minutes. As the tube was taken to temperature, the urea breaks down into ammonia which subsequently interacts with the surface of the porous nano-featured silicon. An electrode was made with 80% active material, 10% conductivity enhancer and 10% binder. The active material was a blend of 15 wt % silicon-carbon composite and 85% graphite. The first cycle efficiency was 80%, the capacity at cycle 6 was 461 mAh/g, the average Coulombic efficiency was 0.9922 over cycles 7 to 25, and the capacity retention from cycle 25 compared to cycle 7 was 100%.

Figure 28:
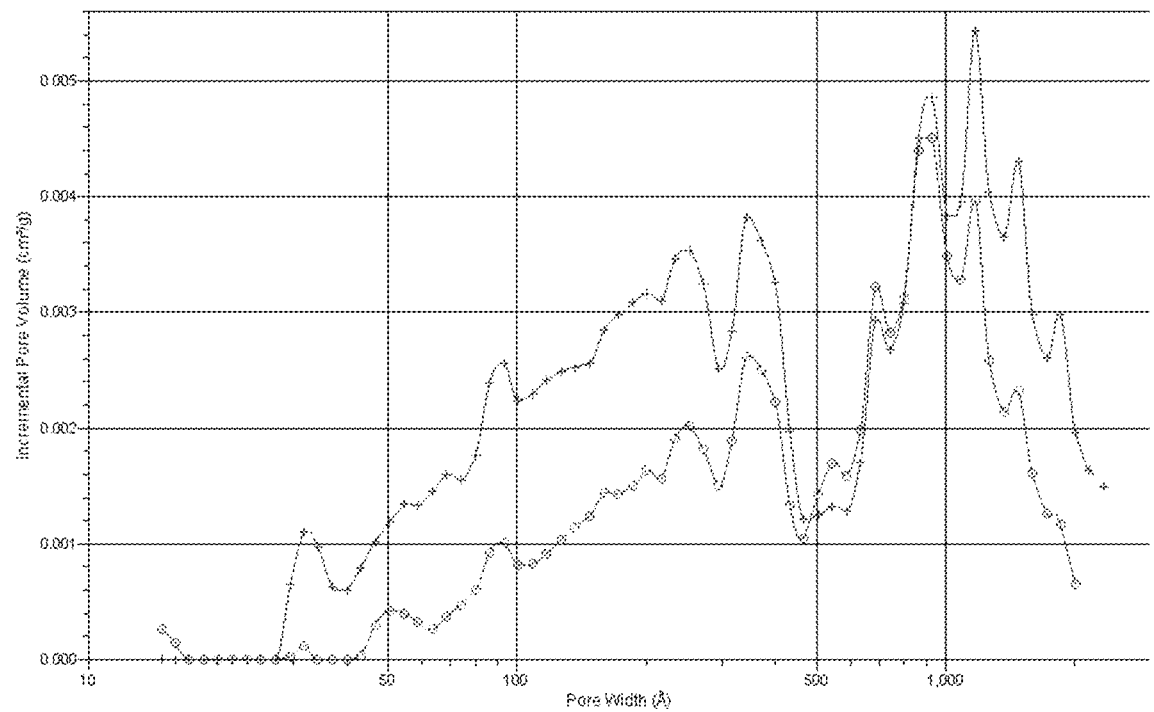
FIG. 28. Pore volume distributions for urea-treated and urea-treated and CVD carbon-coated porous nano-featured silicon.

The pore volume distributions for the urea-treated and urea-treated and CVD carbon-coated porous nano-featured silicon are presented in FIG. 28. As can be seen, the CVD carbon coating provided for a decrease in micropores. For the urea treated porous nano-featured silicon, the sample was comprised of 0.5% micropores, 1.1% mesopores, and the remainder macropores. For the urea treated porous nano-featured silicon, the sample was comprised of 0% micropores, 5% mesopores, and the 95% macropores.

Example 16

Figure 29:
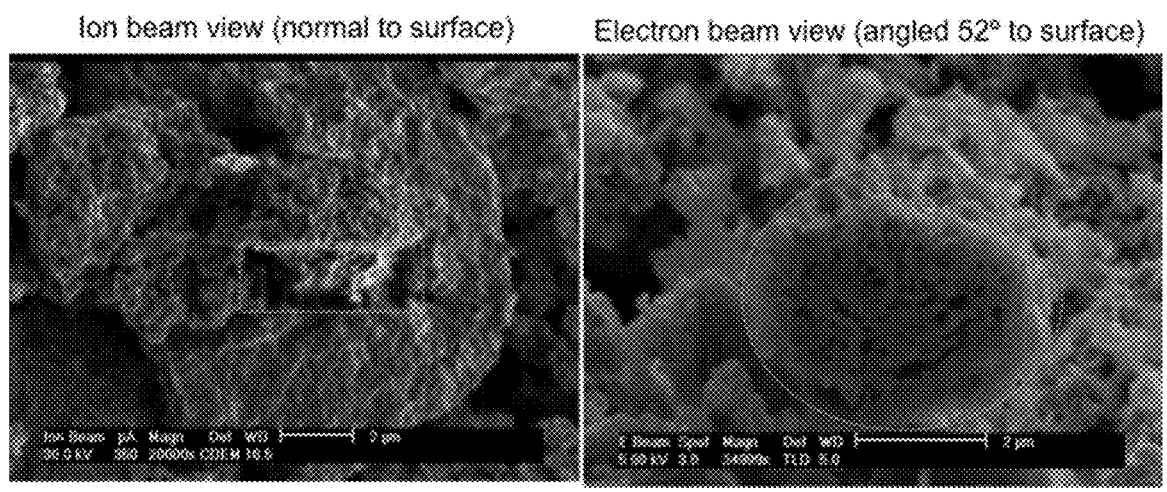
FIG. 29. FIB SEM for composite comprising porous nano-featured silicon and carbon pyrolyzed from epoxy- and phosphorus-containing precursors: imaged from particle perpendicular (left) and angled (right) to the surface.

Focused Ion Beam (Fib) SEM Analysis of Composites Comprising Porous Nano Featured Silicon and Pyrolyzed Carbon Achieved Via Epoxy- and Phosphorous Containing Precursors Focused ion beam (FIB) etching and SEM imaging of E2 webbed Si/C composite is used to investigate the extent of internal porosity and carbon coating of the Si—C particles. Energy dispersive x-ray analysis (EDS) is also used to evaluate the elemental distribution of the material. The FIB etching process was performed using a gallium-ion beam to a depth of ~0.5 microns on a chosen Si—C particle. The ion beam was fixed normal to the surface of the particle while the imaging electron beam was angled at 52° to view the cross section (FIG. 29).

Figure 30:
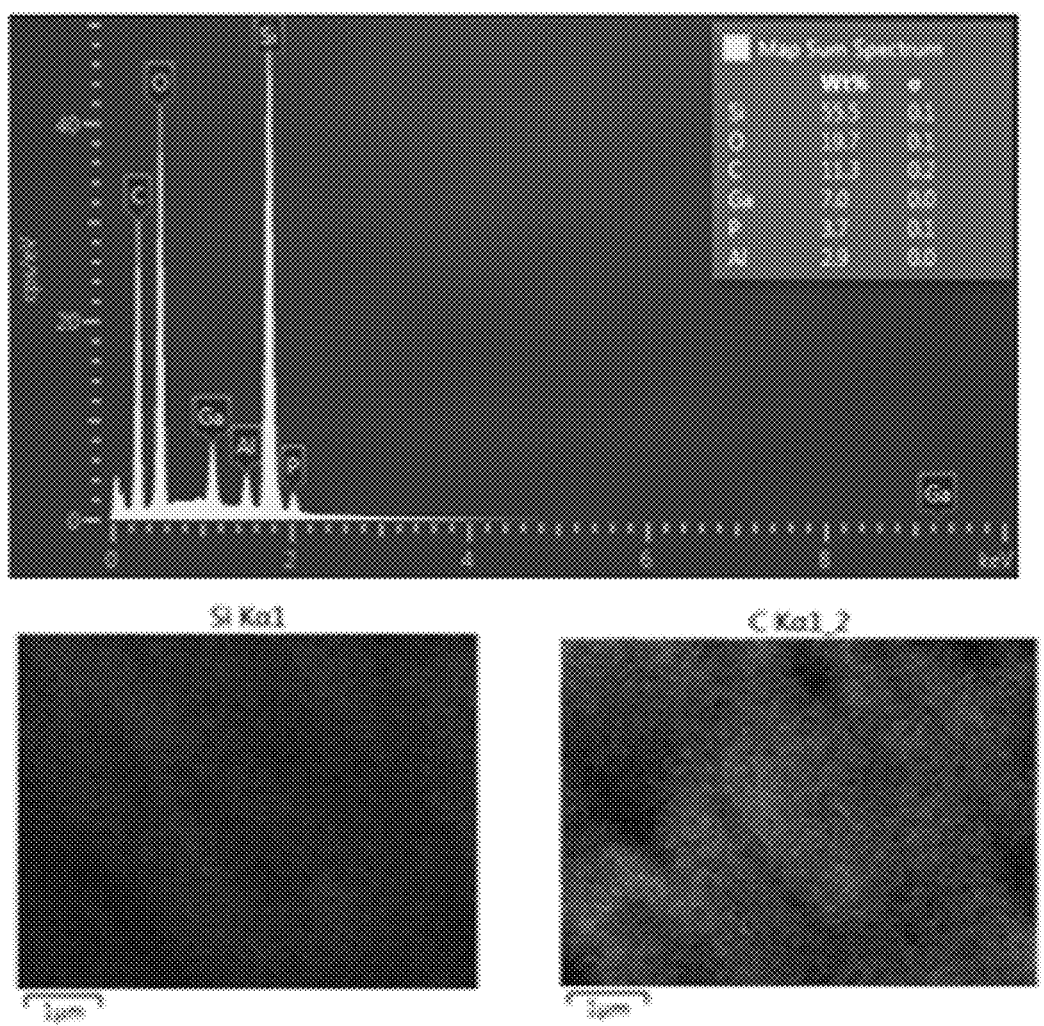
FIG. 30. EDS analysis of composite comprising porous nano-featured silicon and carbon pyrolyzed from epoxy- and phosphorus-containing precursors: EDS spectra (top) and elemental distribution of silicon (bottom, left) and carbon (bottom, right) within the particle.

The etched cross section of the particle revealed a very porous structure with a nearly homogeneous distribution of carbon and silicon as determined by EDS analysis (FIG. 30). This indicates the porous webbed Si—C structure is maintained throughout Si—C processing and can thus accommodate the expansion of silicon. According to the analysis, the data revealed an overall silicon content of 55.5%, an oxygen content of 19.7%, a carbon content of 11.3%, a phosphorus content of 3.7%, and an aluminum content of 2.9%. FIB/EDS line scans were also performed across a cross-section and further confirmed homogeneous distribution of carbon and silicon with smaller amounts of phosphorus and aluminum from the carbon and silicon, respectively.

Example 17

Figure 31:
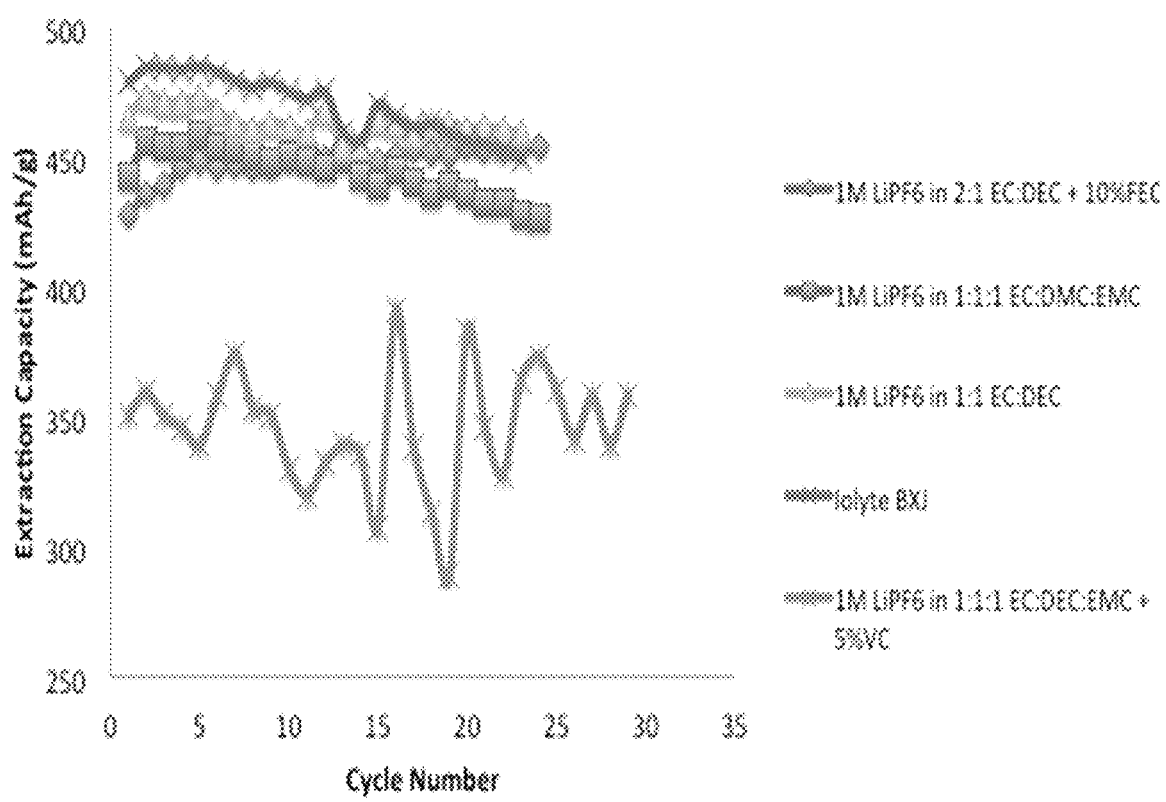
FIG. 31. Capacity of composite comprising porous nano-featured silicon and carbon pyrolyzed from epoxy- and phosphorus-containing precursors: effect of various electrolytes.
Figure 32:
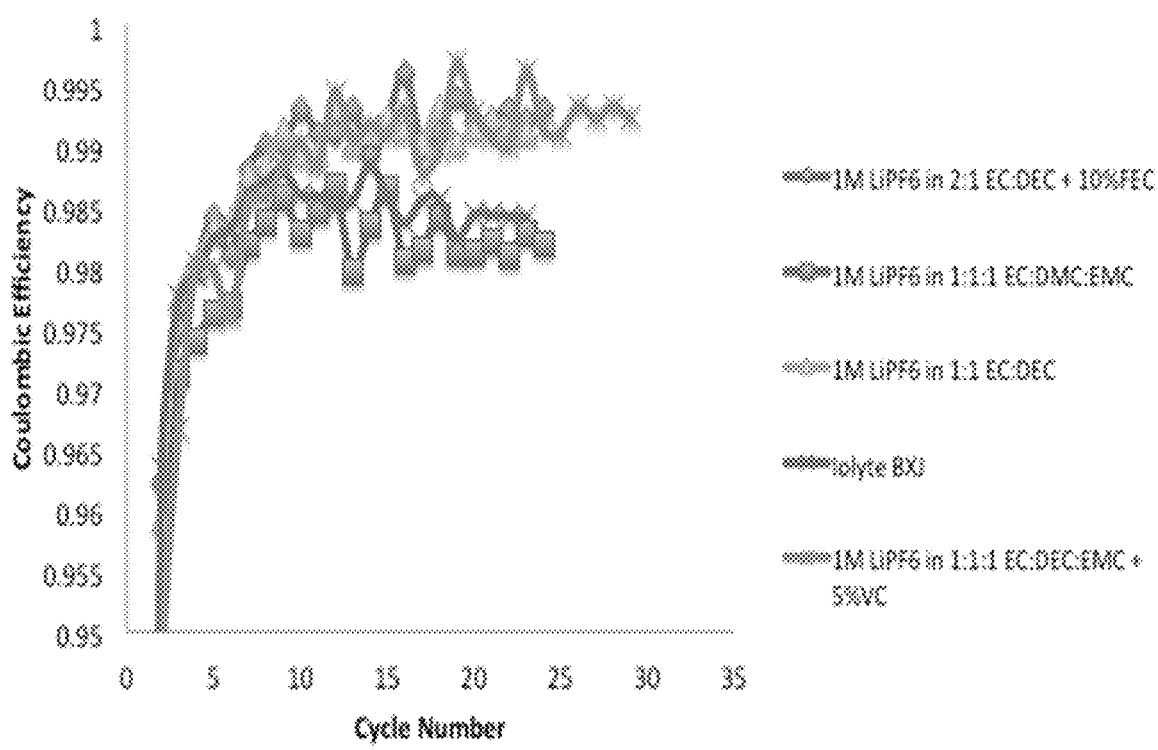
FIG. 32. Coulombic efficiency of composite comprising porous nano-featured silicon and carbon pyrolyzed from epoxy- and phosphorus-containing precursors: effect of various electrolytes.

Electrochemical Performance of Composites Comprising Porous Nano Featured Silicon and Pyrolyzed Carbon Achieved Via Epoxy- and Phosphorous Containing Precursors in Half-Cell Employing Various Different Electrolytes Composites comprising porous nano featured silicon and pyrolyzed carbon achieved via epoxy- and phosphorous containing precursors were produced generally according to the proceeded disclosed herein. The composite was tested for electrochemical performance in a half cell, with the anode comprising 80% active material, 10% conductive carbon, and 10% binder, with the active materials further comprised of 70% graphite and 30% of silicon-carbon composite. Each cell was tested for cycle stability using a C/10 constant current profile from 0.8V-0.005V vs. Li/Li+ with a voltage hold at 0.005V until the current reached C/20 followed by C/5 constant current cycling thereafter. The best performing cells were those that exhibit both the highest reversible capacity and Coulombic efficiency. Five different electrolytes were tested: (i) 1M $LiPF_6$ 2:1 w/w ethylene carbonate (EC):diethylcarbonate (DEC)+10% fluroethylene carbonate FEC (ii) 1M $LiPF_6$ 1:1:1 w/w/w EC:DEC:dimethylcarbonate (DMC)+5% vinylene carbonate (VC), (iii) 1M $LiPF_6$ 1:1:1 w/w/w EC:DMC:ethyl methyl carbonate (EMC), (iv) 1M $LiPF_6$ 1:1 w/w EC:DEC, and (v) Iolyte BXJ (an ionic liquid electrolyte). The reversible capacity and Coulombic efficiency are shown in FIG. 31 and FIG. 32, respectively. The data show the electrolyte with 10% FEC exhibits advantageous capacity and efficiency combination compared to the other electrolytes.

Example 18

Figure 33:
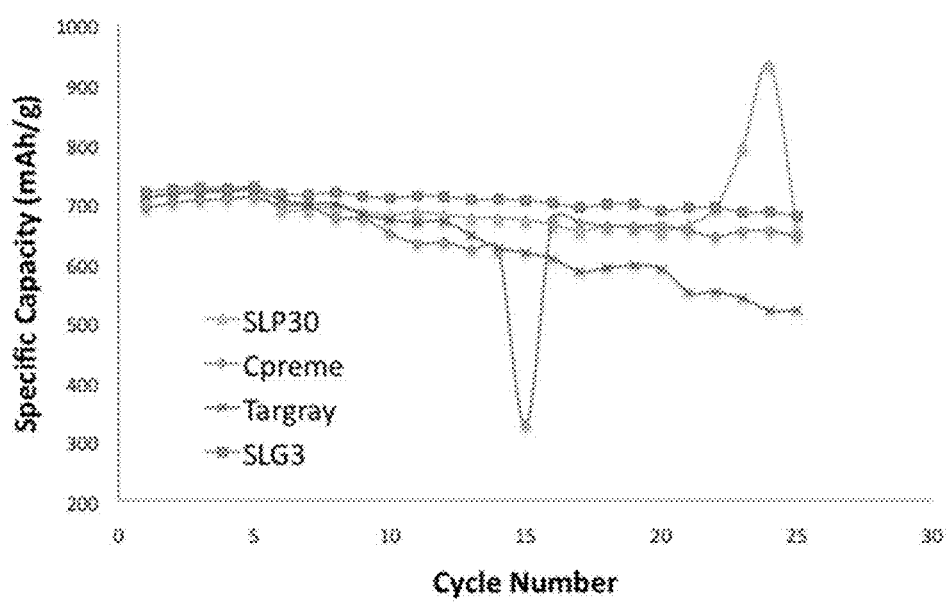
FIG. 33. Capacity retention of composite comprising porous nano-featured silicon and carbon pyrolyzed from epoxy- and phosphorus-containing precursors: effect of various graphite types.

Electrochemical Performance of Composites Comprising Porous Nano Featured Silicon and Pyrolyzed Carbon Achieved Via Epoxy- and Phosphorous Containing Precursors in Half Cell: Effect of Graphite Type Composites comprising porous nano featured silicon and pyrolyzed carbon achieved via epoxy- and phosphorous containing precursors were produced generally according to the proceeded disclosed herein. The composite was tested for electrochemical performance in a half cell, with the anode comprising 80% active material, 10% conductive carbon, and 10% binder, with the active materials further comprised of 60% graphite and 40% of silicon-carbon composite. A variety of graphites were tested: (i) TIMCAL SLG 3 Graphite, (ii) TIMCAL SLP 30 Graphite, (iii) TARGRAY Graphite, (iv) CPREME Graphite. Each cell was tested for cycle stability using a C/10 constant current profile from 0.8V-0.005V vs. Li/Li+ with a voltage hold at 0.005V until the current reached C/20 for the first five cycles followed by C/5 constant current cycling thereafter. The best performing graphites were those that exhibit both the highest reversible capacity and capacity retention in a blend. The results in FIG. 33 show that the webbed Si—C blend using Timcal SLG3 exhibited the most stable capacity. Without being bound by theory, the smaller particle size of SLG3 depict higher stability which may be due to better arrangement and distribution of graphite particles blended with the Si—C composite.

Example 19

Figure 34:
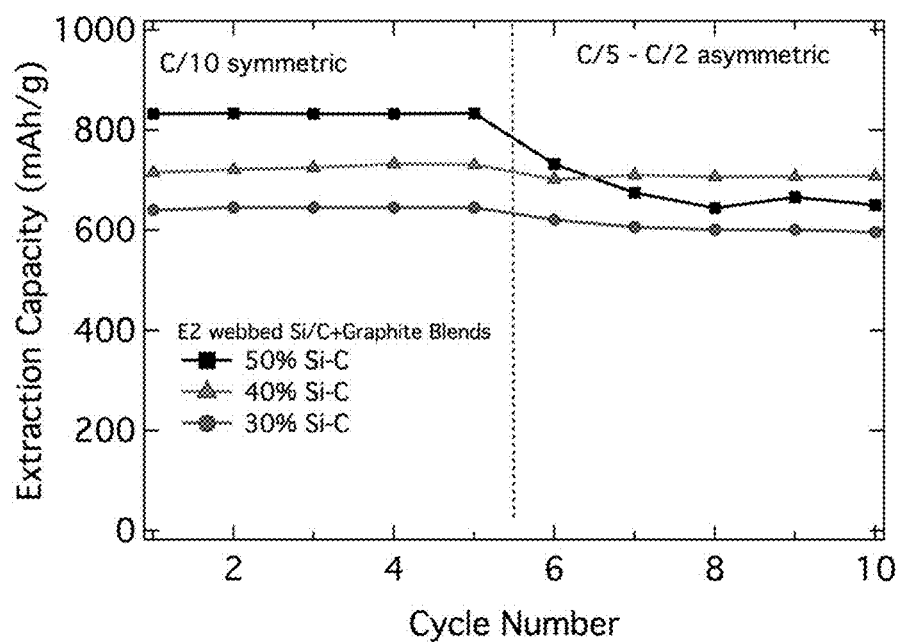
FIG. 34. Capacity retention and rate performance of composite comprising porous nano-featured silicon and carbon pyrolyzed from epoxy- and phosphorus-containing precursors: effect of graphite content in the anode.

Electrochemical Performance of Composites Comprising Porous Nano Featured Silicon and Pyrolyzed Carbon Achieved Via Epoxy- and Phosphorous Containing Precursors in Half Cell: Effect of Graphite Loading Composites comprising porous nano featured silicon and pyrolyzed carbon achieved via epoxy- and phosphorous containing precursors were produced generally according to the proceeded disclosed herein. The composite was tested for electrochemical performance in a half-cell, with the anode comprising 80% active material, 10% conductive carbon, and 10% binder, with the active materials further comprised various amounts of graphite relative to silicon carbon composite. The blends were tested electrochemically using a constant current symmetric charge-discharge C/10 profile from 0.8V-0.005V with a voltage hold at 0.005V until the current reaches C/20 followed by asymmetric C/5-C/2 discharge-charge cycling. The results depicted in FIG. 34 show that the Si—C content has a direct correlation with the overall capacity of the blend in that increasing Si—C causes increased capacity. At higher Si—C ratios however the cycle stability decreases. That the highest Si—C ratio resulted in a substantial drop in capacity when the rate was increased to C/5, without being bound by theory, the data indicate a need to limit the Si—C content for high rate applications.

Example 20

Figure 35:
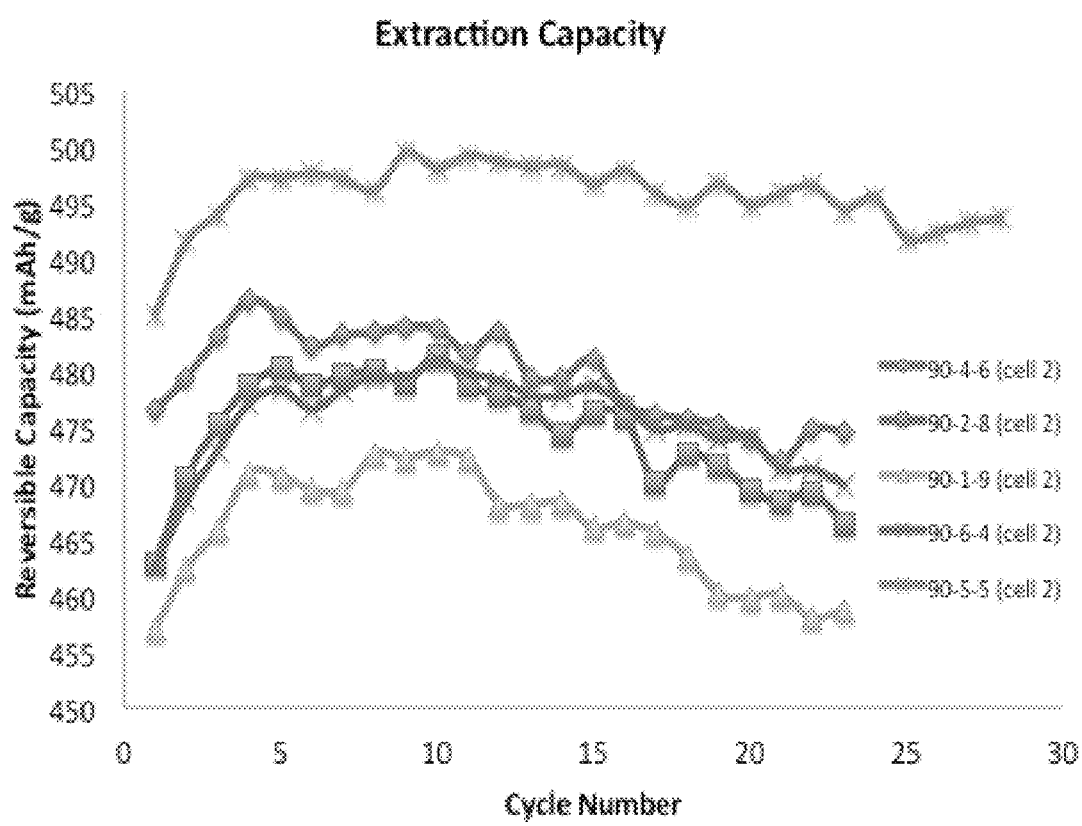
FIG. 35. Capacity retention of composite comprising porous nano-featured silicon and carbon pyrolyzed from epoxy- and phosphorus-containing precursors: effect of conductive carbon loading.
Figure 36:
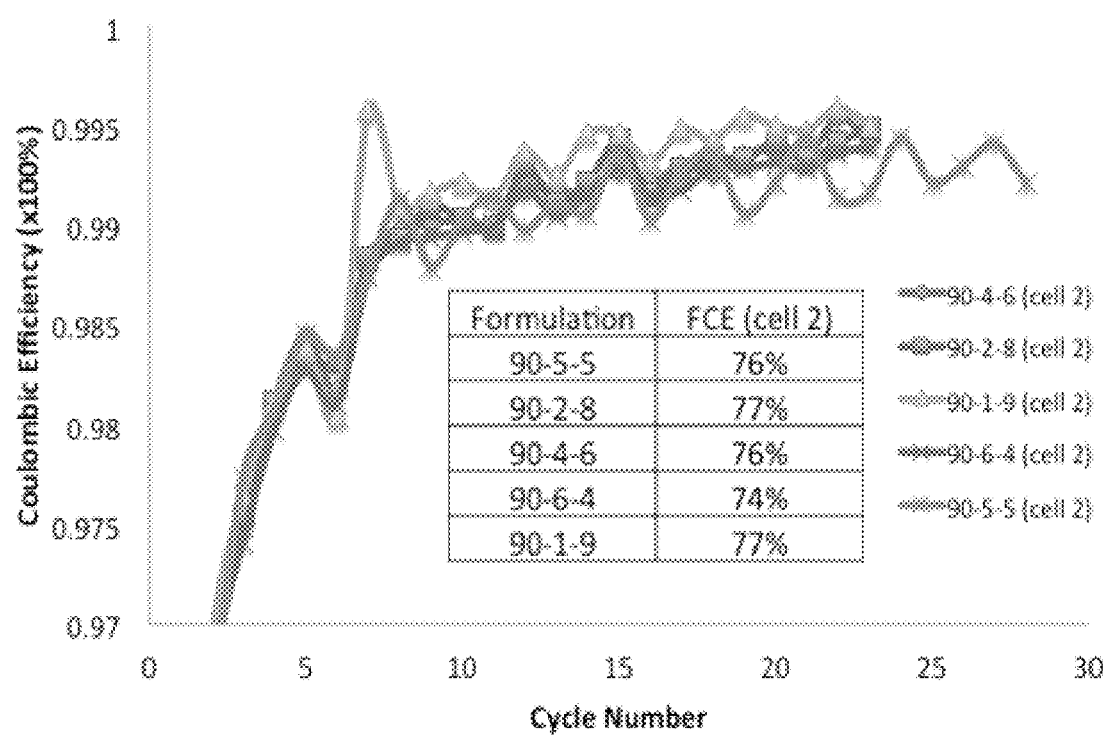
FIG. 36. Coulombic efficiency of composite comprising porous nano-featured silicon and carbon pyrolyzed from epoxy- and phosphorus-containing precursors: effect of conductive carbon loading.

Electrochemical Performance of Composites Comprising Porous Nano Featured Silicon and Pyrolyzed Carbon Achieved Via Epoxy- and Phosphorous Containing Precursors in Half Cell: Effect of Conductive Carbon Loading Composites comprising porous nano featured silicon and pyrolyzed carbon achieved via epoxy- and phosphorous containing precursors were produced generally according to the proceeded disclosed herein. The composite was tested for electrochemical performance in a half-cell, with the anode comprising conductive carbon additive (SuperP) and binder ratio (CA:B) that was varied while the active material (graphite+Si-C composite) remained constant at 90%. The electrodes were tested electrochemically for cycle stability and capacity at constant current C/10 from 0.8V-0.005V with C/20 hold at 0.005V followed by C/5 cycling with the same current and voltage limitations. The results in FIG. 35 (capacity data) and FIG. 36 (Coulombic efficiency data) show with 1:1 ratio extraction capacity and retention were higher compared to other CA:B ratios with 90% active materials. The data indicate that superior capacity and retention were obtained by decreasing the binder and increasing conductive additive content while a CA:B ratio of 1:1 approaches ideality.

Example 21

Figure 37:
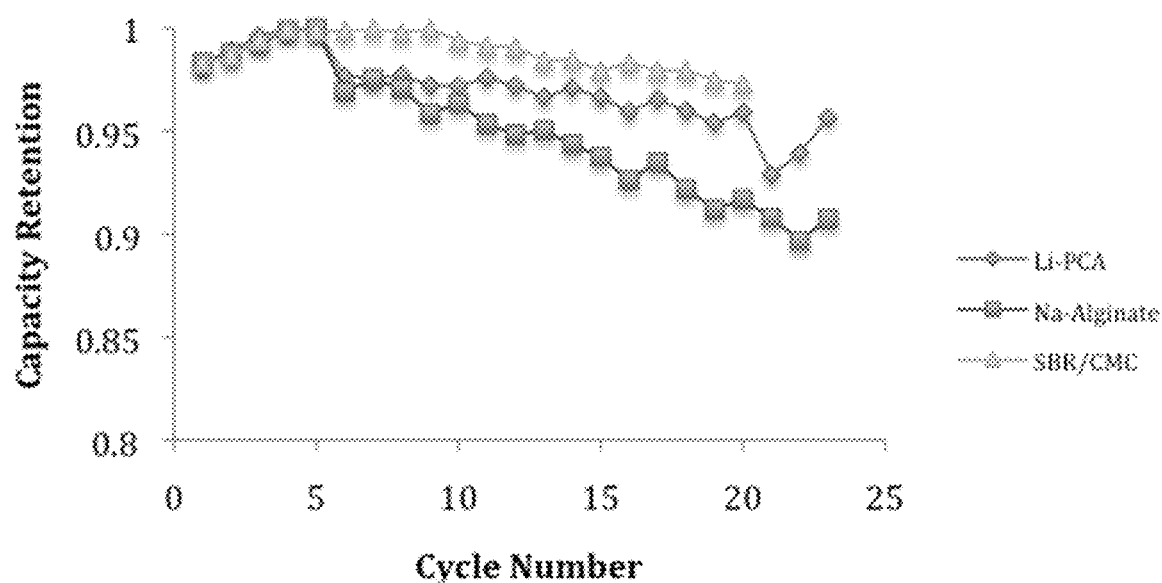
FIG. 37. Coulombic efficiency of composite comprising porous nano-featured silicon and carbon pyrolyzed from epoxy- and phosphorus-containing precursors: effect of binder.

Electrochemical Performance of Composites Comprising Porous Nano Featured Silicon and Pyrolyzed Carbon Achieved Via Epoxy- and Phosphorous Containing Precursors in Half Cell: Effect of Binder Composites comprising porous nano featured silicon and pyrolyzed carbon achieved via epoxy- and phosphorous containing precursors were produced generally according to the proceeded disclosed herein. The composite was tested for electrochemical performance in a half cell, with the anode comprising 80% active material, 10% conductive carbon, and 10% binder, with the active materials further comprised of 70% graphite (Timcal SLG3) and 30% of silicon-carbon composite. Three different binder types were tested: (i) Li-polycarboxylic acid (Li-PCA), (ii) Na-alginate, and (iii) styrene-butadiene rubber/carboxymethlycellulose (SBR/CMC). The electrode composition was fixed at 80:10:10 and cycled using a constant current C/10 from 0.8V-0.005V for the first five cycles followed by C/5 thereafter. The results in FIG. 37 show the sodium alginate had the worst capacity retention and soft short at high current density respectively. The SBR/CMC and Li-PCA binder appeared to have relatively higher reversible capacity and stability; however, SBR/CMC appears to be slightly more stable and possess higher extraction capacity comparing to Li-PCA.

Example 22

Electrochemical Performance of Composites Comprising Porous Nano Featured Silicon and Pyrolyzed Carbon Achieved Via Epoxy- and Phosphorous Containing Precursors in Half Cell: Effect of Voltage Profile Composites comprising porous nano featured silicon and pyrolyzed carbon achieved via epoxy- and phosphorous containing precursors were produced generally according to the procedures disclosed herein. The composite was tested for electrochemical performance in a half cell, with the anode comprising 80% active material, 10% conductive carbon, and 10% binder, with the active materials further comprised of 60% graphite and 40% of silicon-carbon composite. The half-cells electrochemically tested for cycle stability using three different cycling profiles: (i) 1.5V-0.01V C/100 hold, (ii) 1.2V-0.01V no hold, and (iii) 0.8V-0.005V C/20 hold. All cells were conditioned using their respective voltage windows at a symmetric C/10 current for five cycles before long term cycling at C/5 symmetric current.

TABLE 9

First cycle electrochemical results for samples tested according to Example 22.

| Profile | Upper V | Lower V | Hold | Insertion (mAh/g) | Extraction (mAh/g) | Irreversible Capacity (mAh/g) | FCE (%) |
| --- | --- | --- | --- | --- | --- | --- | --- |
| I | 1.5 | 0.01 | C/100 | 1049 | 830 | 224 | 79% |
| II | 1.2 | 0.01 | no | 946 | 732 | 215 | 77% |
| III | 0.8 | 0.005 | C/20 | 1066 | 757 | 315 | 70% |

The results depicted in Table 9 show the first cycle electrochemical performance of each of the voltage windows tested (average of two cells each). The capacity was largely affected by the duration of the low voltage cutoff and hold which followed the general trend I>III>II. However, the capacity trend did not necessarily coincide with the first cycle efficiency and followed the order I>II>III. Without being bound by theory, the low upper cutoff voltage of profile III leads to low efficiency for the hard carbon material in the silicon-carbon composite since this voltage cutoff bisects the high voltage plateau of the hard carbon associated with the Li-phosphorus interaction.

Figure 38:
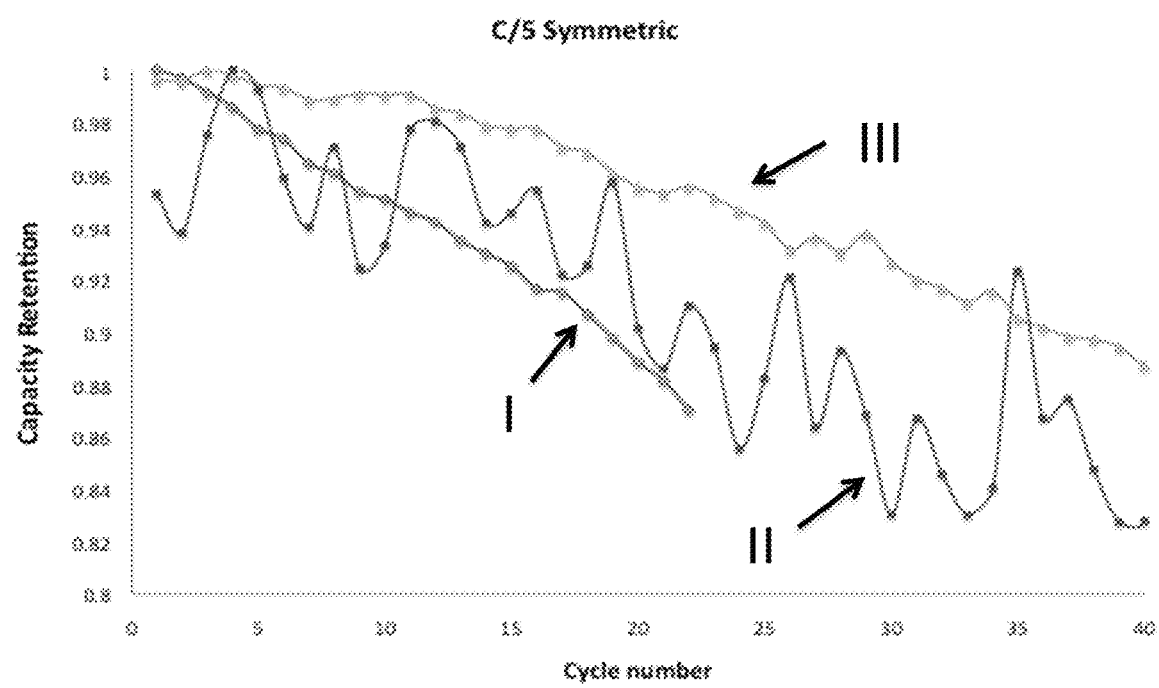
FIG. 38. Capacity retention of composite comprising porous nano-featured silicon and carbon pyrolyzed from epoxy- and phosphorus-containing precursors: effect of voltage window.
Figure 39:
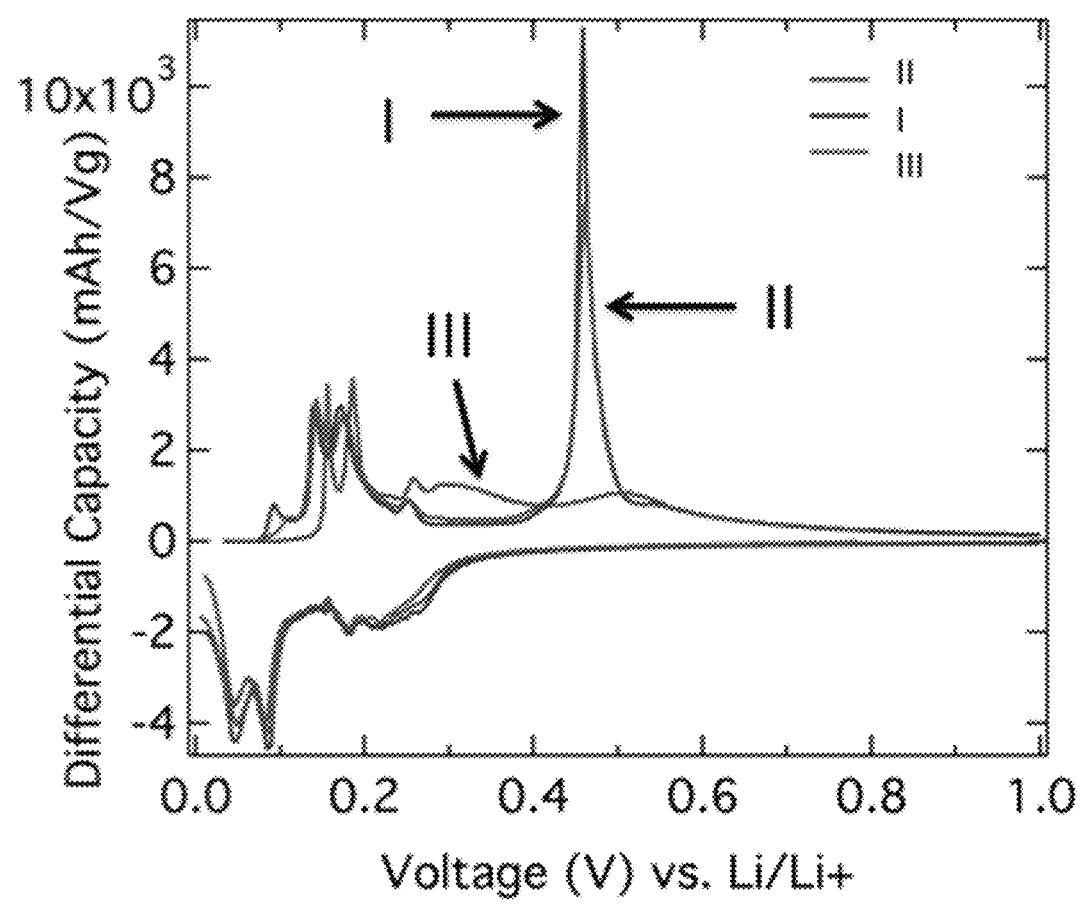
FIG. 39. Differential capacity vs voltage of composite comprising porous nano-featured silicon and carbon pyrolyzed from epoxy- and phosphorus-containing precursors: effect of voltage window.

The capacity retention and differential capacity vs. voltage are depicted in FIG. 38 and FIG. 39, respectively. Wide voltage window and longer voltage holds lead to increased capacity but overall decreased cycle stability. Omission of voltage holds minimizes formation of stable crystalline phases. Variation in capacity from cycle to cycle makes this difficult to corroborate. However, differential capacity plots indicate no capacity losses associated with the silicon voltage regimen over time. The best compromise between capacity and cycle stability appears to be the profile III. The tighter voltage window and less aggressive hold period offers more mild cycling conditions for improved stability. Furthermore, and without being bound by theory, the low upper cutoff voltage (0.8V) is perhaps most relevant when considering performance in a full cell since capacity above 1V (in a half cell) is not necessarily available in practice.

Example 23

Electrochemical Performance of Composites Comprising Porous Nano Featured Silicon and Pyrolyzed Carbon Achieved Via Epoxy- and Phosphorous Containing Precursors in Half Cell: Effect of Electrode Calendaring Composites comprising porous nano featured silicon and pyrolyzed carbon achieved via epoxy- and phosphorous containing precursors were produced generally according to the proceeded disclosed herein. The composite was tested for electrochemical performance in a half cell, with the anode comprising 80% active material, 10% conductive carbon, and 10% binder, with the active materials further comprised of 60% graphite (Timcal SLP30) and 40% of silicon-carbon composite. In this example, the electrodes were calendared to different ratios relative to the starting thickness. The electrodes were tested electrochemically using both cycle stability and rate study profiles. Table 10 represents outcomes from different electrode calendaring ratios. The similar data appears for different calendaring ratios with slight variation in electrode density. By calendaring to higher ratio the thickness and volume were reduced and thus electrode density increased at higher calendaring ratio correspondingly. The first cycle efficiency (FCE) appeared to be similar regardless of calendaring ratio.

TABLE 10

Effect of calendaring ratio of electrochemical performance for samples according to Example 23.

| Pre-Cal. Thickness (um) | Calendaring Ratio | Active Material Electrode Density (g/cc) | Active Material Loading (mg/cm2) | FCE (%) |
| --- | --- | --- | --- | --- |
| 82 | 0% | 0.68 | 5.61 | 71% |
| 82 | 13% | 0.76 | 5.37 | 71% |
| 85 | 25% | 0.85 | 5.44 | 71% |
| 85 | 31% | 0.95 | 5.63 | 71% |

Figure 40:
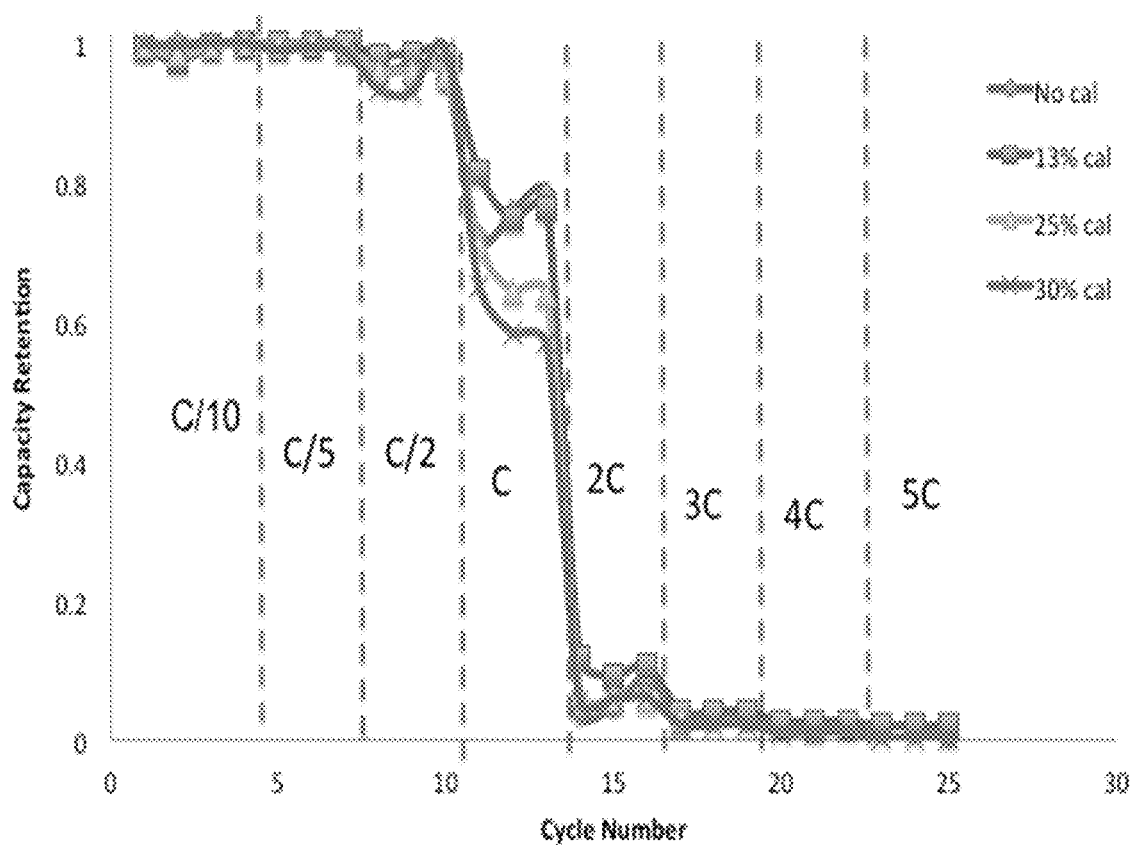
FIG. 40. Rate capability of composite comprising porous nano-featured silicon and carbon pyrolyzed from epoxy- and phosphorus-containing precursors: effect of electrode calendaring.
Figure 41:
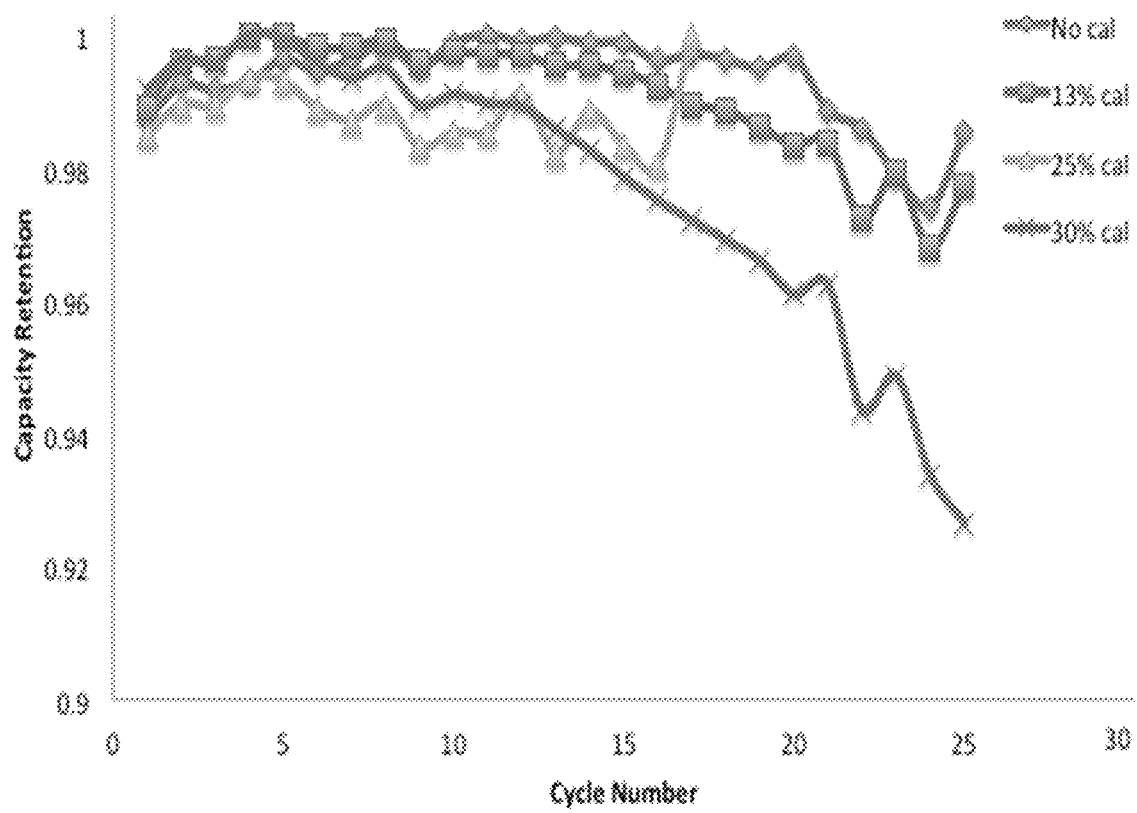
FIG. 41. Capacity retention of composite comprising porous nano-featured silicon and carbon pyrolyzed from epoxy- and phosphorus-containing precursors: effect of electrode calendaring.

The rate capability data and capacity retention data are depicted in FIG. 40 and FIG. 41, respectively. Similar trends appeared for all calendaring percentages and they were all not stable after C/2 rate and completely faded in retention and capacity after 1 C rate. The electrodes below 15% calendaring depict better retention and reversible capacity after 25 cycles. However, the electrodes above 13% calendaring represent lower performance.

Example 24

Emulsion Coating of Porous Nano-Featured Silicon

Porous nano-featured silicon was prepared according to the methodologies described herein. The silicon was further coated with resin employing an emulsion process, with the advantage and aim or creating a primary particle of sufficiently low size to preclude the need for further particle size reduction (for example, via jet milling) to yield a final composite particle. Without being bound by theory, in an effort to mitigate the presumed continued formation of SEI on the surface of the particle as a result expansion/contraction a conformal coating of carbon is necessary. Current resins use a monolithic-based process wherein the monolith must then undergo milling to achieve the desired final particle size, inevitably leading to exposed silicon on the surface. An emulsion resin coating process can be used to yield conformal coating of porous nano-featured silicon with carbon in-situ and reduce the need for further particle size reduction.

Figure 42:
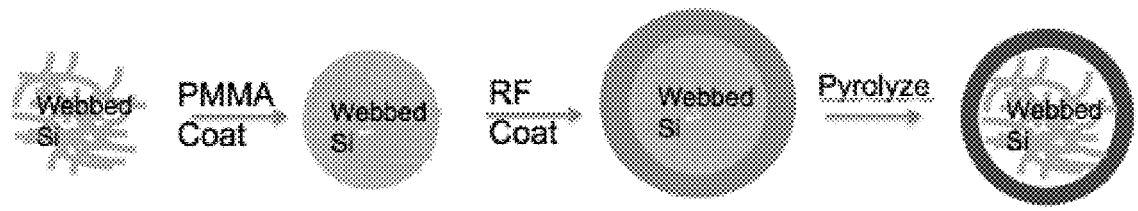
FIG. 42. Emulsion process for creation of conformal carbon layer around porous nano-featured silicon.

In an exemplary process, the porous nano-featured silicon is dispersed in an organic solvent (e.g. cyclohexane) and methyl methacrylate is added along with a radical initiator. The mixture is allowed to stir and react until polymethyl methacrylate (PMMA) is formed via chain growth polymerization effectively "wraps" the silicon particles. Subsequently a mixture of resorcinol (R), formaldehyde (F), and an acid catalyst is added and allowed to undergo step-growth polymerization thus encapsulating the Si/PMMA particles forming Si/PMMA/RF core-shell particles. This powder is collected via centrifuging and rinsed then dried and subsequently pyrolyzed (>600° C.) in an inert atmosphere. Since the PMMA is known to completely decompose and yield no carbon byproduct at elevated temperatures, this process yields a hollow Si/void/C particle that can allow space for silicon to expand when undergoing lithiation. The process is depicted schematically in FIG. 42.

Example 25

Physicochemical Characterization of Composites Comprising Porous Nano Featured Silicon and Pyrolyzed Carbon Achieved Via Epoxy- and Phosphorous Containing Precursors Composites comprising porous nano featured silicon and pyrolyzed carbon achieved via epoxy- and phosphorous containing precursors were produced generally according to the proceeded disclosed herein. Several lots of material were produced, and their surface area and pore volume characteristics were measured, as reported in Table 11. Other physicochemical data, including pH, tap density, and particle size distribution were also measured, as reported in Table 12.

TABLE 11

Surface area and pore volume data for samples according to Example 25.

| Sample | Surface Area (m2/g) | Pore Volume (cm3/g) | % Micropores | % Mesopores | % Macropores |
|---|---|---|---|---|---|
| 25-1 | 13.3 | 0.016 | 4.5 | 12.3 | 83.2 |
| 25-2 | 53.3 | 0.032 | 23.5 | 26.5 | 50.0 |
| 25-3 | 111.3 | 0.129 | 7.8 | 3.0 | 89.2 |
| 25-4 | 80.1 | 0.145 | 3.5 | 1.4 | 95.1 |
| 25-5 | 93.3 | 0.139 | 5.7 | 2.0 | 92.3 |

TABLE 12

Additional physicochemical characterization data for samples according to Example 25.

| Sample | Tap Density (g/cm3) | pH | Particle Size Distribution |
|---|---|---|---|
| 25-1 | 0.91 | 3.3 | Dv, 100 = 66.7 um<br>Dv, 90 = 35.8 um<br>Dv, 50 = 15.0 um<br>Dv, 10 = 2.32 um<br>Dv, 1 = 0.476 um<br>Span = 2.226<br>Uniformity = 0.700 |
| 25-2 | 1.00 | 2.3 | Dv, 100 = 14.4 um<br>Dv, 90 = 9.1 um<br>Dv, 50 = 5.1 um<br>Dv, 10 = 2.15 um<br>Dv, 1 = 0.684 um<br>Span = 1.369<br>Uniformity = 0.418 |
| 25-3 | 0.56 | 3.1 | Dv, 100 = 18.2 um<br>Dv, 90 = 10.2 um<br>Dv, 50: = 4.8 um<br>Dv, 10 = 1.0 um<br>Dv, 1 = 0.4 um<br>Span = 1.907<br>Uniformity = 0.587 |
| 25-4 | 0.55 | 3.8 | Dv, 100 = 18.7 um<br>Dv, 90 = 10.7 um<br>Dv, 50 = 4.82 um<br>Dv, 10 = 1.11 um<br>Dv, 1 = 0.418 um<br>Span = 1.996<br>Uniformity = 0.619 |
| 25-5 | 0.67 | 3.8 | Dv, 100 = 23.5 um<br>Dv, 90 = 12.5 um<br>Dv, 50 = 5.89 um<br>Dv, 10 = 1.42 um<br>Dv, 1 = 0.482 um<br>Span = 1.886<br>Uniformity = 0.582 |

Example 26

Composite of Silicon and Carbon Pyrolyzed from Precursors Comprising Sugars and Organic Acids, Co-Pyrolyzed with Carbamide Compounds Porous nano-featured silicon was prepared according to the methodologies described herein. The silicon was further coated with resin by co-mixing with various combinations of precursors comprising sugars and organic acids, and further co-pyrolysis with carbamide compounds. Examples of sugars in this context include, but are not limited to, dextrose, dextran, sucrose, fructose, glucose, starch, gum arabic, lignin, and combinations thereof. For the purpose of the present example, an exemplary sugar is sucrose. Examples of organic acids in this context include, but are not limited to, formic acid, acetic acid, gluconic acid, glucaric acid, citric acid, lactic acid, succinic acid, and combinations thereof. For the purpose of the present example, an exemplary sugar is citric acid. Examples of carbamide compounds in this context include, but are not limited to, urea, oligomers and polymers comprising urea such as polyurea, polyureacyanuric acid, quaternary ammonium carbamate, thiocarbamate, dithiocarbamate, and combinations thereof. For the purpose of the present example, the exemplary carbamide compounds is urea. The precursors and silicon was mechanically mixed and incubated for sufficient temperature and time to achieve resin-impregnated porous nano-featured silicon. The time and temperature was varied, for example from 90 C to 250 C, and for time ranging from 18 h to 96 h. For the purpose of the current example, the temperature was 140 C and the 130-140 C and the time was 18-48 h. These materials were then pyrolyzed according to methods generally described herein. A summary of the samples and their physicochemical properties are summarized in Table 13.

Porous nano-featured silicon was prepared according to the methodologies described herein. The silicon was further coated with resin by co-mixing with various combinations of precursors comprising sugars and organic acids. Examples of sugars in this context include, but are not limited to, dextrose, dextran, sucrose, fructose, glucose, starch, gum arabic, lignin, and combinations therefore. For the purpose of the present example, an exemplary sugar is sucrose. Examples of organic acids in this context include, but are not limited to, formic acid, acetic acid, gluconic acid, glucaric acid, citric acid, lactic acid, succinic acid, and combinations thereof. For the purpose of the present example, an exemplary sugar is citric acid. The precursors and silicon were mechanically mixed and incubated for sufficient temperature and time to achieve resin-impregnated porous nano-featured silicon. The time and temperature was varied, for example from 90 C to 250 C, and for time ranging from 18 h to 96 h. For the purpose of the current example, the temperature was 140 C and the 130-140 C and the time was 18-48 h. These materials were then mixed with a carbamide compound, and the further mixture was co-pyrolyzed according to methods generally described herein. Examples of carbamide compounds in this context include, but are not limited to, urea, cyanuric acid, quaternary ammonium carbamate, thiocarbamate, dithiocarbamate, and combinations thereof. For the purpose of the present example, the exemplary carbamide compounds is urea. A summary of the samples and their physicochemical properties are summarized in Table 13.

TABLE 13

Summary of samples according to Example 26.

| Sample | Description (sugar:acid:silicon:carbamide) (w:w:w) | Yield to pyrolyzed composite (%) | Si load (%) | Specific Surface Area (m2/g) | Pore Volume (cm3/g) |
|---|---|---|---|---|---|
| 26-1 | 3:1.12:0.265:3.1 | 19.6 | 18.1 | 53 | 0.045 |
| 26-2 | 3:1.12:0.35:3.1 | 19.1 | 24.2 | 41 | 0.033 |
| 26-3 | 3:1.12:0.55:3.5 | 17.7 | 31.8 | 49 | 0.036 |
| 26-4 | 3:1.12:0.65:4.2 | 12.8 | 37.6 | 89 | 0.062 |
| 26-5 | 3.1:1.12:0.85:4.2 | 15.1 | 61.4 | 91 | 0.058 |
| 26-6 | 12:4.48:2.5:16.48 | 14.8 | 49.1 | 42 | 0.026 |

As the relative amount of silicon to carbon was increased, there was a trend towards slightly lower yields, and slightly higher surface area and pore volume observed.

The composites were tested for electrochemical performance in a half cell, with the anode comprising 80% active material, 10% conductive carbon, and 10% binder, with the active materials further comprised of 70% graphite and 30% of silicon-carbon composite. The half-cell electrochemical data are summarized in Table 14.

TABLE 14

Electrochemical testing of samples according to Example 26.

| Sample | FCE (%) | Capacity (mAh/g) | Average CE | Capacity retention (%) (Cycle 25/Cycle 7) |
|---|---|---|---|---|
| 26-1 | 73 | 387-419 | 0.9970 | 99.3 |
| 26-2 | 71 | 392 | 0.9990 | 100 |
| 26-3 | 71 | 523 | 0.9957 | 100 |
| 26-6 | 73-76 | 448-473 | 0.9955 | 98.9-99.3 |

The composite exhibited excellent Coulombic efficiencies and capacity retention, and there was a trend towards slightly lower Coulombic efficiency as the silicon content in the composite was increased. For the case of sample 26-6, the expansion of the anode was measured after 26 cycles and at 100% lithiation, resulting in a measured expansion of 45%, additionally, the expansion of the anode in another half-cell comprising the same sample was measured after 102 cycles and at 100% lithiation, resulting in a measured expansion of 65%.

Example 27

Composite of Silicon and Carbon Pyrolyzed from Precursors Comprising Sugars, Organic Acids, and Carbamide Compounds Porous nano-featured silicon was prepared according to the methodologies described herein. The silicon was further coated with resin by co-mixing with various combinations of precursors comprising sugars, organic acids, and carbamide compounds as described in the previous example. The ratio of sugar:acid:silicon:carbamide was 21.6:8.064:5:29.664. The precursors and silicon were mechanically mixed and incubated for sufficient temperature and time to achieve resin-impregnated porous nano-featured silicon, and this mixture was pyrolyzed at various temperatures, otherwise processing was according to methods consistent with descriptions provided in the previous example. A summary of the samples and their physicochemical properties are summarized in Table 15. As can be seen, the lower pyrolysis temperatures resulted in comparatively lower yield, lower silicon content, higher surface area, and higher pore volume.

TABLE 15

Summary of samples according to Example 27.

| Sample | Pyrolysis Temperature | Yield to pyrolyzed composite (%) | Si load (%) | Specific Surface Area (m2/g) | Pore Volume (cm3/g) |
|---|---|---|---|---|---|
| 27-1 | 650 C. | 23.6% | 26.3% | 229.3 | 0.118 |
| 27-2 | 750 C. | 25.0% | 24.8% | 191.5 | 0.096 |
| 27-3 | 850 C. | 21.5% | 28.9% | 164.6 | 0.084 |
| 27-4 | 950 C. | 22.8% | 27.2% | 110.5 | 0.055 |
| 27-5 | 1050 C. | 14.0% | 44.3% | 77 | 0.044 |

The composites were tested for electrochemical performance in a half cell, with the anode comprising 80% active material, 10% conductive carbon, and 10% binder, with the active materials further comprised of 70% graphite and 30% of silicon-carbon composite. The half-cell electrochemical data are summarized in Table 16. As can be seen, as the pyrolysis temperature was increased there was a trend towards increased first cycle efficiency, increased capacity, and increased Coulombic efficiency.

TABLE 16

Electrochemical testing of samples according to Example 27.

| Sample | FCE (%) | Capacity (mAh/g) | Average CE |
|---|---|---|---|
| 27-1 | 60 | 441 | 0.9935 |
| 27-2 | 64 | 475 | 0.9927 |
| 27-3 | 67 | 526 | 0.9939 |
| 27-4 | 71 | 504 | 0.9964 |
| 27-5 | 76 | 515 | 0.9968 |

Figure 43:
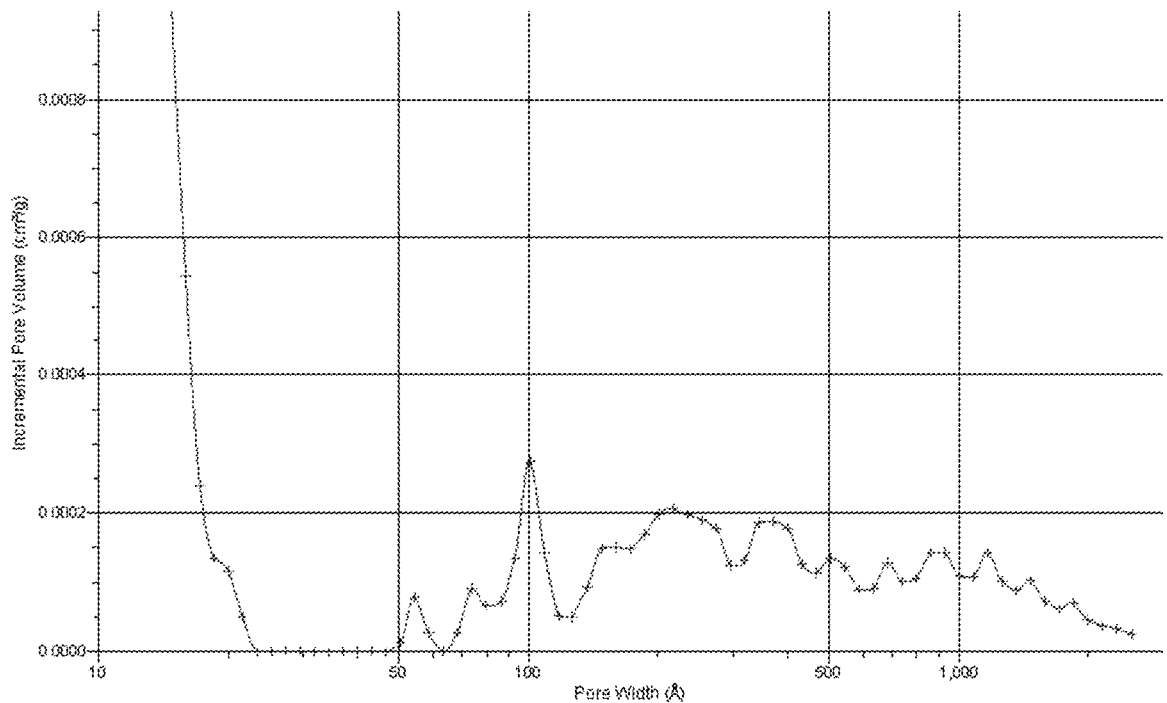
FIG. 43. Pore volume distributions for composite of porous nano-featured silicon composited with carbon according to sample 27-6.

The data support a preferred pyrolysis temperature of 1050 C. Employing this pyrolysis condition, another silicon carbon composite sample was produced, in this case the ratio of sugar:acid:silicon:carbamide was 6:2.24:1.25:8.24. A summary of the sample and physicochemical properties are summarized in Table 17. The pore volume distribution for the composite is depicted in FIG. 43. Sample 27-6 was comprised of 25.2% micropores, 0.8% mesopores, and 74.0% macropores.

The composite was tested for electrochemical performance in a half cell, with the anode of various compositions. In one case, the electrode composition was comprised of 60:20:20 active material:conductive carbon:binder. In another case, the electrode comprised 80% active material, 10% conductive carbon, and 10% binder, with the active materials further comprised of 70% graphite and 30% of silicon-carbon composite. The half-cell electrochemical data are summarized in Table 18. For the case of the 60:20:20 electrode formulation, the expansion of the anode was measured after two cycles and at 100% lithiation, resulting in a measured expansion of 28%. In the case of the 80:10:10 electrode formulation, the expansion of the anode was measured after 27 cycles and at 100% lithiation, resulting in a measured expansion of 53%.

TABLE 17

Summary of physicochemical characterization of sample 27-6.

| Sample | Yield to pyrolyzed composite (%) | Si load (%) | Specific Surface Area (m2/g) | Pore Volume (cm3/g) |
|---|---|---|---|---|
| 27-6 | 21.6 | 32.7 | 55 | 0.030 |

TABLE 18

Summary of electrochemical characterization of sample 27-6 in a half-cell.

| Sample | Electrode Composition | FCE (%) | Capacity (mAh/g) | Average CE |
|---|---|---|---|---|
| 27-6 | 60:20:20 active material:conductive carbon:binder | 49 | 687 | 0.9916 |
| 27-6 | 80:10:10 active material:conductive carbon:binder, active material further comprising 70% graphite and 30% composite | 68 | 404 | 0.9967 |

Example 28

Composite of Silicon and Carbon Pyrolyzed from Precursors Comprising Organic Acids and Carbamide Compounds Porous nano-featured silicon was prepared according to the methodologies described herein. The silicon was further coated with resin by co-mixing with various combinations of precursors comprising organic acids and carbamide compounds as described in the previous examples. The ratio of acid:silicon:carbamide was varied. The precursors and silicon were mechanically mixed and incubated for sufficient temperature and time to achieve resin-impregnated porous nano-featured silicon, and this mixture was pyrolyzed at various temperatures, otherwise processing was according to methods consistent with descriptions provided in the previous example. Samples were generally pyrolzyed at 1050 C in a tube furnace; in this series, samples 28-9 was processed slightly differently, specifically, this sample was produced in a kiln at 950 C. A summary of the samples and their physicochemical properties are summarized in Table 19. For the samples according to this example, all samples exhibited a pore volume distribution comprising between 0.3 and 0.4% micropores, between 1.5 and 1.8% mesopores, and between 97.8% and 98.2% macropores.

TABLE 19

Summary of samples according to Example 28.

| Sample | Description (acid:silicon:carbamide) (w:w:w) | Yield to pyrolyzed composite (%) | Si load (%) | Specific Surface Area (m2/g) | Pore Volume (cm3/g) |
|---|---|---|---|---|---|
| 28-1 | 3:0.25:3 | 18.6% | 25.1% | 22 | 0.037 |
| 28-2 | 3:0.5:3 | 19.8% | 44.0% | 35.9 | 0.048 |
| 28-3 | 3:0.75:3 | 19.1% | 64.5% | 141.4 | 0.142 |
| 28-4 | 3:0.75:6 | 16.4% | 52.5% | 53.2 | 0.097 |
| 28-5 | 3:0.5:6 | 14.0% | 46.1% | 44.4 | 0.061 |
| 28-6 | 3:0.5:9 | 12.6% | 73.4% | 73.9 | 0.08 |
| 28-7 | 2:0.75:12 | 10.1% | 54.5% | 16.6 | 0.017 |
| 28-8 | 15:3.75:30 | 10.2% | 73.5% | 95.9 | 0.065 |
| 28-9 | 60:15:120 | 15.2% | 35.8% | 84.1 | 0.069 |

The composite was tested for electrochemical performance in a half cell, with the anode of various compositions. In one case, the electrode composition was comprised of 60:20:20 active material:conductive carbon:binder. In another case, the electrode comprised 80% active material, 10% conductive carbon, and 10% binder, with the active materials further comprised of 70% graphite and 30% of silicon-carbon composite. The half-cell electrochemical data are summarized in Table 20. In the case of sample 28-9, the expansion of the anode was measured after 28 cycles and at 100% lithiation, resulting in a measured expansion of 58%. The sample with the highest loading tested (sample 28-3) demonstrated the highest capacity and lower Coulombic efficiency, indicative of a general trend of higher silicon loading leading to lower Coulombic efficiency. Even so, sample 28-9 showed the second lowest Coulombic efficiency in the series tested, even though it had the second lowest silicon loadings; without being bound by theory, the lower than expected performance indicates that the 950 C pyrolysis temperature is not as preferred at 1050 C.

TABLE 20

Electrochemical testing of samples according to Example 28.

| Sample | FCE (%) | Capacity (mAh/g) | Average CE |
|---|---|---|---|
| 28-1 | 72 | 426 | 0.9960 |
| 28-2 | 74 | 467 | 0.9962 |
| 28-3 | 70 | 711 | 0.9928 |
| 28-4 | 73 | 564 | 0.9951 |
| 28-5 | 72 | 527 | 0.9952 |
| 28-9 | 75 | 511 | 0.9939 |

Example 29

Electrochemical Testing of Composites of Porous Nano-Featured Carbon and Carbon in Full Cell Pouch Cells The pouch cells presented herein were constructed as follows. The anode electrodes were fabricated by combining the composite, conductive carbon (Super-P), and binder (SBR-CMC, 50:50 wt %) in a 80:10:10 wt % ratio and blending in an aqueous slurry. The slurry was then cast onto copper foil yielding a 40 cm$^2$ electrode. The cathodes were Toda LiNiCoAl, with Super-P and PAN binder in a 90:5:5 wt % blend which was then mixed in an organic slurry with NMP. The cathode slurry was cast onto aluminum foil, again yielding a 40 cm$^2$ electrode.

The anode and cathode were paired by collecting the half-cell absolute 5$^{th}$ cycle insertion (anode) and first cycle extraction (cathode) capacities, and matching electrodes such that a 5-15% excess anode ratio was satisfied. Pouch cells were fabricated by first interweaving the electrodes with Celgard C210 separator to create the inner pack. Nickel (anode) and aluminum (cathode) electrode tab extensions were then ultrasonically welded to the cast electrodes. The inner pack was then heat sealed inside a 115 μm thick polyamide/aluminum/polypropylene laminate case. The pouches were then dried at 80° C. and passed into an argon purged glove box. 1 ml of electrolyte (LiPF$_6$ EC/DEC/FEC) was added to each pouch, and then the devices were vacuum sealed. After fabrication, the cells were electrochemically formed with 5 charge/discharge sequences from 2.0-4.2 V. The first two sequences were performed at C/10 current with a C/20 hold at 4.2 V, and the following three sequences were performed at C/5, again with a C/20 hold. After formation the cells were brought back into the glove box and vacuum sealed to remove any accumulated gasses. For evaluation of cycle stability, the cells were cycled from 2.0-4.2 V at C/2 with a C/20 hold until failure.

Figure 44:
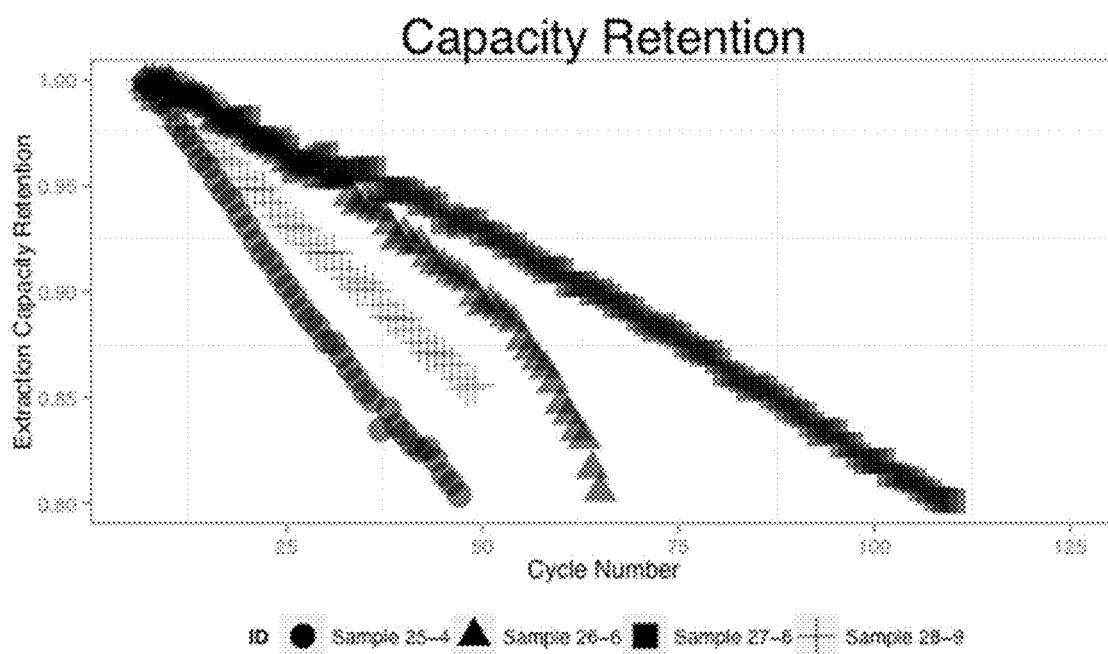
FIG. 44. Capacity retention vs. cycle for full cell pouch cells for various exemplary composites comprising porous nano-featured silicon and carbon.

FIG. 44 depicts the comparative cycle life plot of various exemplary composite of porous nano-featured silicon and carbon when tested electrochemically in a full cell pouch cell. A summary of the performance is shown in Table 21. The data show the ability to modulate the stability of the composite (for example, stability can be defined as the number of cycles to 80% of initial (or maximum) achieved capacity) as a function of the composition of the composite comprising porous nano-featured silicon and carbon. In this example, the greatest stability was achieved by sample 27-6, corresponding to porous silicon at 32.7% loading in carbon achieved by pyrolysis of a ternary combination of a sugar, an acid, and a carbamide compound. The next most stability composite was represented by sample 27-6, corresponding to porous silicon at 32.7% loading in carbon achieved by co-pyrolysis of a carbamide compound with a resin achieved by a binary combination of a sugar and an acid. The next most stability sample in this series was 28-9, corresponding to 35.8% silicon loading at a pyrolysis temperature of 950 C. This sample was also tested at blend with graphite in the anode corresponding to 548.6 mAh/g anode, slightly higher than the other samples in this series (ranging between 411.8 mAh/g and 489.3 mAh/g).

TABLE 21

Summary of performance of various samples in full cell pouch cells according to Example 29.

| Sample | Cycles to 80% Capacity Retention | Initial capacity (mAh/g anode) | Initial capacity (mAh/g cathode) |
|---|---|---|---|
| 25-4 | 47 | 489.3 | 118.3 |
| 26-6 | 65 | 411.8 | 106.3 |
| 27-6 | 111 | 456.3 | 112.9 |
| 28-9 | N/A | 548.6 | 121.0 |

Example 30

Figure 45:
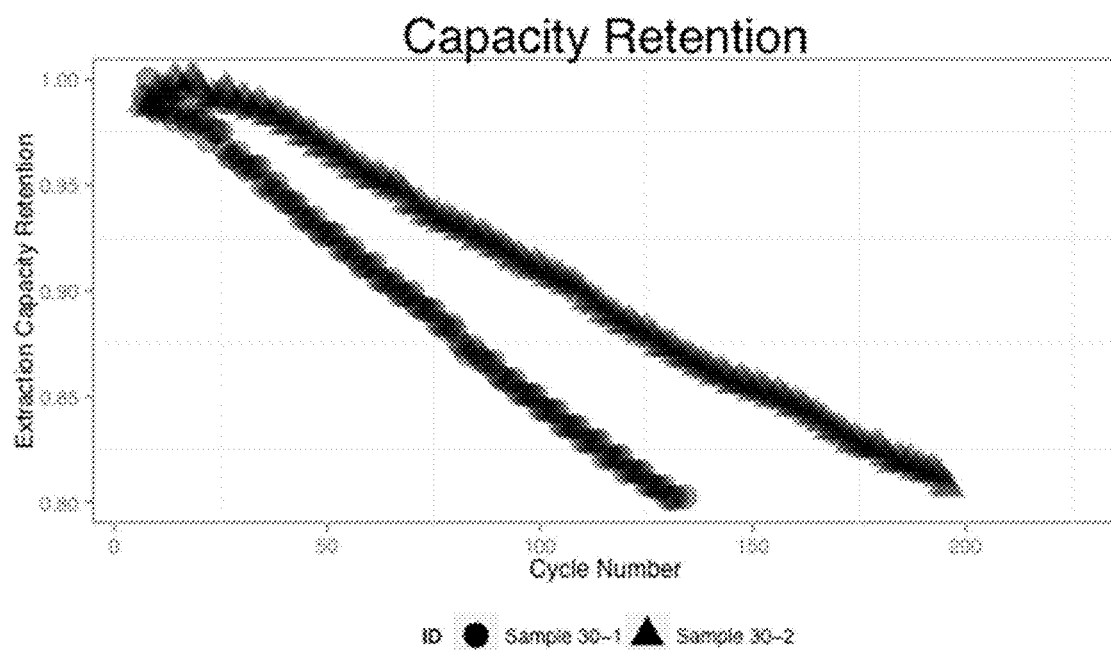
FIG. 45. Capacity retention vs. cycle for full cell pouch cells for composites comprising carbon and non jet-milled vs. jet milled porous nano featured silicon.

Comparison of Composites Comprising Carbon and Jet Milled Vs. Non-Jet Milled Porous Nano-Featured Silicon, as Electrochemically Tested in Full Cell Pouch Cells Two composite samples were produced and tested is full cell pouch cell format. Both of these samples comprised porous nano-featured silicon produced via methods generally described herein. In one case (sample 30-2) the porous nano-featured silicon was jet milled to yield porous nano-featured and nano-sized silicon, and in the other case (sample 30-1) the silicon was not jet milled. Both samples were compounded with binary precursor system comprising an acid and a carbamate compound consistent with Example 28. Sample 30-1 was produced employing the same formulation and procedures as 28-9 wherein a silicon loading of 35.8% was achieved. For sample 30-1, the measured pH was 7.331 and the tap density was 0.372 g/cm3. For sample 30-2, the silicon loading was 35.7%. A summary of the two samples with respect to their physicochemical characteristics is shown in Table 22. A summary of the two samples with respect to their electrochemical characteristics is shown in Table 23. FIG. 45 depicts the comparative cycle life plot of the two samples.

TABLE 22

Summary of samples according to Example 30.

| Sample | Silicon type | Specific Surface Area (m2/g) | Pore Volume (cm3/g) |
|---|---|---|---|
| 30-1 | Non-jet milled | 88 | 0.090 |
| 30-2 | Jet milled | 64 | 0.057 |

TABLE 23

Summary of performance of various samples in full cell pouch cells according to Example 30.

| Sample | Cycles to 80% Capacity Retention | Initial capacity (mAh/g anode) | Initial capacity (mAh/g cathode) |
|---|---|---|---|
| 30-1 | 139 | 468.4 | 117.0 |
| 30-2 | 197 | 446.0 | 117.8 |

Figure 46:
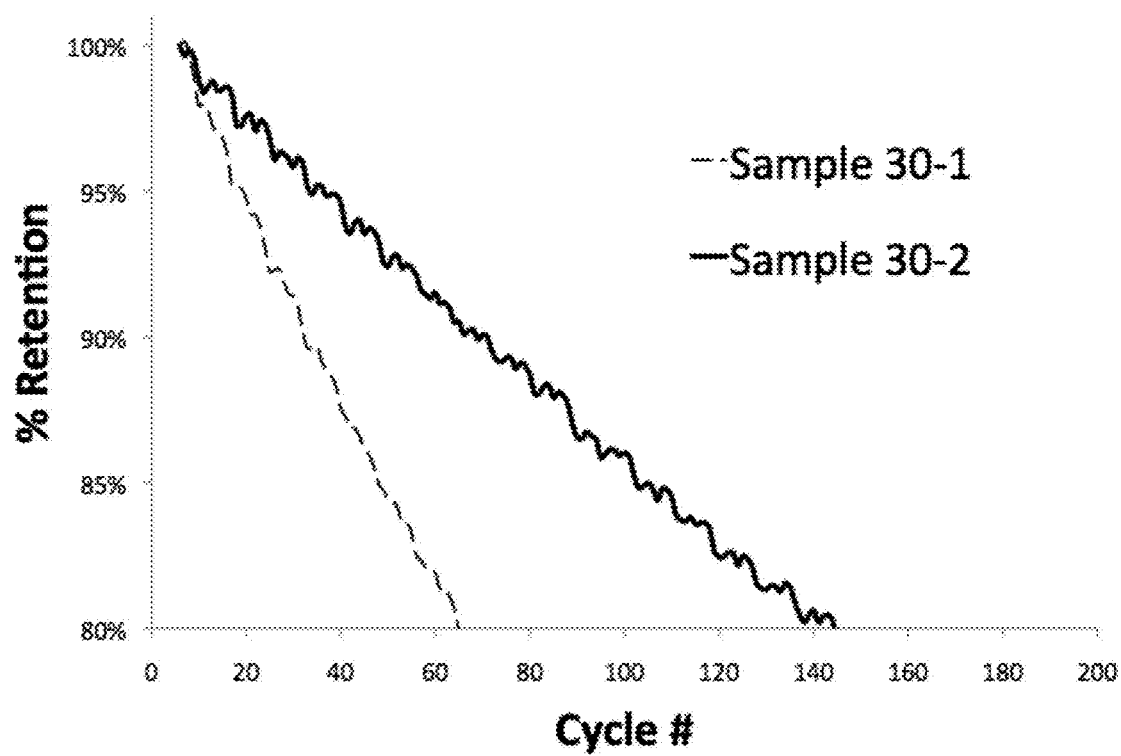
FIG. 46. Capacity retention vs. cycle for full cell coin cells for composites comprising carbon and non jet-milled vs. jet milled porous nano featured silicon.

The sample comparison was also ascertained by electrochemical characterization in full cell coin cells. The data ate plotted in FIG. 46. As can be seen, the results are similar to that observed for electrochemical testing in full cell pouch cells: the composite produced from the jet milled (hence, nano-sized) porous silicon exhibited superior cycle life. In this case, the number of cycles until 20% of capacity fade (80% capacity retention) was 64 cycles for the composite comprising the non jet milled porous silicon vs. 144 cycles for the composite comprising the jet milled porous silicon.

Example 31 tXRF Purity Analysis of Nano-Featured Silicon

Nano-features silicon was produced according to the procedures generally described herein. The resulting silicon was tested for purity using total X-ray fluorescence (tXRF) analysis. Elements wherein the levels were at or below the recording limit or detection limit and not reported. The elements detected and their levels (in ppm) were as follows: Al=36073 ppm, Cl=283 ppm, K=30 ppm, Ti=24 ppm, V=16 ppm, Cr=13 ppm, Mn=29 ppm, Fe=3155 ppm, Ni=140 ppm, Cu=731 ppm, Br=8.2 ppm, W=1.9 ppm, Pb=9.5 ppm.

Example 32

Measurements of Skeletal Density by Pycnometry for Various Comparator Materials

A variety of different samples were analyzed for their skeletal density using an AccuPyc II 1340 Pycnometer, a known method for determining skeletal density in the art. These data are summarized in Table 24. The samples tested include silicon controls and silicon oxide controls. The data for the two silicon controls demonstrate a skeletal density (also referred in textbooks at "true density") very similar to that reported in textbooks of about 2.3 g/cm$^3$. As can be seen, the measured data for both silicon and SiOx comparator materials exhibit a skeletal density of at least 2.26 g/cm$^3$. These data are similar to the values expected according to the literature as known in the art. Data are also presented for the skeletal density of the SiAl alloys employed, and the data demonstrate about 2.7 g/cm$^3$.

TABLE 24

Skeletal Density of Comparator Silicon Materials.

| Sample | Density (g/cm3) |
|---|---|
| Silicon Comparator 1 | 2.3073 |
| Silicon Comparator 1, second measurement | 2.2979 |
| Silicon Comparator 2 | 2.2634 |
| Silicon Oxide (SiOx) Comparator 1 | 2.2710 |
| Silicon Oxide (SiOx) Comparator 2 | 2.2542 |
| Silicon Oxide (SiOx) Comparator 3 | 2.2533 |
| SiAl Alloy Type 12 - S2 | 2.6606 |
| SiAl Alloy Type 12 - S8 | 2.6505 |

Example 33

Measurements of Skeletal Density by Pycnometry for Various Porous, Nano-Featured Silicon Materials A variety of different samples were analyzed for their skeletal density using an AccuPyc II 1340 Pycnometer, a known method for determining skeletal density in the art. These data are summarized in Table 25. The samples tested include various nano-featured silicons produced according to the processes described in Example 4. As can be seen, the skeletal densities that were measured for these samples are all below 2.2 g/cm3, except for samples 4-10 and 4-11. Without being bound by theory, these latter two samples have higher densities since they have a higher starting excess of aluminum (30%) compared to the other samples. All samples where less than 30% excess Al was employ yielded nano-featured silicon with skeletal density less than 2.2 g/cm,$^3$ and less than the skeletal density measured for other silicon materials. Other ranges of skeletal density for the nano-featured silicon described herein are measured or envisioned, for example less than 2.1 g/cm$^3$, for example less than 2.0 g/cm$^3$, for example less than 2.0 g/cm$^3$, for example less than 2.0 g/cm$^3$, for example less than 1.9 g/cm$^3$, for example less than 1.8 g/cm$^3$, for example less than 1.5 g/cm$^3$, Without being bound by theory, the data demonstrate that there is trapped porosity within the nano-featured porous silicon material, i.e., porosity inaccessible to the pcynometry technique (helium gas as probe). Importantly, trapped porosity within the nano-featured porous silicon is a feature that promotes friability. Furthermore, this trapped porosity should be advantageous for electrochemical performance of the nano-featured porous silicon; without being bound by theory, it represents volume available to be filled upon lithiation of the nano-featured porous silicon without expansion of the volume enveloped by the nano-featured porous silicon particle.

TABLE 25

Skeletal Density of Various Nano-Featured Silicon Materials by Pycnometry.

| Sample | Density (g/cm3) |
|---|---|
| 4-1 | 2.1759 |
| 4-2 | 2.1237 |
| 4-3 | 2.1791 |
| 4-5 | 2.1711 |
| 4-6 | 2.1614 |
| 4-8 | 2.1641 |
| 4-10 | 2.2890 |
| 4-11 | 2.2883 |

Example 34

Measurements of Skeletal Density by Pycnometry for Pilot-Scale Produced Porous, Nano-Featured Silicon Materials Table 26 summarizes the skeletal density data for a variety of nano-featured porous silicon materials that were generally produced according to the procedures described for sample 4-2 at pilot scale (i.e., using a pilot manufacturing scale reactor vessel to produce the silicon from the SiAl alloy and a pilot manufacturing scale centrifuge for removing water). The different samples represent variations in various pilot scale manufacturing process variables, such as sieving with 38 um sieve to remove any particles presented that were larger than 38 um in size, drying at elevated temperature (e.g., >100 C) to remove residual water from the nano-featured porous silicon particles after they were collected via centrifugation, and other process steps and variables known in the art. As can be seen, the skeletal densities for all the pilot scale batches produced for nano-featured silicons exhibited skeletal densities less than 2.2 g/cm$^3$. Similar to the data presented in Example 33, the data for the samples for the current Example indicate the presence of volume within the nano-featured porous silicon that is not available as measured by pcynometry (helium probe). This feature of skeletal density lower than other comparators silicons provides the benefits as described in the previous Example.

TABLE 26

Skeletal Density of Various Nano-Featured Silicon Materials by Pycnometry.

| Sample | Total |
|---|---|
| Pilot Sample 1 | 2.0320 |
| Pilot Sample 2 | 2.1336 |
| Pilot Sample 3 | 2.1330 |
| Pilot Sample 4 | 2.1597 |
| Pilot Sample 5 | 1.9975 |

Example 35

Pore Volume and Surface Area Analysis for Pilot-Scale Produced Porous, Nano-Featured Silicon Materials Table 27 summarizes the pore volume and surface area analyses via nitrogen sorption for various porous, nano-featured silicon materials that were generally produced according to the procedures described for sample 4-2 at pilot scale (i.e., using a pilot manufacturing scale reactor vessel to produce the silicon from the SiAl alloy and a pilot manufacturing scale centrifuge for removing water). The different samples represent variations in various pilot scale manufacturing process variables, such as sieving with 38 um sieve to remove any particles presented that were larger than 38 um in size, drying at elevated temperature to remove residual water from the nano-featured porous silicon particles after they were collected via centrifugation, the addition of jet milling to produce nano-sized, nano-featured porous silicon, and other process steps and variables known in the art.

TABLE 27

Skeletal Density of Various Nano-Featured Silicon Materials by Pycnometry.

| Sample | Surface Area (m2/g) | Pore Volume (cm3/g) | Pore Volume Distribution (% micro-, % meso-, % macroporous) |
|---|---|---|---|
| Pilot Sample 2 | 78 | 0.183 | 12.0, 46.2, 41.8 |
| Pilot Sample 2, Jet milled | 67 | 0.087 | 13.3, 47.9, 38.8 |
| Pilot Sample 6 | 108 | 0.262 | 11.6, 47.8, 40.6 |
| Pilot Sample 7 | 118 | 0.246 | 18.4, 44.7, 36.9 |
| Pilot Sample 8 | 66 | 0.223 | 4.2, 57.3, 38.6 |
| Pilot Sample 9 | 32 | 0.089 | 8.4, 45.9, 45.6 |
| Pilot Sample 10 | 68 | 0.155 | 13.3, 58.2, 28.5 |

Example 36

Pore Volume and Surface Area Analysis for Aluminum-Silicon Alloys

Various Al—Si Silicon alloys were analyzed for their pore volume and surface area analyses via nitrogen sorption analysis. For Al—Si alloy denoted "20-10 um" type, the measured surface area was 0.2968 m2/g, with negligible pore volume recorded the measured pore volume was negligible. For Al—Si alloy denoted "25-10 um" type, the measured surface area was 0.2433 m2/g, with negligible pore volume recorded the measured pore volume was negligible.

Example 37

Composites Comprising Nano-Featured and Nano-Sized Silicon with Conductive Polymer Several composites were made employing nano-featured and nano-sized silicon in combination with conductive polymers. The nano-featured and nano-sized silicon was produced according to Example 2 (jet milled for particle size reduction) The conductive polymer for the current example was PAN, other conductive polymers are also applicable, as described elsewhere in the disclosure. For the current example, two methods for compositing were tested, (i) suspension of silicon in a solution of PAN dissolved in N-methyl-2-pyrrolidone (NMP), followed by drying and mortar and pestle grinding, or (ii) blending of solid PAN and silicon. In both instances, the samples was held at 140 C for 4 hr. The samples were then pyrolyzed at a variety of temperatures. The ratio of silicon to polymer was 70:30. The various samples were analyzed for the pore volume and surface area, and also electrochemical testing in 60:20:20 electrode recipe, half-cell format (further details provided elsewhere in this disclosure). The data are summarized in Table 28 and Table 29. As can be seen, the solid, or dry mixing process provided lower surface area in the composite, as well as generally higher capacity and first cycle efficiency.

Silicon carbon composites comprising conductive polymers are made in an analogous manner, wherein the silicon carbon composite is substituted for the nano-featured and nano-sized silicon

TABLE 28

Summary of Preparation of Composites Comprising Nano-Featured and Nano-Sized Silicon in Pyrolzyed PAN

| Sample | Solution/Solid Process | Silicon:PAN | Pyrolysis Temperature (C.) | Yield (%) - excluding solvent |
|---|---|---|---|---|
| 37-1 | Solid | 70:30 | 550 | 62 |
| 37-2 | Solution | 70:30 | 550 | 61 |
| 37-3 | Solid | 70:30 | 700 | 57 |
| 37-4 | Solution | 70:30 | 700 | 58 |
| 37-5 | Solid | 70:30 | 1050 | 51 |
| 37-6 | Solution | 70:30 | 1050 | 57 |

TABLE 29

Summary of Characterization of Composites Comprising Nano-Featured and Nano-Sized Silicon in Pyrolzyed PAN

| Sample | SSA (m2/g) | PV (cm3/g) | Half Cell FCE (%) | Half Cell 1$^{st}$ Cycle Extraction (mAh/g) | Half Cell Avg CE |
|---|---|---|---|---|---|
| 37-1 | 35 | 0.03 | 60 | 1253 | 0.9856 |
| 37-2 | 80 | 0.06 | 53 | 1080 | 0.9853 |
| 37-3 | 26 | 0.03 | 66 | 1173 | 0.9850 |
| 37-4 | 140 | 0.09 | 55 | 1052 | 0.9882 |
| 37-5 | 26 | 0.04 | 70 | 1515 | 0.9857 |
| 37-6 | 115 | 0.06 | 64 | 1295 | 0.9866 |

Example 38

Skeletal Density of Various Silicon-Carbon Composites

A variety of different Si—C composite samples were analyzed for their skeletal density using an AccuPyc II 1340 Pycnometer, a known method for determining skeletal density in the art. These data are summarized in Table 30. The samples tested include various nano-featured silicons produced according to the processes described in various Examples, and wherein the porous, nano-featured silicon has been incorporated into a Si—C composite employing the methodologies described in various Examples. As can be seen, the current disclosures allows for Si—C composites with the skeletal densities below 2.2 g/cm3, and as low as 1.8 g/cm3. It is envisioned that these and further reductions in skeletal density can be achieved, for example less than 2.1 g/cm$^3$, for example less than 2.0 g/cm$^3$, for example less than 1.9 g/cm$^3$, for example less than 1.8 g/cm$^3$, for example less than 1.5 g/cm$^3$, Without being bound by theory, the data demonstrate that there is trapped porosity within the composite material comprising carbon and nano-featured porous silicon material, i.e., porosity inaccessible to the pcynometry technique (helium gas as probe). Importantly, trapped porosity within the composite comprising nano-featured porous silicon is a feature that promotes friability. Furthermore, this trapped porosity should be advantageous for electrochemical performance of the composite comprising nano-featured porous silicon; without being bound by theory, it represents volume available to be filled upon lithiation of the nano-featured porous silicon without expansion of the volume enveloped by the composite comprising nano-featured porous silicon particle.

TABLE 30

Skeletal Density of Various Composites Comprising Nano-Featured Silicon Materials by Pycnometry.

| Sample | Density (g/cm3) |
| --- | --- |
| Sample 25-3 | 2.1581 |
| Sample 25-4 | 2.3598 |
| Sample 25-5 | 2.3107 |
| Sample 27-6 | 1.8163 |

Example 39

Figure 47:
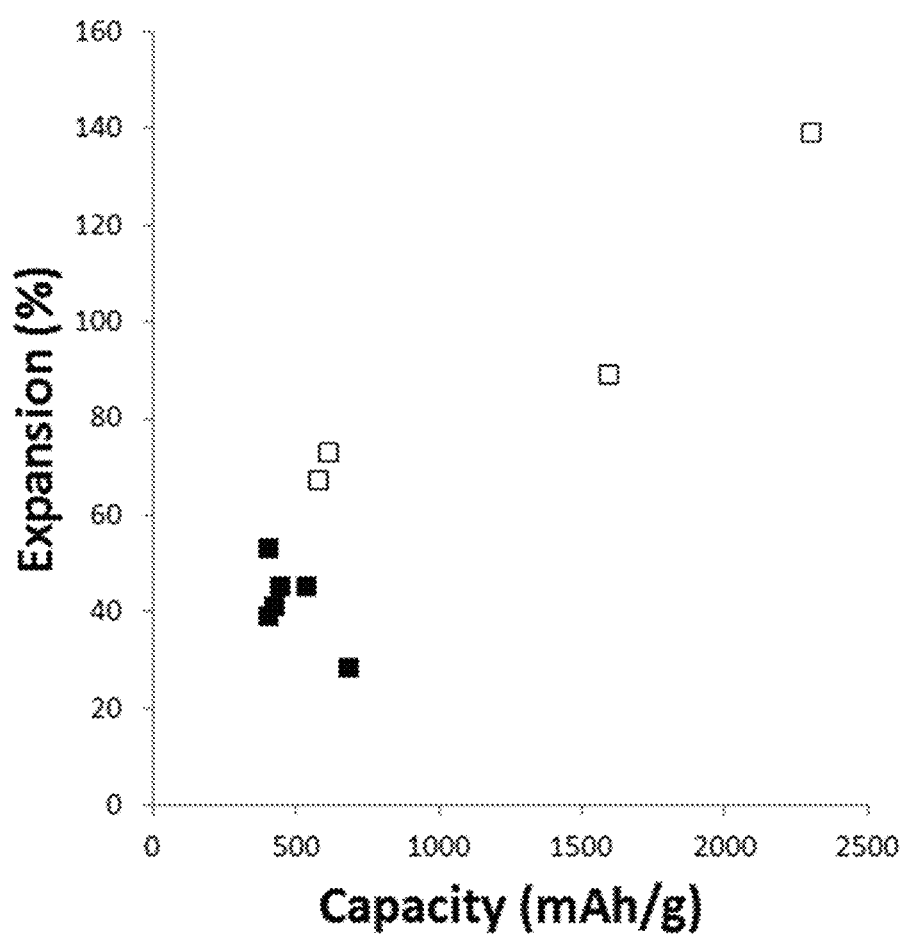
FIG. 47. Expansion of various materials: porous, nano-featured and porous, nano-sized, nano-featured silicon (open symbols); composites comprising carbon and porous, nano-featured silicon and composites comprising carbon and nano-sized, nano-featured silicon (filled symbols).

Expansion Upon Lithiation for Various Samples Comprising Blends of Graphite and Porous, Nano-Featured Porous Silicon Various samples of porous, nano-featured and nano-sized and nano-featured silicons were tested in Li ion half cells according to the procedures generally described herein. In addition, various samples of composites comprising carbon and porous, nano-featured and nano-sized and nano-featured silicons were also testing. For the example, the data measured were expansion of the electrode, namely the expansion of the anode comprising blends of graphite and the various samples. The electrode composition also comprised conductivity enhancer and binder, typically at 10% each, all as generally described elsewhere within this disclosure. The expansion was measured at full lithiation. These data are summarized in FIG. 47. As can be seen, the composite materials exhibited lower expansion compared to their non-carbon composited counterparts, at a given capacity in terms of mAh/cm3. Without being bound by theory, the lower expansion for the composite materials affords improved cycle stability upon testing in full cells, owing to more stable and less fracturing of SEI and other benefits, as described in the art. This example provides for novel, advantageous combinations of high gravimetric capacity and low expansion for the composites comprising carbon and porous, nano-featured silicon as described herein. A surprising, unexpected finding for the composite samples is that the expansion decreases with increasing gravimetric capacity, whereas the expansion increases with increasing gravimetric capacity for the non-composited samples. According, the composite comprising carbon and porous, nano-featured silicon, when tested as a blend with graphite, can exhibit a gravimetric capacity of 400-700 mAh/g and expansion of 28-53%. Alternatively, the composite comprising carbon and porous, nano-featured silicon, when tested as a blend with graphite, can exhibit a gravimetric capacity of greater than 400 mAh/g and less than of 55%. Alternatively, the composite comprising carbon and porous, nano-featured silicon, when tested as a blend with graphite, can exhibit a gravimetric capacity of greater than 500 mAh/g and less than 50% expansion. Alternatively, the composite comprising carbon and porous, nano-featured silicon, when tested as a blend with graphite, can exhibit a gravimetric capacity of greater than 600 mAh/g and less than 30% expansion. Alternatively, the composite comprising carbon and porous, nano-featured silicon, when tested as a blend with graphite, can exhibit a gravimetric capacity of greater than 600 mAh/g and less than 30% expansion. Alternatively, the composite comprising carbon and porous, nano-featured silicon, when tested as a blend with graphite, can exhibit a gravimetric capacity of 686 mAh/g and 28% expansion. Alternatively, the composite comprising carbon and porous, nano-featured silicon, when tested as a blend with graphite, can exhibit a gravimetric capacity of about 700 mAh/g and about 30% expansion.

Certain exemplary embodiments of the invention are as follows:

Embodiment 1. A composite material comprising carbon and porous nano-featured silicon, wherein a composition of the composite material and graphite has a gravimetric capacity of greater than 500 mAh/g and less than 50% expansion when tested in a Li ion half cell.

Embodiment 2. The composite material of embodiment 1, wherein the composition has a gravimetric capacity of greater than 600 mAh/g and less than 50% expansion when tested in a Li ion half cell.

Embodiment 3. The composite material of embodiment 1, wherein the composition has a gravimetric capacity of greater than 600 mAh/g and less than 30% expansion when tested in a Li ion half cell.

Embodiment 4. A composite material comprising carbon and porous nano-featured silicon, wherein the porous nano-featured silicon comprises a skeletal density less than 2.2 g/cm$^3$ as measured by helium pcynometry.

Embodiment 5. The composite material of any one of embodiments 1-4, wherein the skeletal density of the porous nano-featured silicon is less than 2.0 g/cm$^3$.

Embodiment 6. The composite material of any one of embodiments 1-4, wherein the skeletal density of the porous nano-featured silicon is less than 1.8 g/cm$^3$.

Embodiment 7. The composite material of any one of embodiments 1-6, wherein the porous nano-featured silicon has a friability greater than 10% Embodiment 8. The composite material of any one of embodiments 1-6, wherein the porous nano-featured silicon has a friability greater than 50%

Embodiment 9. The composite material of any one of embodiments 1-8, wherein the porous nano-featured silicon has a characteristic thickness of nano features of less than 300 nm.

Embodiment 10. The composite material of any one of embodiments 1-8, wherein the porous nano-featured silicon has a characteristic thickness of nano features of less than 100 nm.

Embodiment 11. The composite material of any one of embodiments 1-8, wherein the porous nano-featured silicon has a characteristic thickness of nano features of less than 50 nm.

Embodiment 12. The composite material of any one of embodiments 1-8, wherein the porous nano-featured silicon has a characteristic thickness of nano features of less than 30 nm.

Embodiment 13. The composite material of any one of embodiments 1-8, wherein the porous nano-featured silicon has a characteristic thickness of nano features of less than 15 nm.

Embodiment 14. The composite material of any one of embodiments 1-8, wherein the porous nano-featured silicon has a characteristic distance between silicon nano features of the nano features of less than 300 nm.

Embodiment 15. The composite material of any one of embodiments 1-8, wherein the porous nano-featured silicon has a characteristic distance between silicon nano features of the nano features of less than 100 nm.

Embodiment 16. The composite material of any one of embodiments 1-8, wherein the porous nano-featured silicon has a characteristic distance between silicon nano features of the nano features of less than 50 nm.

Embodiment 17. The composite material of any one of embodiments 1-8, wherein the porous nano-featured silicon has a characteristic distance between silicon nano features of the nano features of less than 30 nm.

Embodiment 18. The composite material of any one of embodiments 1-8, wherein the porous nano-featured silicon has a characteristic distance between silicon nano features of the nano features of less than 15 nm.

Embodiment 19. The composite material of any one of embodiments 1-18, wherein the porous nano-featured silicon comprises a specific surface area between 30 and 230 $m^2/g$ and a pore volume between 0.1 and 0.5 $cm^3/g$.

Embodiment 20. The composite material of embodiment 19, wherein the nano-featured porous silicon comprises a specific surface area between 30 and 100 $m^2/g$ and a pore volume between 0.1 and 0.5 cm3/g.

Embodiment 21. The composite material of any one of embodiments 1-20, wherein the porous nano-featured silicon comprises less than 40% micropores, between 30 and 40% mesopores, and between 20 and 30% macropores.

Embodiment 22. The composite material of any one of embodiments 1-20, wherein the porous nano-featured silicon comprises less than 20% micropores, between 30 and 60% mesopores, and between 20 and 50% macropores.

Embodiment 23. The composite material of any one of embodiments 1-20, wherein the porous nano-featured silicon comprises less than 10% micropores, between 40 and 70% mesopores, and between 20 and 50% macropores.

Embodiment 24. The composite material of any one of embodiments 1-20, wherein the porous nano-featured silicon comprises less than 5% micropores, between 40 and 50% mesopores, and between 40 and 50% macropores.

Embodiment 25. The composite material of any one of embodiments 1-20, wherein the porous nano-featured silicon comprises less than 2% micropores, between 40 and 50% mesopores, and between 50 and 60% macropores.

Embodiment 26. The composite material any one of embodiments 1-25, wherein the nano-featured porous silicon exhibits a capacity of at least 1600 mAh/g and an average Coulombic efficiency of at least 0.98 when tested in a lithium ion half-cell cycled between 0.8 V and 0.005 V, where the counter electrode is lithium metal, the electrolyte comprises 1M $LiPF_6$ in a solvent comprised of 2:1 ethylene carbonate:diethylcarbonate (EC:DEC) and 10% (w/w) fluoroethylenecarbonate (FEC) and employing a polypropylene separator.

Embodiment 27. The composite material of embodiment 26, wherein the nano-featured porous silicon exhibits a capacity of at least 2300 mAh/g and an average Coulombic efficiency of at least 0.97.

Embodiment 28. The composite material of any one of embodiments 1-27, having an oxygen content from 1 to 20% by weight, and an aluminum content from 1 to 30% by weight.

Embodiment 29. The composite material of embodiment 28, comprising from 1 to 10% by weight aluminum.

Embodiment 30. The composite material of any one of embodiments 1-29, wherein the nano-featured porous silicon comprises a Dv50 less than 1000 nm.

Embodiment 31. The composite material of any one of embodiments 1-29, wherein the nano-featured porous silicon comprises a Dv50 less than 800 nm.

Embodiment 32. The composite material of any one of embodiments 1-29, wherein the nano-featured porous silicon comprises a Dv50 less than 300 nm.

Embodiment 33. The composite material of any one of embodiments 1-29, wherein the nano-featured porous silicon comprises a Dv50 less than 150 nm.

Embodiment 34. The composite material of any one of embodiments 1-29, wherein the nano-featured porous silicon comprises a Dv50 less than 100 nm.

Embodiment 35. The composite material of any one of embodiments 1-29, wherein the nano-featured porous silicon comprises a Dv50 less than 50 nm.

Embodiment 36. The composite material of any one of embodiments 1-29, wherein the nano-featured porous silicon comprises a Dv50 less than 15 nm.

Embodiment 37. The composite material of any one of embodiments 1-36, wherein the nano-featured porous silicon comprises a surface area of 30 to 120 m2/g, a pore volume of 0.08 to 0.3 cm3/g, wherein the pore volume is comprised of 5 to 40% micropores, 35-70% mesopores, and 30-60% macropores.

Embodiment 38. The composite material of any one of embodiments 1-36, wherein the nano-featured porous silicon comprises a surface area of 30 to 120 m2/g, a pore volume of 0.09 to 0.18 cm3/g, wherein the pore volume is comprised of 5 to 15% micropores, 45-55% mesopores, and 30-45% macropores.

Embodiment 39. The composite material of any one of embodiments 4-38, wherein a composition of the composite material and graphite has a gravimetric capacity of greater than 500 mAh/g and less than 50% expansion when tested in a Li ion half cell.

Embodiment 40. The composite material of any one of embodiments 4-38, wherein a composition of the composite material and graphite has a gravimetric capacity of greater than 600 mAh/g and less than 50% expansion when tested in a Li ion half cell.

Embodiment 41. The composite material of any one of embodiments 4-38, wherein a composition of the composite material and graphite has a gravimetric capacity of greater than 600 mAh/g and less than 30% expansion when tested in a Li ion half cell.

Embodiment 42. A composite material comprising porous nano-featured silicon and carbon, having a silicon content between 20% to 70% by weight, a specific surface area between 10 and 200 m2/g, a pore volume between 0.01 and 0.2 cm3/g, and a pore volume distribution comprising less than 30% micropores, less than 30% mesopores, and greater than 50% macropores.

Embodiment 43. The composite material of embodiment 42, wherein the silicon content is 20% to 40% by weight.

Embodiment 44. The composite material of embodiment 42, wherein the silicon content is 30% to 60% by weight.

Embodiment 45. The composite material of any one of embodiments 42-44, wherein the specific surface area is between 20 m2/g and 150 m2/g.

Embodiment 46. The composite material of any one of embodiments 42-46, wherein the specific surface area is between 20 m2/g and 80 m2/g.

Embodiment 47. The composite material of embodiment 46, wherein the pore volume is between 0.01 cm3/g and 0.1 cm3/g.

Embodiment 48. The composite material of embodiment 46, wherein the pore volume is between 0.01 cm3/g and 0.05 cm3/g.

Embodiment 49. The composite material of embodiment 46, wherein the pore volume distribution comprises less than 10% micropores, less than 10% mesopores, and greater than 80% macropores.

Embodiment 50. The composite material of embodiment 49, wherein the pore volume distribution comprises less than 10% micropores, less than 10% mesopores, and greater than 90% macropores.

Embodiment 51. The composite material of embodiment 49, wherein the pore volume distribution comprises less than 5% micropores, less than 5% mesopores, and greater than 90% macropores.

Embodiment 52. The composite material of embodiment 49, wherein the pore volume distribution is comprised of less than 5% micropores, less than 5% mesopores, and greater than 95% macropores.

Embodiment 53. An electrode comprising the composite material according to any one of embodiments 1 to embodiment 52.

Embodiment 54. The electrode of embodiment 53 wherein the electrode is an anode.

Embodiment 55. An energy storage device comprising the composite material according to any one of embodiments 1 to embodiment 52 or the electrode of embodiment 53 or 54.

Embodiment 56. The energy storage device of embodiment 55, wherein the device is a lithium ion battery.

Embodiment 57. A method for producing a composite a material comprising carbon and porous nano-featured silicon comprising the following steps:
   a) suspending particles of a silicon alloy in a liquid medium containing a dissolved acid;
   b) storing the suspended particles for a period of time at sufficient temperature to allow for etching away of metal cations from the silicon alloy to yield porous silicon particles with nano-sized features;
   c) removing the liquid medium to yield dried porous silicon particles with nano-sized features;
   d) blending a mixture of polymer precursors with the porous silicon particles with nano-sized features;
   e) storing the mixture of polymer precursors and the porous silicon particles with nano-sized features for a period of time at sufficient temperature to allow for impregnation and polymerization of the polymer precursors within the porous silicon particles with nano-sized features to yield polymer-impregnated silicon particles with nano-sized features; and
   f) carbonization of the polymer-impregnated silicon particles with nano-sized features to yield a composite silicon-carbon material, wherein the silicon material is a porous silicon material with nano-sized features.

Embodiment 58. A method for producing a composite a material comprising carbon and porous nano-featured and nano-sized silicon comprising the following steps:
   a) suspending particles of a silicon alloy in a liquid medium containing a dissolved acid;
   b) storing the suspended particles for a period of time at sufficient temperature to allow for erosion of metal cations from the silicon alloy in to the liquid medium to yield highly friable silicon material with nano-sized features;
   c) removing the liquid medium to yield dried highly friable silicon material with nano-sized features;
   d) particle size reduction of the friable silicon material with nano-sized features to yield nano-sized silicon particles with nano-sized features;
   e) blending a mixture of polymer precursors with the nano-sized silicon particles with nano-sized features;
   f) storing the mixture of polymer precursors and the nano-sized silicon particles with nano-sized features for a period of time at sufficient temperature to allow for impregnation and polymerization of the polymer precursors within the nano-sized silicon particles with nano-sized features to yield polymer-impregnated nano-sized silicon particles with nano-sized features; and
   g) carbonization of the polymer-impregnated silicon particles to yield a composite silicon-carbon material, wherein the silicon material is a nano-sized silicon material with nano-sized features.

Embodiment 59. A method for producing a composite material comprising carbon and porous nano-featured silicon, the method comprising the following steps:
   a) suspending particles of a silicon alloy in a liquid medium containing a dissolved acid;
   b) storing the suspended particles for a period of time at sufficient temperature to allow for etching away of metal cations from the silicon alloy to yield porous silicon particles with nano-sized features;
   c) removing the liquid medium to yield dried porous silicon particles with nano-sized features;
   d) blending a mixture of polymer precursors with the porous silicon particles with nano-sized features;
   e) storing the mixture of polymer precursors and the porous silicon particles with nano-sized features for a period of time at sufficient temperature to allow for impregnation and polymerization of the polymer precursors within the porous silicon particles with nano-sized features to yield polymer-impregnated silicon particles with nano-sized features;
   f) carbonization of the polymer-impregnated silicon particles with nano-sized features to yield a composite silicon-carbon material, wherein the silicon material is a porous silicon material with nano-sized features; and
   g) chemical vapor deposition of an additional carbon layer covering the composite silicon-carbon material of step f) to yield a composite material comprising porous nano-featured silicon and carbon.

Embodiment 60. A method for producing a composite material comprising carbon and porous nano-featured silicon and nano-sized silicon, the method comprising the following steps:
   a) suspending particles of a silicon alloy in a liquid medium containing a dissolved acid;
   b) storing the suspended particles for a period of time at sufficient temperature to allow for etching away of metal cations from the silicon alloy to yield porous silicon particles with nano-sized features;
   c) removing the liquid medium to yield dried porous silicon particles with nano-sized features;
   d) particle size reduction of the friable silicon material with nano-sized features to yield nano-sized silicon particles with nano-sized features;
   e) blending a mixture of polymer precursors with the nano-sized silicon particles with nano-sized features;
   f) storing the mixture of polymer precursors and the nano-sized silicon particles with nano-sized features for a period of time at sufficient temperature to allow for impregnation and polymerization of the polymer precursors within the nano-sized silicon particles with nano-sized features to yield polymer-impregnated nano-sized silicon particles with nano-sized features;

g) carbonization of the polymer-impregnated silicon particles to yield a composite silicon-carbon material, wherein the silicon material is a nano-sized silicon material with nano-sized features; and h) chemical vapor deposition of an additional carbon layer covering the composite silicon-carbon material of step g) to yield a composite material comprising porous nano-featured silicon and carbon.

Embodiment 61. A method for producing a composite material comprising carbon and porous nano-featured silicon, the method comprising the following steps:

a) suspending particles of a silicon alloy in a liquid medium containing a dissolved acid;

b) storing the suspended particles for a period of time at sufficient temperature to allow for etching away of metal cations from the silicon alloy to yield porous silicon particles with nano-sized features;

c) removing the liquid medium to yield dried porous silicon particles with nano-sized features;

d) blending a mixture of polymer precursors with the porous silicon particles with nano-sized features;

e) storing the mixture of polymer precursors and the porous silicon particles with nano-sized features for a period of time at sufficient temperature to allow for impregnation and polymerization of the polymer precursors within the porous silicon particles with nano-sized features to yield polymer-impregnated silicon particles with nano-sized features;

f) carbonization of the polymer-impregnated silicon particles with nano-sized features to yield a composite silicon-carbon material, wherein the silicon material is a porous silicon material with nano-sized features;

g) (i) suspending the product of step f) in a solution of conductive polymer dissolved in an appropriate solvent, or (ii) blending of a solid conductive polymer the product of step f);

h) optionally pyrolyzing the product of step g) at temperatures ranging from 350 C to 1050 C.

Embodiment 62. A method for producing a composite material comprising carbon and porous nano-featured silicon and nano-sized silicon, the method comprising the following steps:

a) suspending particles of a silicon alloy in a liquid medium containing a dissolved acid;

b) storing the suspended particles for a period of time at sufficient temperature to allow for etching away of metal cations from the silicon alloy to yield porous silicon particles with nano-sized features;

c) removing the liquid medium to yield dried porous silicon particles with nano-sized features;

d) particle size reduction of the friable silicon material with nano-sized features to yield nano-sized silicon particles with nano-sized features;

e) blending a mixture of polymer precursors with the nano-sized silicon particles with nano-sized features;

f) storing the mixture of polymer precursors and the nano-sized silicon particles with nano-sized features for a period of time at sufficient temperature to allow for impregnation and polymerization of the polymer precursors within the nano-sized silicon particles with nano-sized features to yield polymer-impregnated nano-sized silicon particles with nano-sized features;

g) carbonization of the polymer-impregnated silicon particles to yield a composite silicon-carbon material, wherein the silicon material is a nano-sized silicon material with nano-sized features; and h) (i) suspending the product of step g) in a solution of conductive polymer dissolved in an appropriate solvent, or (ii) blending of a solid conductive polymer the product of step f);

i) optionally pyrolyzing the product of step h) at temperatures ranging from 350 C to 1050 C.

Embodiment 63. The method of any one of embodiments 57-62, wherein the particles of the silicon alloy comprise a silicon-aluminum alloy.

Embodiment 64. The method of any one of embodiments 57-63, wherein the silicon-aluminum alloy particles comprise a Dv50 between 1 um and 20 um Embodiment 65. The method of embodiment 63 or 64, wherein the liquid medium comprises aqueous hydrochloric acid, and the temperature is between 25 and 100° C.

Embodiment 66. The method of any one of embodiments 57-65, wherein the erosion of metal cations is conducted in a continuous feed reactor.

Embodiment 67. The method of any one of embodiments 57-65, wherein the erosion of metal cations is conducted in a dunk tank.

Embodiment 68. The method of any one of embodiments 57-67, wherein the liquid removal is accomplished by subjecting the porous silicon particles to centrifugation, vacuum, or elevated temperature, or combinations thereof.

Embodiment 69. The method of any one of embodiments 57-68, wherein the polymer precursors comprise a sugar, and acid, and a carbamate compound.

Embodiment 70. The method of any one of embodiments 57-68, wherein the polymer precursors comprise an acid and a carbamate compound.

Embodiment 71. The method of embodiment 69, wherein the sugar is sucrose, the acid is citric acid, and the carbamate compound is urea.

Embodiment 72. The method of embodiment 50, wherein the acid is citric acid and the carbamate compound is urea.

Embodiment 73. The method of any one of embodiments 57-68, wherein the polymer precursors comprise an epoxy resin and phosphoric acid.

The various embodiments described above can be combined to provide further embodiments. To the extent that they are not inconsistent with the specific teachings and definitions herein, U.S. patent application Serial Nos.: 62/205,542, filed Aug. 14, 2015; 62/208,357 filed Aug. 21, 2015; 62/209,651 filed Aug. 25, 2015; 62/271,795 filed Dec. 28, 2015 and 62/271,799 filed Dec. 28, 2015; all of the U.S. patents, U.S. patent application publications, U.S. patent applications, foreign patents, foreign patent applications and non-patent publications referred to in this specification are incorporated herein by reference, in their entirety to the extent not inconsistent with the present description.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A composite material comprising nanoscale silicon and carbon, wherein the nanoscale silicon is disposed within a carbon shell and forms webbing that defines an internal void structure of the composition, and wherein the composite material comprises:

a silicon content between 20% to 70% by weight;

(ii) a specific surface area of less than 5 $m^2/g$;

(iii) a pore volume between 0.001 and 0.2 $cm^3/g$; and (iv) a pore volume distribution comprising less than 30% micropores, less than 30% mesopores, and greater than 50% macropores.

2. The composite material of claim 1, wherein the silicon content is 40% to 60% by weight.

3. The composite material of claim 1, wherein the specific surface area of the composite is from 0.1 m$^2$/g to less than 5 m$^2$/g.

4. The composite material of claim 3, wherein the pore volume of the composite is between 0.01 cm$^3$/g and 0.1 cm$^3$/g.

5. The composite material of claim 3, wherein the pore volume distribution of the composite comprises less than 10% micropores, less than 10% mesopores, and greater than 80% macropores.

6. An electrode comprising the composite material according to claim 1.

7. The electrode of claim 6, wherein the electrode is an anode.

8. An energy storage device comprising the composite material according to claim 1.

9. The energy storage device of claim 8, wherein the device is a lithium ion battery.

10. A method for producing the composite according to claim 1, the method comprising:
   a) suspending particles of a silicon alloy in a liquid medium containing a dissolved acid;
   b) storing the suspended particles for a period of time at sufficient temperature to allow for etching away of metal cations from the silicon alloy to yield porous silicon particles with nano-sized features;
   c) removing the liquid medium to yield dried porous silicon particles with nano-sized features;
   d) blending a mixture of polymer precursors with the porous silicon particles with nano-sized features;
   e) storing the mixture of polymer precursors and the porous silicon particles with nano-sized features for a period of time at sufficient temperature to allow for impregnation and polymerization of the polymer precursors within the porous silicon particles with nano-sized features to yield polymer-impregnated silicon particles with nano-sized features; and
   f) carbonization of the polymer-impregnated silicon particles with nano-sized features to yield the composite material.

11. The composite of claim 1, wherein the nanoscale silicon comprises a surface area of 30 to 120 m$^2$/g, a pore volume of 0.09 to 0.18 cm$^3$/g, and wherein the pore volume of the nanoscale silicon comprises 5 to 15% micropores, 45-55% mesopores and 30-45% macropores.

12. A composite material comprising nanoscale silicon and carbon, wherein the nanoscale silicon is disposed within a carbon shell and forms a webbing that defines an internal void structure of the composite, and wherein the composite material comprises:
   (i) a silicon content between 20% to 70% by weight;
   (ii) a specific surface area between 0.1 and 10 m$^2$/g;
   (iii) a pore volume between 0.001 and 0.2 cm$^3$/g; and
   (iv) a pore volume distribution comprising less than 30% macropores, less than 30% mesopores, and greater than 50% micropores.

13. The composite material of claim 12, wherein the silicon content is 20% to 40% by weight.

14. The composite material of claim 12, wherein the specific surface area of the composite is between 5 m$^2$/g and 10 m$^2$/g.

15. The composite material of claim 12, wherein the pore volume of the composite is between 0.01 cm$^3$/g and 0.1 cm$^3$/g.

16. An electrode comprising the composite material according to claim 12.

17. The composite material of claim 12, wherein the silicon content is 40% to 60% by weight.

* * * * *